(12) United States Patent
Grölz

(10) Patent No.: US 12,366,508 B2
(45) Date of Patent: Jul. 22, 2025

(54) METHOD OF PREPARING A FROZEN BIOLOGICAL SAMPLE

(71) Applicant: QIAGEN GmbH, Hilden (DE)

(72) Inventor: Daniel Grölz, Hilden (DE)

(73) Assignee: QIAGEN GmbH, Hilden (DE)

(*) Notice: Subject to any disclaimer, the term of this patent is extended or adjusted under 35 U.S.C. 154(b) by 260 days.

(21) Appl. No.: 15/747,278

(22) PCT Filed: Aug. 1, 2016

(86) PCT No.: PCT/EP2016/068339
§ 371 (c)(1),
(2) Date: Jan. 24, 2018

(87) PCT Pub. No.: WO2017/017283
PCT Pub. Date: Feb. 2, 2017

(65) Prior Publication Data
US 2018/0217037 A1    Aug. 2, 2018

(30) Foreign Application Priority Data

Jul. 30, 2015  (EP) ..................... 15179170

(51) Int. Cl.
*G01N 1/42*  (2006.01)
*G01N 1/30*  (2006.01)

(52) U.S. Cl.
CPC .............. *G01N 1/42* (2013.01); *G01N 1/30* (2013.01); *G01N 2001/305* (2013.01)

(58) Field of Classification Search
None
See application file for complete search history.

(56) References Cited

U.S. PATENT DOCUMENTS

| | | |
|---|---|---|
| 3,515,128 A | 6/1970 | McEvoy |
| 4,002,664 A | 1/1977 | Quadbeck-Seeger et al. |
| 5,104,640 A | 4/1992 | Stokes |
| 5,827,199 A | 10/1998 | Alexander |
| 6,337,189 B1 | 1/2002 | Ryan |
| 6,699,711 B1 | 3/2004 | Hahn et al. |
| 7,083,761 B2 | 8/2006 | Zimmermann et al. |
| 7,147,826 B2 | 12/2006 | Haywood et al. |
| 8,546,078 B2 | 10/2013 | Freije et al. |
| 9,029,138 B2 | 5/2015 | Groelz et al. |
| 2002/0094577 A1 | 7/2002 | Guirguis et al. |
| 2003/0087423 A1 | 5/2003 | Haywood et al. |
| 2003/0119049 A1 | 6/2003 | Lorincz et al. |
| 2003/0211452 A1 | 11/2003 | Vincek et al. |
| 2004/0004075 A1 | 1/2004 | Morales et al. |
| 2004/0123337 A1 | 6/2004 | Gleicher |
| 2005/0074422 A1 | 4/2005 | Visinoni |
| 2005/0147538 A1 | 7/2005 | Williamson, IV et al. |
| 2006/0088814 A1 | 4/2006 | Hecht et al. |
| 2006/0178598 A1 | 8/2006 | Cho et al. |
| 2007/0140920 A1 | 6/2007 | McCormick |
| 2008/0220469 A1 | 9/2008 | Heid et al. |
| 2010/0009349 A1 | 1/2010 | Holländer |
| 2010/0173295 A1* | 7/2010 | Lenz ................. G01N 1/30 435/6.11 |
| 2013/0095473 A1 | 4/2013 | Groelz |
| 2018/0217037 A1 | 1/2018 | Grolz |

FOREIGN PATENT DOCUMENTS

| | | |
|---|---|---|
| DE | 29 03 760 B1 | 6/1980 |
| DE | 40 19 182 | 1/1991 |
| DE | 199 28 820 A1 | 12/2000 |
| EP | 0 311 035 A2 | 4/1989 |
| EP | 1 510 588 A1 | 3/2005 |
| EP | 1 595 502 | 11/2005 |
| EP | 1 965 190 A1 | 9/2008 |
| WO | 88/05054 A1 | 7/1988 |
| WO | 91/12343 A2 | 8/1991 |
| WO | 02/102997 A2 | 12/2002 |
| WO | 03/040697 | 5/2003 |
| WO | 2004/033622 A2 | 4/2004 |
| WO | 2004/083369 A2 | 9/2004 |
| WO | 2005/037182 | 4/2005 |
| WO | 2005/121747 A1 | 12/2005 |
| WO | 2006/078922 | 7/2006 |
| WO | 2007/014741 A2 | 2/2007 |

(Continued)

OTHER PUBLICATIONS

Barcala et al. "Laser microdissection of cells and isolation of high-quality RNA after cryosectioning." RNA Abundance Analysis. Humana Press, Totowa, NJ, 2012. 87-95. (Year: 2012).*
Sakura "Tissue-Tek O.C.T. compound" available on company's webpage at <https://www.sakuraus.com/Products/Cryotomy/Tissue-Tek%C2%AE-O-C-T-Compound.html >, accessed Jan. 16, 2021, copyright 2021 (Year: 2021).*
"O.C.T. compound, 27050, MSDS" Rev. Dat: Sep. 17, 2012, Tedpella.com. accessed Jan. 16, 2021 (Year: 2012).*
Bostwick et al., "Establishment of the Formalin-Free Surgical Pathology Laboratory," *Arch Pathol Lab Med* 118:298-302, 1994.
Cox et al., "Assessment of fixatives, fixation, and tissue processing on morphology and RNA integrity," *Experimental and Molecular Pathology* 80:183-191, 2006.
Denouël et al., "An Alternative Fixative to Formalin Fixation for Molecular Applications: The RCL2®-CS100 Approach," *Methods in Molecular Biology* 724:297-306, 2011.

(Continued)

*Primary Examiner* — Emily A Cordas
(74) *Attorney, Agent, or Firm* — Seed IP Law Group LLP

(57) ABSTRACT

The present invention pertains to a method of preparing a frozen biological sample, comprising the steps of fixing the biological sample with a non-crosslinking fixative solution, incubating the fixed biological sample in an aqueous solution comprising a cryoprotectant, and freezing the cryoprotected biological sample. The method advantageously allows to preserve both, morphology of the sample as well as biological components such as nucleic acids and proteins, in high quality for subsequent analysis. The method is robust, simple and neither requires laborious steps associated with paraffin-embedding nor immediate freezing of the sample. Also provided are advantageous uses and kits.

17 Claims, 19 Drawing Sheets

(56) References Cited

FOREIGN PATENT DOCUMENTS

| WO | 2007/014742 A1 | 2/2007 |
| WO | 2007/016935 A1 | 2/2007 |
| WO | 2007/045681 A1 | 4/2007 |
| WO | 2008/104564 A1 | 9/2008 |
| WO | 2009/002937 A2 | 12/2008 |
| WO | 2009/013548 A2 | 1/2009 |
| WO | 2009/037454 A2 | 3/2009 |
| WO | 2009/062125 A1 | 5/2009 |

OTHER PUBLICATIONS

Gillespie et al., "Evaluation of Non-Formalin Tissue Fixation for Molecular Profiling Studies," *American Journal of Pathology* 160(2):449-457, 2002.

Grölz et al., "Non-formalin fixative versus formalin-fixed tissue: A comparison of histology and RNA quality," *Experimental and Molecular Pathology* 94:188-194, 2013.

Gündisch et al., "Evaluation of colon cancer histomorphology: a comparison between formalin and PAXgene tissue fixation by an international ring trial," *Virchows Archiv* 465(5):509-519, 2014.

Japanese Notice of Rejection, for JP Application No. 2009-551197, dated Mar. 26, 2013, 8 pages (English Translation).

Li et al., "Identification of cell types in the developing goat mammary gland," *The Histochemical Journal* 31:379-393, 1999.

Merriam Webster, definition of "Aqueous," URL=http://www.merriam-webster.com/dictionary/aqueous, downloaded Feb. 24, 2014, 2 pages.

Nagata et al., "Thermodynamics of Solutions of Acetonitrile with Methanol and Ethanol," *Thermochimica Acta* 86:85-99, 1985.

Puchtler et al., "Methacarn (Methanol-Carnoy) Fixation: Practical and Theoretical Considerations," *Histochemie* 21:97-116, 1970.

Sigma Aldrich, Specification Data Sheet, "Methanol, anhydrous, 99.8%," downloaded from http://www.sigmaaldrich.com/catalog/product/sial/322415?lang-en®ion=US, May 28, 2021, 4 pages.

Smith et al., "Iron accumulation in Alzheimer disease is a source of redox-generated free radicals," *Proc. Natl. Acad. Sci.* 94:9866-9868, 1997.

Takagi et al., "Microdissected Region-specific Gene Expression Analysis with Methacarn-fixed, Paraffin-embedded Tissues by Real-time RT-PCR," *Journal of Histochemistry & Cytochemistry* 52(7):903-913, 2004.

Tyrrell et al., "Detection of Specific mRNAs in Routinely Processed Dermatopathology Specimens," *Am J Dermatopathol* 17(5):476-483, 1995.

Wataya et al., "High Molecular Weight Neurofilament Proteins Are Physiological Substrates of Adduction by the Lipid Peroxidation Product Hydroxynonenal," *The Journal of Biological Chemistry* 277(7):4644-4648, 2002.

Ma et al., "Effects of Different Fixatives on β-Galactosidase Activity," The Journal of Histochemistry & Cytochemistry 50(10):1421-1424, 2002.

Mager et al., "Standard operating procedure for the collection of fresh frozen tissue samples," *European Journal of Cancer* 43:828-834, 2007.

PreAnalytiX Supplementary Protocol: Cryo-embedding tissue specimens fixed and stabilized with the PAXgene® Tissue System, URL=https://www.preanalytix.com/sites/default/files/supplementary_protocols/PROM-8405-002-PX14_SuppProt_Cryoembedding_1216_WW.pdf, download date Mar. 26, 2018, 7 pages.

PreAnalytiX®, "PAXgene®—Tissue FIX Container (50 ml) Product Circular," 24 pages (Feb. 2013).

Sakura, Material Safety Data Sheet, Tissue—Tek O.C.T. Compound, 3 pages, Sep. 17, 2012.

Sakura, "Tissue-Tek O.C.T. compound" available on company's webpage at https://www.sakuraus.com/Products/Cryotomy/Tissue-Tek%C2%AE-O-C-T=Compound.html Accessed Jan. 16, 2021, copyright 2021.

Steu et al., "A procedure for tissue freezing and processing applicable to both intra-operative frozen section diagnosis and tissue banking in surgical pathology," *Virchows Archiv* 452:305-312, 2008.

Vincek et al., "A Tissue Fixative that Protects Macromolecules (DNA, RNA, and Protein) and Histomorphology in Clinical Samples," *Laboratory Investigation* 83(10):1427-1435, 2003.

\* cited by examiner

Fig. 1

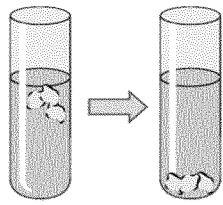

Cut the fixed and stabilized tissue to a maximum thickness of 2 mm. Incubate overnight in 30% [w/v] sucrose.

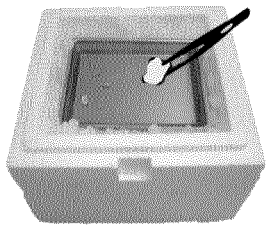

Snap-freeze the tissue in 2-methylbutane pre-cooled on dry ice.

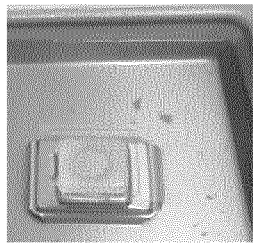

Fill a cryomold with cryo-embedding medium and pre-cool e.g. in 2-methylbutane.

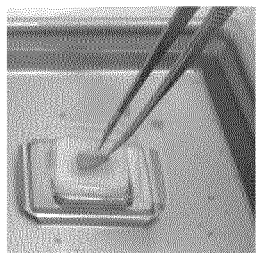

Submerge the frozen tissue into the middle of the cryo-embedding medium.

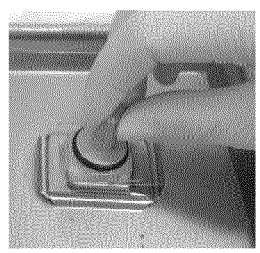

Immediately place a specimen disk on top of the cryo-embedded tissue.

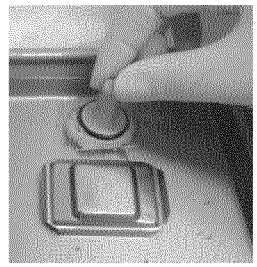

Completely submerge the cryomold with tissue into the 2-methylbutane.

Fig. 2
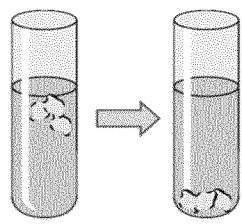
Cut the fixed and stabilized tissue to a maximum thickness of 2 mm. Incubate overnight in 30% [w/v] sucrose.
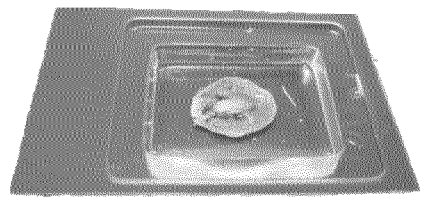
Fill a cryomold with cryo-embedding medium and submerge the tissue.
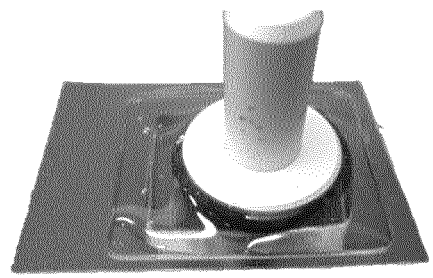
Place a specimen disk on top of the tissue.
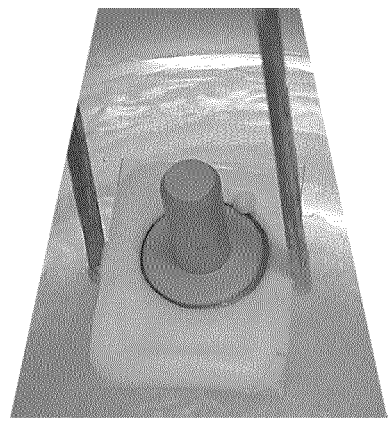
Using long forceps, hold the cryomold with tissue and specimen disk in liquid nitrogen.

Fig. 9
Anti 5-Methylcystosine, PFCE (LN2)
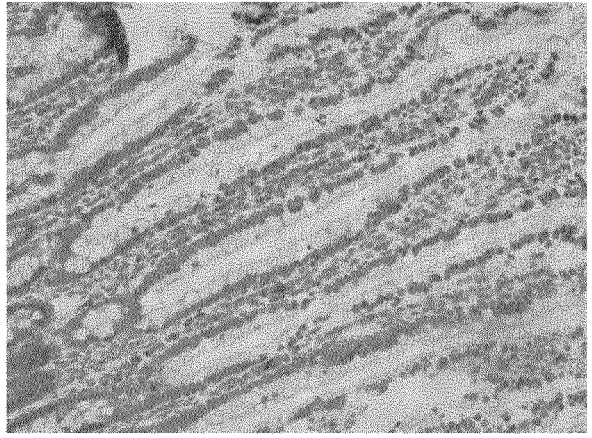
Anti Pan-Cadherin, PFCE (2-methylbutane)
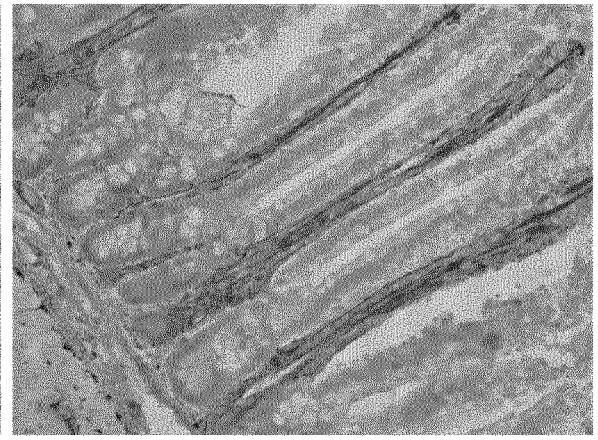

METHOD OF PREPARING A FROZEN BIOLOGICAL SAMPLE

FIELD OF THE INVENTION

The present invention pertains to a method of preparing a frozen biological sample, comprising the steps of fixing the biological sample with a non-crosslinking fixative solution, incubating the fixed biological sample in an aqueous solution comprising a cryoprotectant, and freezing the cryoprotected biological sample. The method advantageously allows to preserve both, morphology of the sample as well as biological components such as nucleic acids and proteins, in high quality for subsequent analysis. The method is robust, simple and neither requires laborious steps associated with paraffin-embedding nor immediate freezing of the sample. In addition, the use of cross-linking agents such as formaldehyde is avoided. Also provided are advantageous uses and kits.

BACKGROUND OF THE INVENTION

Methods for preserving biological samples for subsequent analysis are known in the prior art. For histological analysis, a preservation method should largely retain the morphology of the biological sample, e.g. a tissue sample. Fixation followed by paraffin-embedding is the preferred procedure for preservation of tissue morphology, although the method is laborious and takes up to two days. For subsequent histological analysis, the paraffin-embedded sample is then cut, the paraffin is removed in a series of steps and the sample is then stained.

The standard procedure for fixation and paraffin-embedding includes the step of sample fixation with a cross-linking agent. Typically formalin, an aqueous solution of formaldehyde, or other crosslinking agents are used for fixation. Prior to paraffin-embedding, the water must be removed from the fixed tissue by a series of dehydration steps. The sample is then embedded in paraffin and can be stored at room temperature. For analysis, the formalin fixed, paraffin-embedded (FFPE) sample is cut, and in a series of steps the paraffin is removed and the sample is rehydrated. The sample can then be subjected to histological or immunohistological staining. Because sample morphology is well preserved with this method, it is widely used for diagnosis of disease and in research.

However, although overall morphology is preserved, fixation with cross-linking agents such as formaldehyde or other aldehydes introduces crosslinks. This leads to severe chemical modifications and degradation of biomolecules within the sample, which often prevents purification of biological components suitable for molecular analysis (Grölz et al., Exp Mol Pathol. 2013, 94 (1): 188-94). It is thought that cross-linking agents form cross-links between e.g. proteins. By this enzymatic activity is ceased and soluble proteins are fixed to structural proteins. Since cross-linking agents also react with nucleic acids, fixation with cross-linking agents leads to low yield and degradation of nucleic acids.

To overcome this disadvantage, in recent years a number of formalin-free alternative fixatives have been developed and have been used for paraffin-embedding (Grölz et al., Exp Mol Pathol. 2013, 94 (1): 188-94; Gündisch et al., 2014 Virchows Arch., DOI 10.1007/s00428-014-1624-5; Vincek et al., Lab Investigation 2003, 83 (10): 1427-35; Gillespie et al., Am J Pathol. 2002, 160 (2): 449-457; Denouël et al., Methods Mol Biol. 2011, 724:297-307).

Non-crosslinking fixative solutions advantageously do not introduce crosslinks and achieve tissue fixation by different mechanisms, one important mechanism being the precipitation of proteins. Precipitating fixative solutions represent an important group of non-crosslinking fixative solutions and act by reducing the solubility of protein molecules. They may also disrupt the hydrophobic interactions that give many proteins their tertiary structure. Alcohols, acids and acetone are often used as precipitants. While all of these precipitants can be used in isolation, precipitating fixative solutions typically comprise one or more alcohols and optionally comprise in addition one or more acids. Non-crosslinking fixative solutions and in particular precipitating fixative solutions are thought to be gentler than cross-linking fixative solutions. They likewise allow to preserve sample morphology and are superior to cross-linking fixative solutions with regard to preservation of biomolecules.

In recent times some of the alcoholic fixatives like Carnoy's (60% ethanol, 30% chloroform, 10% acetic acid) or Methacarn (Carnoy's with the substitution of ethanol with methanol) have been found to yield superior results as nucleic acids fixatives compared to aldehydes (Cox et al., Experimental and Molecular Pathology 2006; 80:183-191). Other more recently published fixatives based on alcohol consist of 70% ethanol (Gillespie et al., Am. J. Pathol. 2002; 160 (2): 449-457), 56% ethanol and 20% PEG (polyethylene glycol, Bostwick et al.; Arch. Pathol. Lab. Med. 1994; 118:298-302) or 90% methanol and 10% PEG300 (Vinvek et al., Lab. Investigation 2003; 83 (10): 1427-35). In addition several patent applications disclose non-crosslinking fixatives. In DE 199 28820 a fixative is described containing a mixture of different alcohols, acetone, PEG and acetic acid. In US 2003/0211452 A1 a fixative commercialised as "Umfix" is described containing at least 80% methanol and up to 20% PEG300 for preservation of RNA, DNA and morphology. Fixatives based on ethanol for preservation of molecular content and morphology are furthermore described in US 2005/0074422 A1 ("Finefix"), WO 2004/083369 ("RCL2@") and WO 05/121747 A1 ("Boonfix"). In US 2003/119049 a universal collection medium is described which is water based and comprises a buffer component, one alcohol, a fixative component and an agent to inhibit degradation. Precipitating fixative solutions are also described in US 2013/0095473 A1. Solutions described therein are also commercially available as PAXGENER Tissue System. Provided is a formalin-free and non-crosslinking, alcoholic tissue fixation and stabilization system that is known to be superior to formalin with regard to molecular analysis, preservation of tissue morphology. It can be used for cancer diagnosis as recently shown for colorectal cancer in an international ring trial (Gündisch et al., 2014 Virchows Arch., DOI 10.1007/s00428-014-1624-5). The fixation reagent, PAXGENER Tissue FIX, rapidly penetrates and fixes biological samples such as tissue. Morphology and biomolecules are preserved without destructive cross-linking and degradation found in formalin-fixed tissues, and no molecular modifications are introduced that can inhibit sensitive downstream applications such as quantitative PCR or RT-PCR. To stop the fixation process and optimally protect biomolecules for long-term storage, the sample can then be transferred into the PAXGENE® Tissue STABILIZER.

Still, also with such alternative, non-crosslinking fixative solutions, paraffin-embedding typically has to be performed to allow cutting of the sample for the preparation of thin or ultrathin sections that are required for many applications such as staining and microdissection for the targeted isolation of biological components. As it is the case with cross-linking fixative solutions, it is also here required to remove the paraffin from the sample in a series of steps for most downstream applications.

In a different prior art approach for the preservation of biological samples, the sample is frozen. The frozen sample can subsequently be subjected to an analysis, for example it can be cryo-sectioned and stained. For more convenient handling of the frozen sample, samples are often placed in optimal cutting temperature (OCT) compounds before freezing. Several cryo-embedding compounds are commercially available and consist mainly of a water soluble glycol medium. When submerged in OCT medium, freezing produces a cryo-block which can be more easily sectioned into ultrathin sections and mounted on microscopic slides, needed for histological staining (see e.g. Steu et al., Virchows Arch. 2008, 452:305-312; Mager et al., European J. of Cancer 2007, 43:828-834).

A disadvantage of freezing tissue samples slowly is that an aggregation of water molecules into ice crystals occurs and artefacts are produced (see e.g. Steu et al., Virchows Arch. 2008, 452:305-312). These artefacts include disruption of cellular structures as well as enzymatic degradation of biomolecules during the freezing process. To reduce the level of ice crystal formation, samples are often infiltrated by a cryoprotectant at room temperature prior to freezing. Cryoprotectants are thought to decrease the mobility of water molecules thereby preventing the formation of ice crystals. A cryo-protective effect was published for several substances including glycerol, ethylene glycol, propylene glycol, dimethyl formamide, DMSO, sucrose and others. However, cryoprotectants may exert osmotic activity and therefore damage the morphology of samples if applied directly and at high concentrations. Using a series of increasing concentrations of cryoprotectant on the other hand is labor intensive and prone to degradation of biological components in the initial steps of sample preservation.

In contrast, snap-freezing allows to rapidly freeze the sample. Snap-freezing and cryo-sectioning of freshly resected tissue samples can be performed within one hour. Therefore, snap-freezing is widely used for the pathological intra-operative assessment of samples, e.g. to provide information on resection margins for the surgeon. Besides liquid nitrogen or 2-methylbutane (also known as isopentane) cooled with liquid nitrogen, freezing on dry ice, freezing sprays or cryostat freezing can be applied in this setting (see e.g. Steu et al., Virchows Arch. 2008, 452:305-312). Of these, liquid nitrogen and 2-methylbutane are also recommended for optimal preservation of biomolecules in tissue bio-banking (see e.g. Mager et al., European J. of Cancer 2007, 43:828-834).

However, preservation of biomolecules by snap-freezing comes at the cost of an overall compromised sample morphology and therefore, the utility of the snap-frozen samples for morphology-based analyses and diagnostics is limited. A further disadvantage associated with snap-freezing is the need to have liquid nitrogen available at or close to the place of resection, e.g. a hospital. In addition, a cooling chain has to be in place, to guarantee that the sample stays frozen until it is transported to the place of analysis and/or storage. Bans for liquid nitrogen in surgical operation rooms and high costs associated with a seamless cooling logistic often prevent snap-freezing of samples or result in delayed freezing, which is associated with degradation of biomolecules.

Ma et al. (Journal of Histochemistry and Cytochemistry 50:1421-1424) compare the effects of Carnoy's and three different crosslinking aldehyde fixatives on β-Galactosidase activity. While glutaraldehyde and to a lesser extent paraformaldehyde and formaldehyde were found to be effective, Carnoy's was found not suitable because it destroyed β-Galactosidase activity.

EP 1 965 190 A1 relates to the PAXGENER Tissue technology and describes a method for the fixation of biological materials including a fixation and a stabilization step. According to EP 1 965 190 A1, after the sample has been fixed and optionally stabilized, it can be stored at a temperature in a range of −80° C. to +80° C. Yet, the samples subjected to the method of EP 1 965 190 A1 are not homogenously hardened and are not frozen when stored at low temperatures.

It is the object of the present invention to avoid at least one of the prior art drawbacks discussed above. In particular, it is an object of the present invention to provide a convenient method that allows to obtain biomolecules and to preserve morphology while avoiding the need for laborious paraffin-embedding and de-paraffinization steps during sample processing as well as the need for immediate sample freezing. It is a further object of the present invention to provide a convenient and robust method for preparing a frozen biological sample that preserves both, morphology as well as integrity of biological components in the sample.

SUMMARY OF THE INVENTION

The present inventor has found a robust method to prepare a frozen biological sample with preserved morphology and integrity of biological components. Also provided are advantageous kits and uses.

According to a first aspect, the invention provides a method of preparing a frozen biological sample, comprising the steps:
   fixing the biological sample with a non-crosslinking fixative solution,
   incubating the fixed biological sample in an aqueous solution comprising a cryoprotectant, and
   freezing the cryoprotected biological sample.

According to a second aspect, the invention provides the use of a non-crosslinking fixative solution for preparing a frozen biological sample, wherein the non-crosslinking fixative solution is non-aqueous and comprises one or more aliphatic alcohols of the general formula $C_nH_{2n+1}OH$, and preferably an acid.

According to a third aspect, the invention provides a kit for preparing a frozen biological sample, the kit comprising:
   a non-crosslinking fixative solution and/or a stabilizing solution; and
   a cryoprotectant which is provided separate from the non-crosslinking fixative solution and the stabilizing solution.

According to a fourth aspect, the invention provides the use of a kit according to the third aspect in the method according to the first aspect.

Advantageously, with the present method, kit and uses, a frozen biological sample with both, preserved morphology as well as integrity of biological components can conveniently be prepared. The technology of the present invention obviates the need for laborious paraffin-embedding to preserve sample morphology in high quality. Also, there is no need to immediately freeze the sample.

Thus the present invention provides a method, kit and uses for preparing a biological sample that advantageously obviates the need for laborious paraffin-embedding and paraffin-removal steps while preserving both morphology and biological components, including delicate components such as RNA and phosphoproteins. Still further, with the present method a high-quality frozen biological sample suitable for diagnostics and tissue bio-banking can be prepared without the need for immediate access to cooling or freezing tools and without the need for a cooling chain to be in place. The initial method steps can conveniently be performed at ambient temperatures. The present method therefore is of great value in particular in clinical settings. There, time and space constraints as well as regulatory aspects such as a ban for liquid nitrogen in surgical operating rooms make a method of preparing a frozen biological sample that does not require immediate sample freezing highly desirable.

Without wishing to be bound by theory, exposure of biological samples fixed with non-crosslinking fixative solutions to aqueous solutions results in rehydration of the sample. This is expected to at least partially revert the fixation achieved by the non-crosslinking fixative solution, and to result in a refolding of robust degrading enzymes, in particular RNases, due to the absence of crosslinks in the sample. It was therefore highly surprising that incubating the sample in the aqueous cryoprotectant solution as it is taught herein on the one hand allowed to achieve the required homogenous and complete hardening of the sample during freezing (which is prerequisite for cutting the sample to thin or ultrathin sections), while on the other hand biological components, including delicate molecules such as RNA and phosphoproteins, were not degraded by exposure to aqueous conditions.

The present method, uses and kit therefore allow to obtain biological components such as DNA, RNA and protein, from the sample in high quality, without the chemical modifications that are introduced by cross-linking fixatives, and with excellent performance in molecular analysis. Also, the morphology of the samples is well-preserved and incubation in the aqueous solution comprising the cryoprotectant does not result in undesirable swelling of the sample.

As shown in the examples, DNA, RNA as well as proteins (including phosphoproteins) were isolated from frozen samples prepared by the present method in excellent quality and yield. Also, samples slides with excellent retained morphology were prepared that in particular did not show tissue retractions and the formation of islets frequently observed with prior art methods.

Other objects, features, advantages and aspects of the present application will become apparent to those skilled in the art from the following description and appended claims. It should be understood, however, that the following description, appended claims, and specific examples, while indicating preferred embodiments of the application, are given by way of illustration only.

BRIEF DESCRIPTION OF THE FIGURES

FIG. 1: Tissue preparation and snap-freezing in 2-methylbutane followed by cryo-embedding.

FIG. 2: Tissue preparation and simultaneous snap-freezing and cryo-embedding using liquid nitrogen.

FIG. 9: Immunohistochemical (IHC) staining of PFCE rat intestine tissue snap-frozen in liquid nitrogen or snap-frozen in 2-methylbutane; nuclei staining with anti-5-methylcystosine and plasma membrane staining in specific cells with anti-pan-cadherin monoclonal antibodies. Sections with a thickness of 8 μm; original magnification ×200.

FIG. 14A: The figure shows an Agilent Bioanalyzer gel-like image. The y axis indicates the size of the RNA, expressed as [nt]. Left lane: ladder; second lane: liver; third lane: colon; fourth lane: spleen. FIG. 14 C: The figure shows the results of a quantification of the graphical display of FIG. 14A and of the intensity measurement of FIG. 14 B. It indicates the ratio of miRNA to small RNA determined by the Bioanalyzer from the concentrations of the miRNA fraction and total small RNA fraction using the marker band intensity as reference. Y axis: ratio of miRNA to small RNA [%]; x axis: PFCE tissue, left bar: liver, middle bar: colon, right bar: spleen. FIG. 14 D: The figure shows performance of miRNA from PFCE tissue in a target-specific RT-PCR assay. Briefly, 5 µl 1:5 diluted RNA, including miRNA eluate from microdissected liver, colon and spleen PFCE tissue was amplified using specific primers for target miRNA (Hs_RNU1A, TAQMAN® Gene Expression Assay, Applied Biosystems), the QIAGEN miScript reverse transcription system and the QUANTITECT™ SYBR® Green PCR Kit. Data is shown as mean RAW CT values and SD for triplicate amplifications. RNU1A miRNA could be detected with high quantity and high sensitivity in total RNA, including miRNA from all tested tissue types, processed into PFCE tissue blocks.

FIG. 17A: Y axis indicates the size [nt], x axis indicates the sample type. Left lane: ladder, followed by liver, colon and spleen PCFE tissue samples.

DETAILED DESCRIPTION OF THE INVENTION

Figure 3:
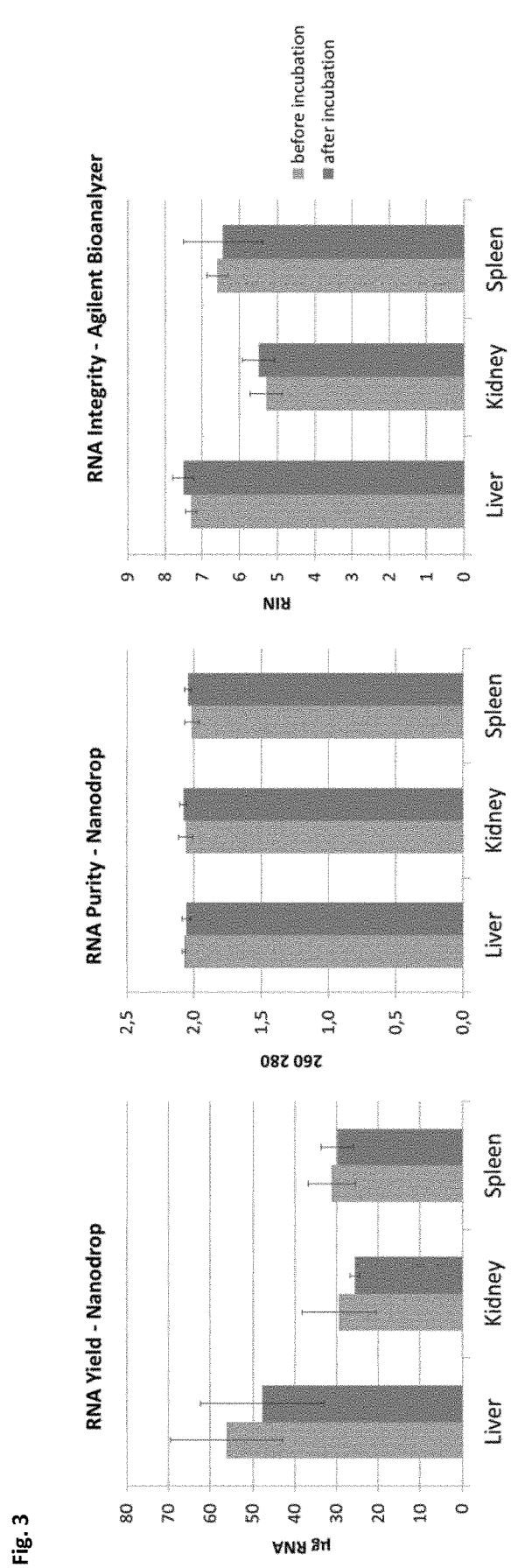
FIG. 3: RNA yield, purity and integrity from fixed and stabilized tissue with or without incubation in 30% sucrose solution. RNA was extracted in duplicates from 10 mg of tissue from each sample using consumables of the PAXGENER Tissue RNA kit.

The present invention is inter alia based on the surprising finding that it is possible to prepare a frozen biological sample with preserved morphology and integrity of biological components by fixing the biological sample with a non-crosslinking fixative solution, incubating the fixed biological sample in an aqueous solution comprising a cryoprotectant, and freezing the cryoprotected biological sample.

Method

According to a first aspect, a method of preparing a frozen biological sample is provided. The method comprises the following steps:
    fixing the biological sample with a non-crosslinking fixative solution,
    incubating the fixed biological sample in an aqueous solution comprising a cryoprotectant, and
    freezing the cryoprotected biological sample.

In frozen samples prepared by the present method, the morphology is well preserved. The results are superior to the morphology achieved by widely used freezing methods such as snap-freezing of unfixed samples in liquid nitrogen. Biological components, including DNA, RNA, proteins, including but not limited to phosphoproteins, and metabolites are preserved and can be purified from the sample in high quality. The purified components show an excellent performance even in highly sensitive downstream applications such as amplification reactions, e.g. quantitative real time PCR. The quality of biological components is superior to that of biological components isolated from samples fixed with cross-linking agents. Also, the present method obviates the need for laborious paraffin-embedding and paraffin-removal steps typically required for downstream analysis where a good preservation of the morphology is important. The present method is simple, robust, suitable for automation, and offers the important advantage that a high-quality frozen sample can be provided even where freezing is not immediately available or no seamless cooling chain is established. The materials used can be provided in a kit format that is also suitable for long-term storage.

Therefore, the present method has important advantages. The individual steps and preferred embodiments are explained in the following.

The biological sample subjected to the present method can be derived from a variety of sources. Accordingly, the biological sample can for example be derived from metazoa, from a plant, or from microorganisms such as bacteria, viruses, yeast and fungi. The present method is particularly well suited for biological samples derived from metazoa, more preferably from a mammal such as an animal or a human, most preferably from a human.

The biological sample may comprise cells. The cells can be cultured cells or primary cells. The cells can be isolated cells. An important application of the present method is on biological samples that comprise or consist of tissue, in particular mammalian tissue such as animal or human tissue. The tissue can be selected from connective, muscle, nervous, and epithelial tissue. The tissue can be derived from a variety of organs such as but not limited to liver, kidney, spleen, intestine, lung, heart muscle, cerebrum and esophagus. Importantly, the present method allows to isolate high-quality biological components even from tissues where isolation is often difficult, such as fibrous or fatty tissue. The biological sample can be selected from a tissue sample, an autopsy, a biopsy such as a core needle biopsy, an aspirate, a swab, and a cell-containing bodily fluid. The bodily fluid can for example be blood, sperm, cerebrospinal fluid, saliva, sputum, urine, lacrimal fluid, ascites, or sudor.

The size of the biological sample to be processed according to the present invention is not particularly limited. However, it may be desirable to cut the sample into pieces that will fit into commercially available tissue cassettes or cryomolds. For practical considerations, samples can for example be trimmed to a size of about 4× about 15× about 15 mm or less. Very good fixation results can be achieved for samples having a thickness of about 6 mm or less. A thickness of about 4 mm or less, preferably about 2 mm or less, is particularly well suited. Generally, the thinner the faster the tissue can be fixed. The aforementioned sizes and thicknesses have also been found very suitable to achieve fast freezing.

In contrast to fixation methods relying on cross-linking fixatives, the present method advantageously allows to prepare a biological sample with well-preserved biological components, including DNA, RNA and protein. The advantages of using a non-cross linking fixative solution are known and achieved. Furthermore, the present method advantageously allows to prepare a frozen biological sample using a non-crosslinking fixative solution. Notably, this is an important distinction over prior art applications where samples fixed with a non-crosslinking fixative solution have been occasionally stored at low temperatures, such as at about −80° C. or even below. However, even though these samples were stored at low temperatures, the samples did not attain a frozen state and therefore were not sufficiently hard and rigid for preparing sections by cutting, in particular thin and ultrathin sections, that are of sufficient quality. Therefore, also with these prior art applications, laborious and time consuming paraffin-embedding and paraffin-removal steps were required.

Fixing the biological sample with a non-crosslinking fixative solution According to the present method, the biological sample is fixed with a non-crosslinking fixative solution.

A "fixative solution" is a solution that typically comprises one or more components that act as fixatives, e.g. one or more alcohols and/or acids. A "fixative solution" may also consist of one or more components that act as fixatives.

A "non-crosslinking fixative solution" as used herein is a fixative solution that does not comprise formaldehyde, formalin, paraformaldehyde, glutaraldehyde and glyoxal beyond trace amounts not resulting in fixation, or is a fixative solution that does not comprise formaldehyde, formalin, paraformaldehyde, glutaraldehyde and glyoxal at all. A "non-crosslinking fixative solution" is according to one embodiment a fixative solution that does not comprise an aldehyde beyond trace amounts not resulting in fixation, or is a fixative solution that does not comprise an aldehyde at all.

A "non-crosslinking fixative solution" in particular can be a fixative solution that besides formaldehyde, formalin, paraformaldehyde, glutaraldehyde and glyoxal does neither comprise imidazolidinyl urea, diazolidinyl urea, 2-bromo-2-nitropropane-1,3-diol, tris(hydroxymethyl) nitromethane, hydroxymethylglycinate, dimethylol-5,5-dimethylhydantoin, 1,3-Bis(hydroxymethyl)-5,5-dimethylhydantoin, 1, dimethylol urea, quaternary adamantane, hexamethylenetramine chloroallyl chloride, 1-(3-chloroallyl)-3,5,7-tri-aza-1-azoiadamantiane-chloride, and N-(3-chloroallyl)-hexammonium chloride beyond trace amounts not resulting in fixation, or does not comprise these compounds at all. A "non-crosslinking fixative solution" in particular can be a fixative solution that does not comprise a formaldehyde releasing agent beyond trace amounts not resulting in fixation, or does not comprise a formaldehyde releasing agent at all.

A "non-crosslinking fixative solution" in particular can be a fixative solution that besides formaldehyde, formalin, paraformaldehyde, glutaraldehyde and glyoxal does neither comprise bis-maleic anhydrides beyond trace amounts not resulting in fixation, or does not comprise these compounds at all. Also, a "non-crosslinking fixative solution" in particular can be a fixative solution that besides formaldehyde, formalin, paraformaldehyde, glutaraldehyde and glyoxal does neither comprise genipin and carbodiimides beyond trace amounts not resulting in fixation, or does not comprise these compounds at all. Bis-maleic anhydrides, genipin and carbodiimides in contrast to formaldehyde, formalin, paraformaldehyde, glutaraldehyde and glyoxal, are not amongst the crosslinking agents that are typically used for the fixation of biological samples, e.g. tissue. However, it may be desirable that the non-crosslinking fixative solution does not comprise these compounds beyond trace amounts not resulting in fixation, or does not comprise these compounds at all.

According to a preferred embodiment, the non-crosslinking fixative solution besides formaldehyde, formalin, paraformaldehyde, glutaraldehyde and glyoxal does neither comprise imidazolidinyl urea, diazolidinyl urea, 2-bromo-2-nitropropane-1,3-diol, tris(hydroxymethyl) nitromethane, hydroxymethylglycinate, dimethylol-5,5-dimethylhydantoin, 1,3-Bis(hydroxymethyl)-5,5-dimethylhydantoin, dimethylol urea, quaternary adamantane, hexamethylenetramine chloroallyl chloride, 1-(3-chloroallyl)-3,5,7-tri-aza-1-azoiadamantiane-chloride, N-(3-chloroallyl)-hexammonium chloride, bis-maleic anhydrides, genipin and carbodiimides beyond trace amounts not resulting in fixation, or does not comprise these compounds at all.

A "non-crosslinking fixative solution" in particular can be a fixative solution that does not comprise any crosslinking agents. A "non-crosslinking fixative solution" in particular can be a fixative solution that does not introduce crosslinks into the biological sample to be fixed. Non-crosslinking fixative solutions are clearly distinguished from cross-linking fixative solutions. They are also clearly distinguished from solutions comprising a mixture of crosslinking and non-crosslinking fixatives, for the mixture as a whole still has cross-linking activity. According to a highly preferred embodiment, the non-crosslinking fixative solution is a precipitating fixative solution, i.e. a fixative solution that attains fixation through the mechanism of precipitation.

Preferably, the non-crosslinking fixative solution comprises at least one alcohol and optionally at least one acid. The solution penetrates the biological sample and the alcohol precipitates and denatures proteins. The inclusion of acid results in a further improvement regarding preservation of sample morphology.

Examples of non-crosslinking fixative solutions were also described above in the background and include but are not limited to alcoholic fixatives like Carnoy's (60% ethanol, 30% chloroform, 10% acetic acid) or Methacarn (Carnoy's with the substitution of ethanol with methanol). Other more recently published fixatives based on alcohol consist of 70% ethanol (Gillespie et al., Am. J. Pathol. 2002; 160 (2): 449-457), 56% ethanol and 20% PEG (polyethylene glycol, Bostwick et al.; Arch. Pathol. Lab. Med. 1994; 118:298-302) or 90% methanol and 10% PEG300 (Vinvek et al., Lab. Investigation 2003; 83 (10): 1427-35). In addition, several patent applications disclose suitable non-crosslinking fixatives. In DE 199 28820 a fixative is described containing a mixture of different alcohols, acetone, PEG and acetic acid. In US 2003/0211452 A1 a fixative commercialised as "Umfix" is described containing at least 80% methanol and up to 20% PEG300 for preservation of RNA, DNA and morphology. Fixatives based on ethanol for preservation of molecular content and morphology are described in US 2005/0074422 A1 ("Finefix"), WO 2004/083369 ("RCL2®") and WO 05/121747 A1 ("Boonfix"). In US 2003/119049 a universal collection medium is described which is water based and comprises a buffer component, one alcohol, a fixative component and an agent to inhibit degradation. Suitable and highly preferred non-crosslinking fixative solutions are also described in US 2013/0095473 A1. Fixative solutions described therein are for example also commercially available as PAXGENE® Tissue FIX solution (PREANALYTIX®GmbH, Switzerland). Respective non-crosslinking fixative solutions can be used in the method according to the first aspect.

Preferably, the non-crosslinking fixative solution comprises at least one alcohol and optionally at least one acid.

Preferably, the non-crosslinking fixative solution comprises one or more aliphatic alcohols. The non-crosslinking fixative solution can comprise one or more aliphatic alcohols of the general formula $C_nH_{2n+1}OH$, wherein preferably, n is selected from the group consisting of 1-12, 1-5 and 1-4. It is still further preferred that the non-crosslinking fixative solution comprises methanol and/or ethanol as alcohol. Methanol and ethanol both have excellent fixing properties.

The non-crosslinking fixative solution can comprise alcohol as the major component (v/v).

The non-crosslinking fixative solution can comprise at least one acid. The acid can have a pKa value of from 2 to 12, preferably from 3.5 to 8, more preferably from 4 to 7.5. Weak acids are particularly useful because they are gentler and less corrosive than strong acids. The acid can be an organic acid. It can be a weak organic acid. For example, it can be selected from amino acids and carboxylic acids. Carboxylic acids such as formic acid, fumaric acid, maleic acid, tartaric acid, citric acid, acetic acid and propionic acid are well suited. The application of acetic acid, propionic acid or a mixture thereof has been found to yield good fixation results and is preferred.

Besides one or more alcohols, the non-crosslinking fixative solution can comprise one or more additives. Examples of suitable additives are non-alcoholic organic solvents, sugars, sugar alcohols, poly(oxyalkylene) polymers, diethyleneglycol monoethylether acetate (DEGMEA), and $C_2$ to $C_{12}$ polyols such as $C_2$ to $C_{12}$ diols and/or triols.

Accordingly, the non-crosslinking fixative solution can comprise at least one alcohol and one or more non-alcoholic organic solvents that can be selected from a halogenated hydrocarbon, preferably chloroform, and a ketone, preferably acetone.

As non-alcoholic organic solvents are only optionally comprised in the non-crosslinking fixative solution, the non-crosslinking fixative solution according to one embodiment does not comprise a halogenated hydrocarbon and/or a ketone, or does not comprise a non-alcoholic organic solvent. According to one embodiment, the non-crosslinking fixative solution does not comprise chloroform and/or acetone.

The non-crosslinking fixative solution can comprise at least one alcohol and one or more sugars, preferably wherein the sugar is selected from a monosaccharide and/or a disaccharide. The non-crosslinking fixative solution can comprise at least one alcohol and one or more sugar alcohols, preferably wherein the sugar alcohol is selected from sorbitol, mannitol and/or dulcitol. The non-crosslinking fixative solution can comprise at least one alcohol, one or more sugars and one or more sugar alcohols.

The non-crosslinking fixative solution can comprise at least one alcohol and one or more poly(oxyalkylene) polymers, preferably a poly(oxyethylene) polymer, more preferably polyethylene glycol (PEG), wherein optionally, the poly(oxyalkylene) polymer is comprised in the non-crosslinking fixative solution in a concentration selected from 1 to 20% (w/v), 2 to 15% (w/v) and 3 to 10% (w/v). If more than one poly(oxyalkylene) polymer is comprised, the percent values according to one embodiment refer to the combined values of all poly(oxyalkylene) polymers comprised.

The non-crosslinking fixative solution can comprise at least one alcohol and one or more poly(oxyalkylene) polymers having a molecular weight that lies in a range selected from 100 to 10000, 150 to 5000, 200 to 1000 and 250 to 500, wherein preferably the poly(oxyalkylene) polymer is polyethylene glycol (PEG).

The non-crosslinking fixative solution can comprise at least one alcohol and diethyleneglycol monoethylether acetate (DEGMEA).

The non-crosslinking fixative solution can comprise at least one alcohol and one or more $C_2$ to $C_{12}$ polyols, preferably a $C_2$ to $C_{12}$ diol and/or triol.

The non-crosslinking fixative solution can comprise one or more $C_2$ to $C_{12}$ polyols. The $C_2$ to $C_{12}$ polyol is preferably selected from the group consisting of 1,3-butanediol, 1,4-butanediol, 1,3-propanediol, 1,2-propanediol, 3-methyl-1,3,5-pentanetriol, 1,2,6-hexanetriol, glycerin and glycol, more preferably from the group consisting of 1,3-butanediol, 1,4-butanediol, 1,3-propanediol, 1,2-propanediol, 3-methyl-1,3,5-pentanetriol and 1,2,6-hexanetriol.

The non-crosslinking fixative solution can comprise the one or more $C_2$ to $C_{12}$ polyols in a concentration that lies in a range selected from 5 to 50% (v/v), 10 to 40% (v/v) and 15 to 35% (v/v). If more than one $C_2$ to $C_{12}$ polyol is comprised, the percent values according to one embodiment refer to the combined values of all $C_2$ to $C_{12}$ polyols comprised.

According to one embodiment, the non-crosslinking fixative solution comprises at least one alcohol, preferably methanol and/or ethanol and additionally comprises at least one polyethylene glycol and/or at least one acid.

It is highly preferred that the non-crosslinking fixative solution is non-aqueous. "Non-aqueous" as used herein in particular refers to a solution that essentially comprises no water, or comprises no water at all.

Accordingly, in a preferred embodiment that the non-crosslinking fixative solution is non-aqueous and comprises at least one alcohol in a concentration that lies in a range selected from 10 to 90% (v/v), 20 to 80% (v/v), 30 to 75% (v/v) and 40 to 70% (v/v), wherein preferably, the alcohol is methanol; and at least one acid. It may additionally comprise one or more additives. If more than one alcohol is comprised, the percent values according to one embodiment refer to the total concentration of all alcohols comprised.

In this preferred embodiment, the non-aqueous non-crosslinking fixative solution can comprise one or more non-alcoholic organic solvents, wherein preferably the non-alcoholic organic solvent is selected from a halogenated hydrocarbon, preferably chloroform, and a ketone, preferably acetone. The non-aqueous non-crosslinking fixative solution can comprise one or more poly(oxyalkylene) polymers, preferably a poly(oxyethylene) polymer, more preferably polyethylene glycol (PEG), wherein optionally the poly(oxyalkylene) polymer is comprised in the non-crosslinking fixative solution in a concentration selected from 1 to 20% (w/v), 2 to 15% (w/V) and 3 to 10% (w/v). The percent values can refer to the total concentration of all poly(oxyethylene) polymers comprised. The non-aqueous non-crosslinking fixative solution can comprise one or more poly(oxyalkylene) polymers having a molecular weight that lies in a range selected from 100 to 10000, 150 to 5000, 200 to 1000 and 250 to 500, wherein preferably the poly(oxyalkylene) polymer is polyethylene glycol (PEG). The non-aqueous non-crosslinking fixative solution can comprise diethyleneglycol monoethylether acetate (DEGMEA). The non-aqueous non-crosslinking fixative solution can comprise one or more $C_2$ to $C_{12}$ polyols, preferably a $C_2$ to $C_{12}$ diol and/or triol.

In this preferred embodiment, the non-crosslinking fixative solution can comprise an acid as described above, preferably a carboxylic acid. The non-crosslinking fixative solution can comprise at least one poly(oxyethylene) polymer as additive(s). The non-crosslinking fixative solution can comprise at least one $C_2$ to $C_{12}$ polyol, preferably a $C_2$ to $C_{12}$ diol and/or triol, as additive(s). The non-crosslinking fixative solution can comprise at least one poly(oxyethylene) polymer and at least one $C_2$ to $C_{12}$ polyol, preferably a $C_2$ to $C_{12}$ diol and/or triol, as additive(s). The non-crosslinking fixative solution can comprise polyethylene glycol and one or more $C_2$ to $C_{12}$ diols and/or triols, preferably selected from 1,3-butanediol, 1,4-butanediol, 1,3-propanediol, 1,2-propanediol, 3-methyl-1,3,5-pentanetriol, 1,2,6-hexanetriol, glycerin, or glycol, most preferably selected from 1,3-butanediol, 1,4-butanediol, 1,3-propanediol, 1,2-propanediol, 3-methyl-1,3,5-pentanetriol, and 1,2,6-hexanetriol.

The fixation of the biological sample with the non-crosslinking fixative solution can conveniently be carried out at ambient temperatures of about 4° C. to about 35° C., preferably about 8° C. to about 25° C., but is not limited to this range. Thus, advantageously, it is not required to immediately cool or freeze the sample for further processing after it has been contacted with the non-crosslinking fixative solution. However, as with all fixation methods it is advisable to begin fixation soon after the sample has been obtained. Preferably, fixation is started within less than two hours after the sample has been obtained. Shorter times such as one hour, 30 min, 15 min or immediate start of fixation may significantly improve the quality of the result obtained.

For fixation, the biological sample typically is incubated in the non-crosslinking fixative solution. The time required for fixation depends on the thickness of the sample and can be determined by the skilled person. The sample may be fixed e.g. at least about 2 min, at least about 5 min, at least about 10 min, at least about 30 min, at least about one hour, at least about two hours, at least about 24 hours or at least about 48 hours. The sample may be fixed e.g. from about 2 min to about 7 days, preferably for about 5 min to about 3 days, more preferably for about 10 min to about 48 h, most preferably for about 30 min to about 24 h. For core needle biopsies, a fixation time of about 30 min has been found convenient. During fixation, the non-crosslinking fixative solution can penetrate the biological sample, allowing the biological sample to be fixed.

As is also further described below, the fixed sample may also be stabilized.

Once the fixed sample is taken out of the non-crosslinking fixative solution, it is preferred to contact the fixed sample with the aqueous solution comprising a cryoprotectant or with the stabilizing solution, as desired, in a timely manner. This way, the quality of the biological components in the frozen sample to be prepared can be further improved. For example, it may be desirable to transfer the fixed sample, once taken out of the non-crosslinking fixative solution, into the aqueous solution comprising a cryoprotectant or into the stabilizing solution within 3 hours or less, within 2 hours or less, within 1 hour or less, within 30 min or less, within 15 min or less, within 10 min or less, within 5 min or less or within 2 min or less. According to a very preferred embodiment, the fixed sample, once taken out of the non-crosslinking fixative solution, is transferred into the stabilizing solution within 10 min or less, within 5 min or less, within 2 min or less or essentially immediately.

Incubating the Fixed Biological Sample in an Aqueous Solution Comprising a Cryoprotectant According to the present method, the fixed biological sample is incubated in an aqueous solution comprising one or more cryoprotectants.

An "aqueous solution" as used herein in the context of "an aqueous solution comprising a/one or more cryoprotectants" in particular refers to a solution comprising water, typically comprising water as the major component. Preferably, the aqueous solution does not comprise ethanol or methanol, more preferably, it does not comprise any aliphatic alcohol. The solution may be buffered, e.g. with a phosphate buffer. However, it is not required to use a buffer according to the present method and conveniently, the aqueous solution most preferably consists of water and one or more cryoprotectants.

The expression "aqueous solution comprising one or more cryoprotectants" designates the solution that is brought into contact with the fixed biological sample, which may optionally be a stabilized fixed sample, for incubation. Albeit the aqueous solution preferably does not comprise an aliphatic alcohol, it is understood that traces of alcohol may be introduced into the solution from the fixed biological sample itself, whereby a mixture of the aqueous solution with alcohol may be formed. However, it is desirable to minimize the amount of alcohol introduced. This can e.g. be achieved by dabbing the sample on an absorbent sheet prior to contacting it with the aqueous solution comprising the cryoprotectant.

It is important to use an aqueous solution for incubating the fixed sample, which may optionally be a stabilized fixed sample.

The present inventor has found that incubation in an aqueous solution comprising a cryoprotectant advantageously results in a homogenous and complete hardening of the sample during freezing, including snap-freezing applications, in which cryoprotectants typically are not employed in the prior art. Thereby, a frozen sample can be provided that is completely hardened. The incubation step confers significantly improved cutting characteristics in downstream applications, and in particular allows to prepare thin (e.g. about 8-10 μm) and ultrathin (e.g. about 2 μm) frozen sections of uniform thickness from the respectively frozen sample. On the other hand, because the method uses non-crosslinking fixative solutions, the effects of the fixative solution are considered to be at least partially reversible by incubation in an aqueous solution. In contrast to crosslinking fixatives such as formalin, permanent crosslinks are not introduced in the sample. Therefore, for example the precipitation of proteins by a precipitating fixative solution as an example of a non-crosslinking fixative solution was expected to be at least partially reverted during the incubation step, because the aqueous solution comprising the cryoprotectant dilutes and essentially washes out the fixative. Robust enzymes such as in particular RNAses can under such conditions refold to an active form. Therefore, it was highly surprising that despite incubation in an aqueous solution, biological components, including delicate components such as RNA, could be isolated with high quality and yield from the frozen samples prepared according to the present method, even after prolonged incubation of the samples, e.g. over night.

The aqueous solution used comprises the one or more cryoprotectants in a concentration that lies in a range selected from 5 to 50% (w/v), 10 to 45% (w/v), 15 to 40% (w/v) and 20 to 35% (w/v). Concentrations of 20-35% (w/v) have been found to work particularly well, about 30% (w/v) being a highly preferred concentration. If the aqueous solution used comprises more than one cryoprotectant, according to one embodiment the percent values refer to the combined values of all cryoprotectants comprised.

It is possible to incubate the fixed sample in aqueous solutions comprising increasing concentrations of cryoprotectants, such as e.g. a first incubation step in a solution comprising about 10% of cryoprotectant, followed by a second step in a solution comprising about 20% of cryoprotectant and a third step in a solution comprising about 30% of cryoprotectant. However, with the present method it is advantageously not required to stepwise increase in the concentration of cryoprotectant. With the present method, a frozen biological sample with excellent morphology can conveniently be prepared also by incubating the fixed sample at a given concentration of cryoprotectant in a single incubation step.

The cryoprotectant comprised in the aqueous solution can be selected from sugars such as monosaccharides and/or disaccharides, in particular sucrose, trehalose, dextrose, glycols such as glycerol, ethylene glycol and propylene glycol; 2-methyl-2,4-pentanediol, polyethylene glycol (PEG), polyvinylpyrrolidone (PVP), formamide, dimethyl formamide, and DMSO.

Preferably, the cryoprotectant comprises or consists of one or more sugars such as monosaccharides and/or disaccharides, in particular sucrose, trehalose and/or dextrose. Most preferably, the cryoprotectant comprises or consists of sucrose.

The present method allows for the preservation of RNA in high amount and quality in the frozen sample. To further improve RNA preservation, advantageously the aqueous solution comprising the cryoprotectant is RNAse-free. The fixed biological sample can be incubated under RNAse-free conditions, typically meaning that RNAse-free materials and working techniques are applied.

During incubation, the cryoprotectant can penetrate the fixed biological sample whereby the biological sample becomes cryoprotected.

The fixed biological sample can be incubated in the aqueous solution comprising the cryoprotectant for about 1 to about 72 hours, preferably from about 6 to about 48 hours, more preferably for about 8 to about 24 hours, most preferably for about 12 hours. The fixed biological sample can be incubated until the biological sample sinks. Thus, according to one embodiment, the sample is incubated in a vessel and the biological sample is incubated until the biological sample sinks to the bottom of the vessel. Some tissue types (e.g., lung tissue) do not sink. In such cases, incubation for longer periods, e.g. overnight incubation is sufficient. Suitable incubation times can be determined by the skilled person.

The present method conveniently allows for a broad range of incubation temperatures. The fixed biological sample can be incubated at about 2° C. to about 35° C. or at about 2° C. to about 25° C.

Preferably, the sample is incubated at about 2° C. to about 8° C., more preferably at about 4° C.

Freezing the Cryoprotected Biological Sample

The present method further comprises freezing the cryoprotected biological sample. Prior to freezing, the sample may be dabbed on an absorbent sheet to remove excess aqueous solution comprising cryoprotectant.

Typically, once the cryoprotected sample is removed from the aqueous solution comprising the cryoprotectant, it is preferred that the sample proceeds to freezing in a timely manner. Preferably, freezing is initiated within 30 min or less, within 15 min or less, within 10 min or less, within 5 min or less or within 2 min or less after the cryoprotected sample is removed from the aqueous solution comprising the cryoprotectant.

Preferably, the cryoprotected biological sample is frozen at about −60° C. to about −196° C.

The cryoprotected biological sample can be frozen in liquid nitrogen or in a pre-cooled liquid cryogen such as isobutene, 2-methylbutane, propane, ethane, halocarbon, preferably pre-cooled 2-methylbutane. Pre-cooling the liquid cryogen ensures rapid freezing of the sample. The pre-cooled liquid cryogen, such as 2-methylbutane, can be pre-cooled to at least about-60° C., preferably to about −60° C. to about −160° C. The pre-cooled liquid cryogen, such as 2-methylbutane, is more preferably pre-cooled to about −60° C. Dry ice can be used for pre-cooling, e.g. for pre-cooling to about −60° C. Liquid nitrogen can be used for precooling, e.g. for pre-cooling to about −160° C.

Snap-freezing of the sample is preferred over slow freezing techniques, as quick and uniform freezing results in optimal preservation of morphology and biological components. "Snap-freezing" as used herein can in particular comprise the substantially immediate and uniform freezing of a sample mediated by an appropriate freezing medium and freezing technique. For example, snap-freezing can be achieved by liquid nitrogen or liquid cryogens, of which 2-methylbutane, preferably pre-cooled to about −60° C., has been found very useful for preserving sample morphology. Freezing is more rapid upon immersion in the liquid phase of liquid nitrogen as compared to freezing in the gas phase of liquid nitrogen and therefore immersion in the liquid phase is preferred over the latter.

The present method may consist of the aforementioned steps, but may also comprise further steps. Preferred further steps are detailed below.

Embedding of the cryoprotected biological sample with a cryo-embedding material Optionally, the cryoprotected biological sample can be embedded with a cryo-embedding material. Albeit this step is not required for the preparation of a frozen biological sample as such, it facilitates the downstream processing of the frozen biological sample, in particular the preparation of sections for further analysis.

The cryo-embedding material is not particularly limited and can be one of the cryo-embedding materials known in the art, such as but not limited to FSC22® Frozen Section Compound (LEICA® Biosystems, Germany) or PELCO® Cryo-Embedding Compound (Ted Pella Inc., CA, USA). The cryo-embedding material can be a cryo-solidifiable embedding material, such as but not limited to TISSUE-TEK® O.C.T. Compound (Sakura Finetek, Germany). A "cryosolidifiable" embedding material is an embedding material that becomes solid when frozen.

Cryo-embedding is a step separate from incubating the fixed biological sample in an aqueous solution comprising a cryoprotectant. If the particularly advantageous cryo-embedding step is performed, it is carried out after the step of incubating the fixed biological sample in the aqueous solution comprising the cryoprotectant.

Preferably, the embedding is performed simultaneous with or after freezing the cryoprotected biological sample.

According to one embodiment, embedding is carried out within one minute or less, more preferably within 30 seconds or less, or within 10 seconds or less.

The present inventor has found that when an embedding step is performed, sample morphology can further be significantly improved by embedding the cryoprotected sample only after the sample has been frozen in case a pre-cooled liquid cryogen has been used for freezing. This applies in particular to samples frozen in pre-cooled 2-methylbutane. Of course, when embedding the sample after it has been frozen, care should be taken to avoid complete or partial thawing of the sample during the embedding process, in order to avoid a reduction in sample quality.

Therefore, according to one embodiment, the cryoprotected biological sample is frozen in pre-cooled 2-methylbutane, preferably wherein the 2-methylbutane is pre-cooled to about −60° C. to about −160° C., more preferably to about −60° C., and the frozen sample thereafter is placed in the cryo-embedding material and is embedded in a frozen state. It is preferred that the cryo-embedding material is a cryo-solidifiable material. It is also preferred that the cryo-embedding material is pre-cooled. This ensures that the sample does not thaw during embedding. The cryo-embedding material can e.g. be pre-cooled by filling a cryomold with the cryo-embedding material and immersing the mold in pre-cooled 2-methylbutane such that the pre-cooled 2-methylbutane does not flood the cryo-embedding material. More preferably, the cryo-embedding material is a cryo-solidifiable material that is pre-cooled. In this case, the sample is embedded in the pre-cooled material before the material has solidified.

An exemplary work-flow is shown in FIG. 1. Accordingly, the fixed and (e.g. PAXGENER Tissue) cryoprotected sample, such as a fixed and cryoprotected tissue sample, can be snap-frozen in pre-cooled 2-methylbutane, a cryo-embedding material can filled in a cryo-mold and be pre-cooled (e.g. in 2-methylbutane), and the sample can then be submerged in the cryo-embedding material. A specimen disc can be placed on top of the cryo-embedded sample and the cryomold with the sample can then be completely submerged into the 2-methylbutane.

In case liquid nitrogen has been used for freezing, it is likewise possible to embed the sample after freezing, as described above in relation with pre-cooled liquid cryogens such as 2-methylbutane. Preferably, pre-cooled liquid cryogens such as 2-methylbutane are used in this case, as described above. In the alternative the cryo-embedding material can be pre-cooled e.g. in the gas-phase of the liquid nitrogen.

However, for liquid nitrogen it was found that the cryoprotected sample advantageously can also be simultaneously embedded and frozen with comparable morphology as for embedding after freezing.

Thus, according to one embodiment, the cryoprotected biological sample is placed in the cryo-embedding material and is frozen in liquid nitrogen, whereby the cryoprotected biological sample is simultaneously embedded and frozen. It is preferred that the cryo-embedding material is a cryo-solidifiable material. Preferably, the cryo-embedding material is contained in a cryo-mold and the cryo-mold is placed into liquid nitrogen, so as to ensure direct contact between the cryomold and the liquid phase of the liquid nitrogen for more rapid freezing, preferably wherein the liquid nitrogen does not flood the cryo-embedding medium.

According to one embodiment, the cryomold is held into the liquid phase of the liquid nitrogen, e.g. with forceps (also shown in FIG. 2). Without wishing to be bound by theory, even better results were obtained when it was ensured that the liquid nitrogen does not flood the cryo-embedding medium than e.g. when allowing the cryomold to sink whereby the liquid nitrogen floods the cryo-embedding medium.

An exemplary work-flow is shown in FIG. 2. Accordingly, the fixed (e.g. PAXGENER Tissue) and cryoprotected sample, such as a fixed and cryoprotected tissue sample, can be submerged in cryo-embedding material filled in a cryomold. A specimen disc can then be placed on top of the sample. The sample can then be snap-frozen by placing the cryomold with sample and specimen disc in liquid nitrogen.

According to one embodiment, the present method does not comprise embedding the sample with paraffin.

Stabilizing the Biological Sample with a Stabilizing Solution

Optionally, the biological sample can be stabilized with a stabilizing solution prior to incubating the biological sample in the aqueous solution comprising the cryoprotectant.

If the optional stabilization step is performed, then this is typically and preferably performed after fixing the biological sample in the non-crosslinking fixative solution. A stabilization step can for example advantageously be applied where it is intended to store the sample after fixation and prior to incubation in the aqueous medium comprising the cryoprotectant. It may be desirable to do so where it is intended to keep the sample in a non-frozen state for a given time, e.g. in order to finish the collection of further samples for subsequent batch processing or during shipping of samples to a freezing facility.

Albeit it is also possible to store the sample in the fixative solution prior to performing subsequent method steps, it is preferred to contact the sample with and e.g. store the fixed sample in a stabilizing solution. This may be desirable to further improve preservation of sensitive components such as RNA. Stabilizing the biological sample supports to inhibit the degradation, the modification, the induction or the change in the activity of biomolecules. Also, stabilizing the biological sample preferably assists to prevent a significant change in the morphology of the sample.

The stabilizing solution preferably is a non-crosslinking stabilizing solution, more preferably a precipitating stabilizing solution. A "non-crosslinking stabilizing solution" as used herein is a stabilizing solution that does not comprise formaldehyde, formalin, paraformaldehyde, glutaraldehyde and glyoxal beyond trace amounts not resulting in stabilization, or does not comprise formaldehyde, formalin, paraformaldehyde, glutaraldehyde and glyoxal at all. A "non-crosslinking stabilizing solution" is according to one embodiment a stabilizing solution that does not comprise an aldehyde beyond trace amounts not resulting in stabilization, or does not comprise an aldehyde at all.

A "non-crosslinking stabilizing solution" in particular can be a stabilizing solution that besides formaldehyde, formalin, paraformaldehyde, glutaraldehyde and glyoxal does not comprise imidazolidinyl urea, diazolidinyl urea, 2-bromo-2-nitropropane-1,3-diol, tris(hydroxymethyl) nitromethane, hydroxymethylglycinate, dimethylol-5,5-dimethylhydantoin, 1,3-Bis(hydroxymethyl)-5,5-dimethylhydantoin, dimethylol urea, quaternary adamantane, hexamethylenetetramine chloroallyl chloride, 1-(3-chloroallyl)-3,5,7-tri-aza-1-azoiadamantiane-chloride, and N-(3-chloroallyl)-hexammonium chloride beyond trace amounts not resulting in stabilization, or does not comprise these compounds at all.

A "non-crosslinking stabilizing solution" in particular can be a stabilizing solution that does not comprise a formaldehyde releasing agent beyond trace amounts not resulting in stabilization, or does not comprise a formaldehyde releasing agent at all.

A "non-crosslinking stabilizing solution" in particular can be a stabilizing solution that besides formaldehyde, formalin, paraformaldehyde, glutaraldehyde and glyoxal does neither comprise bis-maleic anhydrides beyond trace amounts not resulting in stabilization, or does not comprise these compounds at all. Also, a "non-crosslinking stabilizing solution" in particular can be a stabilizing solution that besides formaldehyde, formalin, paraformaldehyde, glutaraldehyde and glyoxal does neither comprise genipin and carbodiimides beyond trace amounts not resulting in stabilization, or does not comprise these compounds at all. Bis-maleic anhydrides, genipin and carbodiimides are not amongst the crosslinking agents that are typically used for the stabilization of biological samples, e.g. tissue. However, it may be desirable that the non-crosslinking stabilizing solution does not comprise these compounds beyond trace amounts not resulting in stabilization, or does not comprise these compounds at all.

According to a preferred embodiment, the non-crosslinking stabilizing solution besides formaldehyde, formalin, paraformaldehyde, glutaraldehyde and glyoxal does neither comprise imidazolidinyl urea, diazolidinyl urea, 2-bromo-2-nitropropane-1,3-diol, tris(hydroxymethyl) nitromethane, hydroxymethylglycinate, dimethylol-5,5-dimethylhydantoin, 1,3-Bis(hydroxymethyl)-5,5-dimethylhydantoin, dimethylol urea, quaternary adamantane, hexamethylenetetramine chloroallyl chloride, 1-(3-chloroallyl)-3,5,7-tri-aza-1-azoiadamantiane-chloride, N-(3-chloroallyl)-hexammonium chloride, bis-maleic anhydrides, genipin and carbodiimides beyond trace amounts not resulting in stabilization, or does not comprise these compounds at all.

A "non-crosslinking stabilizing solution" in particular can be a stabilizing solution that does not comprise any crosslinking agents. A "non-crosslinking stabilizing solution" in particular can be a stabilizing solution that does not introduce crosslinks into the biological sample to be stabilized.

According to one embodiment, the stabilizing solution is a non-crosslinking stabilizing solution and comprises at least one alcohol.

Suitable and highly preferred stabilizing solutions are described in US 2013/0095473 A1. Stabilizing solutions described therein are for example also commercially available as PAXGENE® Tissue STABILIZER solution (PREANALYTIX® GmbH, Switzerland).

The at least one alcohol can be an aliphatic alcohol. The stabilizing solution can comprise one or more aliphatic alcohols of the general formula $CH_{2n+1}OH$, wherein preferably, n is selected from the group consisting of 1-12, 1-5 and 1-4. The stabilizing solution can comprise methanol and/or ethanol as alcohol. Preferably it comprises ethanol. Preferably, it does not comprise methanol. Ethanol is less toxic than methanol and therefore well suited for stabilizing the sample. The stabilizing solution can comprise alcohol as the major component (v/v). The stabilizing solution can comprise the at least one alcohol, preferably ethanol, in a concentration that lies in a range selected from 10 to 99% (v/v), 20 to 90% (v/v), 30 to 85% (v/v), 40 to 80% (v/v) and 50 to 80% (v/v). If the stabilizing solution comprises more than one alcohol, according to one embodiment the percent values refer to the combined values of all alcohols comprised.

As for the fixative solution, also the stabilizing solution preferably is non-aqueous.

The stabilizing solution, which preferably is non-aqueous, can comprise at least one additive. Preferably, the at least one additive is a $C_2$ to $C_{12}$ polyol, preferably a $C_2$ to $C_{12}$ diol and/or triol. The $C_2$ to $C_{12}$ polyol can be selected from the group consisting of 1,3-butanediol, 1,4-butanediol, 1,3-propanediol, 1,2-propanediol, 3-methyl-1,3,5-pentanetriol and 1,2,6-hexanetriol. The stabilizing solution can comprise at least one $C_2$ to $C_{12}$ polyol in a concentration that lies in a range selected from 5 to 50% (v/v), 10 to 40% (v/v) and 15 to 35% (v/v). If the stabilizing solution comprises more than one $C_2$ to $C_{12}$ polyol, according to one embodiment the percent values refer to the combined values of all $C_2$ to $C_{12}$ polyols comprised.

Once a stabilized sample is taken out of the stabilizing solution, it is preferred to proceed with the next method step in a timely manner. For example, it may be desirable to transfer a fixed and stabilized sample, once taken out of the stabilizing solution, into the aqueous solution comprising a cryoprotectant within 3 hours or less, within 2 hours or less, within 1 hour or less, within 30 min or less, within 15 min or less, within 10 min or less, within 5 min or less or within 2 min or less or essentially immediately.

Storing of the Frozen Biological Sample

The method can optionally comprise a step of storing the frozen biological sample. The frozen biological sample can be an embedded sample, as described above. However, embedding is not required and the frozen sample can also be stored in an unembedded state.

The sample can be stored e.g. at a temperature of about -20 to ~196° C. Thus, the frozen biological samples prepared according to the present invention can be stored at very low temperatures, for example in liquid nitrogen. However, the frozen samples can also be stored a considerably higher temperatures, of about −20° C. to about −90° C. that are achieved with standard laboratory freezers. Thus, sophisticated freezing equipment and in particular access to liquid nitrogen storage space is not required to store frozen samples prepared according to the present method. This is a logistical and economic advantage, for storage in liquid nitrogen is more expensive and not always accessible. Preferably, the samples are stored at about −70° C. to about −90° C., more preferably at −80° C.

The frozen biological sample can be stored e.g. for at least about 1 week, at least about 1 month, at least about 6 month, at least about 1 year, at least about 2 years, at least about 3 years, or longer.

Further Optional Steps

The method can further comprise a step of isolating and/or analyzing at least one biological component contained in the biological sample. The biological component can be selected from nucleic acids, proteins, including but not limited to phosphoproteins, peptides peptide nucleic acids, and/or metabolites and preferably is a nucleic acid selected from DNA and RNA.

Isolation and analysis can be performed using standard procedures.

The biological component can be isolated after freezing and optionally embedding the cryoprotected sample. Also, the biological component can be analyzed after freezing and optionally embedding the cryoprotected sample. Albeit for many applications, a biological component is isolated prior to analysis, it is also contemplated to analyze the biological component in situ, e.g. using hybridization or staining techniques.

Advantageously, biological components can be isolated from the frozen samples according to the present invention in high purity and yield, and without the chemical modifications introduced by cross-linking fixatives such as formalin. Therefore, the biological components isolated from samples prepared according to the present method are well suited for further analysis and can also be successfully subjected to very sensitive downstream applications such as e.g. quantitative real time PCR and next generation sequencing (NGS).

With the present method, not only biological components, but also morphology of the sample can be well-preserved. It is possible to isolate biological components with high precision from parts of the sample that are of particular interest. For example, due to their well-preserved morphology, the frozen samples obtained with the present method allow for regional microdissection with high accuracy.

According to one embodiment, the method further comprises preparing sections after freezing and/or embedding the sample. Typically, the sections are prepared from the frozen sample. This can be done using a standard cryostat. As the samples prepared according to the present method are uniformly and completely frozen and therefore hardened, even ultrathin sections of uniform thickness can easily be prepared. Preferably, the sections are mounted on slides.

Adhesive coated slides have been found very useful. The sections can be used for isolation and/or analysis of biological components. Of course, the sections can also be used e.g. for analyzing sample morphology.

According to one embodiment, the method further comprises performing a morphological analysis of the biological sample. The morphological analysis can be performed after freezing and/or embedding the biological sample. The morphological analysis can comprise performing a histological and/or cytological analysis of the biological sample. The morphological analysis can comprise conventional staining such as but not limited to staining with hematoxylin and eosin, immune-histochemical staining or in situ hybridization. It can be followed by microscopy and/or dissection.

Particular Embodiments

For all embodiments of the method disclosed herein, it is highly preferred that the biological sample is not exposed to the crosslinking agents formalin, formaldehyde, paraformaldehyde, glutaraldehyde and glyoxal. It is also highly preferred that the biological sample further is not exposed to imidazolidinyl urea, diazolidinyl urea, 2-bromo-2-nitropropane-1,3-diol, tris(hydroxymethyl) nitromethane, hydroxymethylglycinate, dimethylol-5,5-dimethylhydantoin, 1,3-Bis(hydroxymethyl)-5,5-dimethylhydantoin, dimethylol urea, quaternary adamantane, hexamethylenetetramine chloroallyl chloride, 1-(3-chloroallyl)-3,5,7-tri-aza-1-azoiadamantiane-chloride, and N-(3-chloroallyl)-hexammonium. It is also highly preferred that the biological sample further is not exposed to bis-maleic anhydrides. It is also highly preferred that the biological sample further is not exposed to genipin and carbodiimides. Most preferably, the biological sample is not exposed to the crosslinking agents formalin, formaldehyde, paraformaldehyde, glutaraldehyde, glyoxal, and is not exposed to imidazolidinyl urea, diazolidinyl urea, 2-bromo-2-nitropropane-1,3-diol, tris(hydroxymethyl) nitromethane, hydroxymethylglycinate, dimethylol-5,5-dimethylhydantoin, 1,3-Bis(hydroxymethyl)-5, 5-dimethylhydantoin, dimethylol urea, quaternary adamantane, hexamethylenetetramine chloroallyl chloride, 1-(3-chloroallyl)-3,5,7-tri-aza-1-azoiadamantiane-chloride, N-(3-chloroallyl)-hexammonium, bis-maleic anhydrides, genipin and carbodiimides.

The skilled person will understand that accordingly, not only the fixation and optional stabilization step, but the entire method is preferably performed without these cross-linking agents. It is even more preferred that the sample is not exposed to any cross-linking agent. Accordingly, it is highly preferred that the frozen sample prepared with the present method has not been exposed to a crosslinking agent.

Particularly preferred embodiments of the method of preparing a frozen biological sample according to the first aspect are described again in the following. In all of the embodiments, it is preferred that the sample comprises or consists of tissue.

According to one embodiment, the method comprises:
fixing the biological sample with a non-crosslinking fixative solution, wherein the non-crosslinking fixative solution is non-aqueous and comprises:
  a. at least one alcohol in a concentration that lies in a range selected from 10 to 90% (v/v), 20 to 80% (v/v), 30 to 75% (v/v) and 40 to 70% (v/v), wherein preferably, the alcohol is methanol;
  b. at least one acid; and
  c. one or more additives selected from:
    i. a non-alcoholic organic solvent, wherein preferably the non-alcoholic organic solvent is selected from a halogenated hydrocarbon, preferably chloroform, and a ketone, preferably acetone;
    ii. a poly(oxyalkylene) polymer, preferably a poly(oxyethylene) polymer, more preferably polyethylene glycol (PEG), wherein optionally the poly(oxyalkylene) polymer is comprised in the non-crosslinking fixative solution in a concentration selected from 1 to 20% (w/v), 2 to 15% (w/v) and 3 to 10% (w/V);
    iii. a poly(oxyalkylene) polymer having a molecular weight that lies in a range selected from 100 to 10000, 150 to 5000, 200 to 1000 and 250 to 500, wherein preferably the poly(oxyalkylene) polymer is polyethylene glycol (PEG);
    iv. diethyleneglycol monoethylether acetate (DEGMEA); and/or
    V. a $C_2$ to $C_{12}$ polyol, preferably a $C_2$ to $C_{12}$ diol and/or triol,
optionally stabilizing the fixed biological sample, wherein the stabilizing solution is a non-crosslinking non-aqueous stabilizing solution and comprises at least one alcohol, wherein the stabilizing solution has one or more of the following characteristics:
  a. the at least one alcohol is an aliphatic alcohol;
  b. the stabilizing solution comprises one or more aliphatic alcohols of the general formula $C_nH_{2n+1}OH$, wherein preferably, n is selected from the group consisting of 1-12, 1-5 and 1-4;
  c. the stabilizing solution comprises methanol and/or ethanol as alcohol, preferably ethanol;
  d. the stabilizing solution comprises alcohol as the major component (v/v);
  e. the stabilizing solution comprises the at least one alcohol, preferably ethanol, in a concentration that lies in a range selected from 10 to 99% (v/v), 20 to 90% (v/v), 30 to 85% (v/v), 40 to 80% (v/v) and 50 to 80% (v/v); and/or
  f. the stabilizing solution does not comprise methanol;

wherein the stabilizing solution further comprises at least one additive that is a $C_2$ to $C_{12}$ polyol, preferably a $C_2$ to $C_{12}$ diol and/or triol, wherein
  g. the $C_2$ to $C_{12}$ polyol is selected from the group consisting of 1,3-butanediol, 1,4-butanediol, 1,3-propanediol, 1,2-propanediol, 3-methyl-1,3,5-pentanetriol and 1,2,6-hexanetriol and/or
  h. the stabilizing solution comprises the at least one $C_2$ to $C_{12}$ polyol in a concentration that lies in a range selected from 5 to 50% (v/v), 10 to 40% (v/v) and 15 to 35% (v/v).
incubating the fixed and optionally stabilized biological sample in an aqueous solution comprising a cryoprotectant selected from sugars such as monosaccharides and/or disaccharides, in particular sucrose, trehalose, dextrose, glycols such as glycerol, ethylene glycol and propylene glycol, 2-methyl-2,4-pentanediol, polyethylene glycol (PEG), polyvinylpyrrolidone (PVP), formamide, dimethyl formamide, and DMSO, wherein preferably the cryoprotectant comprises or consists of one or more sugars, more preferably sucrose, trehalose and/or dextrose, most preferably wherein the cryoprotectant comprises or consists of sucrose, and/or wherein the aqueous solution comprises the cryoprotectant in a concentration that lies in a range selected from 5 to 50% (w/v), 10 to 45% (w/v), 15 to 40% (w/v) and 20 to 35% (w/v), most preferably wherein the concentration is about 30% (w/v), and
freezing the cryoprotected biological sample at about −60° C. to about −196° C.
It is also preferred that the method comprises:
fixing the biological sample with a non-crosslinking fixative solution, wherein the non-crosslinking fixative solution is non-aqueous and comprises:
  a. at least one alcohol in a concentration that lies in a range selected from 10 to 90% (v/v), 20 to 80% (v/v), 30 to 75% (v/v) and 40 to 70% (v/v), wherein preferably, the alcohol is methanol;
  b. at least one acid, preferably a carboxylic acid;
  c. one or more additives selected from:
    i. at least one poly(oxyethylene) polymer and/or at least one $C_2$ to $C_{12}$ polyol, preferably a $C_2$ to $C_{12}$ diol and/or triol as additive(s);
    ii. polyethylene glycol and one or more $C_2$ to $C_{12}$ diols and/or triols, preferably selected from 1,3-butanediol, 1,4-butanediol, 1,3-propanediol, 1,2-propanediol, 3-methyl-1,3,5-pentanetriol, 1,2,6-hexanetriol, glycerin, or glycol, most preferably selected from 1,3-butanediol, 1,4-butanediol, 1,3-propanediol, 1,2-propanediol, 3-methyl-1,3,5-pentanetriol, and 1,2,6-hexanetriol,
optionally stabilizing the fixed biological sample, wherein the stabilizing solution is a non-crosslinking non-aqueous stabilizing solution and comprises at least one alcohol, wherein the stabilizing solution has one or more of the following characteristics:
  a. the at least one alcohol is an aliphatic alcohol;
  b. the stabilizing solution comprises one or more aliphatic alcohols of the general formula $C_nH_{2n+1}OH$, wherein preferably, n is selected from the group consisting of 1-12, 1-5 and 1-4;
  c. the stabilizing solution comprises methanol and/or ethanol as alcohol, preferably ethanol;
  d. the stabilizing solution comprises alcohol as the major component (v/v);
  e. the stabilizing solution comprises the at least one alcohol, preferably ethanol, in a concentration that lies in a range selected from 10 to 99% (v/v), 20 to 90% (v/v), 30 to 85% (v/v), 40 to 80% (v/v) and 50 to 80% (v/v); and/or
  f. the stabilizing solution does not comprise methanol;
wherein the stabilizing solution further comprises at least one additive that is a $C_2$ to $C_{12}$ polyol selected from the group consisting of 1,3-butanediol, 1,4-butanediol, 1,3-propanediol, 1,2-propanediol, 3-methyl-1,3,5-pentanetriol and 1,2,6-hexanetriol in a concentration that lies in a range selected from 5 to 50% (v/v), 10 to 40% (v/v) and 15 to 35% (v/v),
incubating the fixed and optionally stabilized biological sample in an aqueous solution comprising a cryoprotectant selected from sugars such monosaccharides or disaccharides, in particular sucrose, trehalose, dextrose, glycols such as glycerol, ethylene glycol and propylene glycol, 2-methyl-2,4-pentanediol, polyethylene glycol (PEG), polyvinylpyrrolidone (PVP), formamide, dimethyl formamide, and DMSO, wherein preferably the cryoprotectant comprises or consists of one or more sugars, more preferably sucrose, trehalose and/or dextrose, most preferably wherein the cryoprotectant comprises or consists of sucrose, and wherein the aqueous solution comprises the cryoprotectant in a concentration that lies in a range selected from 15 to 40% (w/v) and 20 to 35% (w/), most preferably wherein the concentration is about 30% (w/v), and
freezing the cryoprotected biological sample at about −60° C. to about −196° C. in liquid nitrogen or in a pre-cooled liquid cryogen such as isobutene, 2-methylbutane, propane, ethane, halocarbon, preferably pre-cooled 2-methylbutane, preferably wherein the pre-cooled liquid cryogen such as 2-methylbutane is pre-cooled to about −60° C. to about-160° C., more preferably to about −60° C.
It is also preferred that the method comprises:
fixing the biological sample with a non-crosslinking fixative solution, wherein the non-crosslinking fixative solution is non-aqueous and comprises:
  a. at least one alcohol in a concentration that lies in a range selected from 10 to 90% (v/v), 20 to 80% (v/v), 30 to 75% (v/v) and 40 to 70% (v/v), wherein preferably, the alcohol is methanol;
  b. at least one acid that is a carboxylic acid;
  c. one or more additives selected from:
    i. at least one poly(oxyethylene) polymer and/or at least one $C_2$ to $C_{12}$ polyol, preferably a $C_2$ to $C_{12}$ diol and/or triol as additive(s);
    ii. polyethylene glycol and one or more $C_2$ to $C_{12}$ diols and/or triols, preferably selected from 1,3-butanediol, 1,4-butanediol, 1,3-propanediol, 1,2-propanediol, 3-methyl-1,3,5-pentanetriol, 1,2,6-hexanetriol, glycerin, or glycol, most preferably selected from 1,3-butanediol, 1,4-butanediol, 1,3-propanediol, 1,2-propanediol, 3-methyl-1,3,5-pentanetriol, and 1,2,6-hexanetriol,
optionally stabilizing the fixed biological sample, wherein the stabilizing solution is a non-crosslinking non-aqueous stabilizing solution and comprises at least one alcohol, wherein the stabilizing solution has one or more of the following characteristics:
  a. the at least one alcohol is an aliphatic alcohol;
  b. the stabilizing solution comprises one or more aliphatic alcohols of the general formula $C_nH_{2n+1}OH$, wherein preferably, n is selected from the group consisting of 1-12, 1-5 and 1-4;

c. the stabilizing solution comprises methanol and/or ethanol as alcohol, preferably ethanol;
d. the stabilizing solution comprises alcohol as the major component (v/v);
e. the stabilizing solution comprises the at least one alcohol, preferably ethanol, in a concentration that lies in a range selected from 10 to 99% (v/v), 20 to 90% (v/v), 30 to 85% (v/v), 40 to 80% (v/v) and 50 to 80% (v/v); and/or
f. the stabilizing solution does not comprise methanol;
wherein the stabilizing solution further comprises at least one additive that is a $C_2$ to $C_{12}$ polyol selected from the group consisting of 1,3-butanediol, 1,4-butanediol, 1,3-propanediol, 1,2-propanediol, 3-methyl-1,3,5-pentanetriol and 1,2,6-hexanetriol in a concentration that lies in a range selected from 5 to 50% (v/v), 10 to 40% (v/v) and 15 to 35% (v/V),
incubating the fixed and optionally stabilized biological sample in an aqueous solution comprising a cryoprotectant selected from sugars such monosaccharides and/or disaccharides, in particular sucrose, trehalose, dextrose or a combination thereof, most preferably sucrose, in a concentration that lies in a range selected from 15 to 40% (w/V) and 20 to 35% (w/v), most preferably wherein the concentration is about 30% (w/v), and
freezing the cryoprotected biological sample at about −60° C. to about −196° C. in liquid nitrogen or in pre-cooled 2-methylbutane, preferably wherein the 2-methylbutane is pre-cooled to about −60° C. to about −160° C., more preferably to about −60° C.

It is also preferred that the method comprises:
fixing the biological sample with a non-crosslinking fixative solution, wherein the non-crosslinking fixative solution is non-aqueous and comprises:
a. at least one alcohol in a concentration that lies in a range selected from 10 to 90% (v/v), 20 to 80% (v/v), 30 to 75% (v/v) and 40 to 70% (v/v), wherein preferably, the alcohol is methanol;
b. at least one acid that is a carboxylic acid, preferably selected from acetic acid, propionic acid or a mixture thereof;
c. one or more additives selected from:
  i. at least one poly(oxyethylene) polymer and/or at least one $C_2$ to $C_{12}$ polyol, preferably a $C_2$ to $C_{12}$ diol and/or triol as additive(s);
  ii. polyethylene glycol and one or more $C_2$ to $C_{12}$ diols and/or triols, preferably selected from 1,3-butanediol, 1,4-butanediol, 1,3-propanediol, 1,2-propanediol, 3-methyl-1,3,5-pentanetriol, 1,2,6-hexanetriol, glycerin, or glycol, most preferably selected from 1,3-butanediol, 1,4-butanediol, 1,3-propanediol, 1,2-propanediol, 3-methyl-1,3,5-pentanetriol, and 1,2,6-hexanetriol,
optionally stabilizing the fixed biological sample, wherein the stabilizing solution is a non-crosslinking non-aqueous stabilizing solution and comprises at least one alcohol, wherein the stabilizing solution has one or more of the following characteristics:
a. the at least one alcohol is an aliphatic alcohol;
b. the stabilizing solution comprises one or more aliphatic alcohols of the general formula $C_nH_{2n+1}OH$, wherein preferably, n is selected from the group consisting of 1-12, 1-5 and 1-4;
c. the stabilizing solution comprises methanol and/or ethanol as alcohol, preferably ethanol;
d. the stabilizing solution comprises alcohol as the major component (v/v);
e. the stabilizing solution comprises the at least one alcohol, preferably ethanol, in a concentration that lies in a range selected from 10 to 99% (v/v), 20 to 90% (v/v), 30 to 85% (v/v), 40 to 80% (v/v) and 50 to 80% (v/v); and/or
f. the stabilizing solution does not comprise methanol;
wherein the stabilizing solution further comprises at least one additive that is a $C_2$ to $C_{12}$ polyol selected from the group consisting of 1,3-butanediol, 1,4-butanediol, 1,3-propanediol, 1,2-propanediol, 3-methyl-1,3,5-pentanetriol and 1,2,6-hexanetriol in a concentration that lies in a range selected from 5 to 50% (v/v), 10 to 40% (v/v) and 15 to 35% (v/V),
incubating the fixed and optionally stabilized biological sample in an aqueous solution comprising a cryoprotectant selected from sucrose, trehalose, dextrose or a combination thereof, most preferably sucrose, in a concentration that lies in a range selected from 15 to 40% (w/v) and 20 to 35% (w/v), most preferably wherein the concentration is about 30% (w/v), wherein the sample is incubated for about 6 to about for about 8 to about 24 hours, most preferably for about 12 hours and at about 2° C. to about 25° C., at about 4° C.;
freezing, preferably snap-freezing, the cryoprotected biological sample at about −60° C. to about −196° C. in liquid nitrogen or in pre-cooled 2-methylbutane, preferably wherein the 2-methylbutane is pre-cooled to about −60° C. to about −160° C., more preferably to about −60° C., and
embedding the cryoprotected biological sample with a cryo-embedding material, wherein the embedding is performed simultaneous with or after freezing the cryoprotected biological sample.

All of the above embodiments preferably further comprise isolating and/or analyzing at least one biological component contained in the biological sample after freezing and optionally embedding the cryoprotected sample, wherein the biological component is selected from nucleic acids, proteins, including but not limited to phosphoproteins, peptides and/or metabolites.

Use

In a second aspect, the present invention also provides for the use of a non-crosslinking fixative solution for preparing a frozen biological sample. The non-crosslinking fixative solution is non-aqueous and comprises one or more aliphatic alcohols of the general formula $C_nH_{2n+1}OH$, and preferably an acid. The non-crosslinking non-aqueous fixative solution can have one or more characteristics as described above for the fixative solution used in the first aspect of the invention. Preferably, the non-crosslinking non-aqueous fixative solution is a fixative solution with one or more of the characteristics of the non-crosslinking fixative solution used in the particular embodiments of the present method disclosed above. It is referred to the above disclosure.

The present inventor has found that surprisingly, a non-crosslinking fixative solution that is non-aqueous and comprises one or more aliphatic alcohols of the general formula $C_nH_{2n+1}OH$, and preferably an acid can be used to prepare a frozen biological sample, as also explained above in relation with the first aspect of the invention. The fixed and optionally stabilized sample can be incubated in an aqueous solution comprising one or more cryoprotectants. Surprisingly, a complete hardening of the sample can be achieved and a frozen sample can be prepared. Despite incubation in the aqueous solution, the frozen sample obtained by using the non-crosslinking fixative solution has both, preserved morphology and biological components.

Kit

In a third aspect, the present invention also provides for a kit for preparing a frozen biological sample, the kit comprising:
- a non-crosslinking fixative solution and/or a stabilizing solution; and
- a cryoprotectant which is provided separate from the non-crosslinking fixative solution and the stabilizing solution, if present.

Accordingly, the present invention provides for a kit for preparing a frozen biological sample, the kit comprising:
- a non-crosslinking fixative solution, and
- a cryoprotectant which is provided separate from the non-crosslinking fixative solution.

Accordingly, the present invention also provides for a kit for preparing a frozen biological sample, the kit comprising:
- a stabilizing solution, preferably a non-crosslinking stabilizing solution, and
- a cryoprotectant which is provided separate from the stabilizing solution.

Accordingly, the present invention also provides for a kit for preparing a frozen biological sample, the kit comprising:
- a non-crosslinking fixative solution,
- a stabilizing solution, preferably a non-crosslinking stabilizing solution, and
- a cryoprotectant which is provided separate from the non-crosslinking fixative solution and from the stabilizing solution.

The cryoprotectant is provided separate from the non-crosslinking fixative solution where the kit comprises a non-crosslinking fixative solution. The cryoprotectant is provided separate from the stabilizing solution where the kit comprises a stabilizing solution. The cryoprotectant is provided separate from the non-crosslinking fixative solution and separate from the stabilizing solution where the kit comprises both, a non-crosslinking fixative solution and a stabilizing solution.

Thus, the cryoprotectant is not provided as part of and is not comprised in the non-crosslinking fixative solution and the stabilizing solution if contained in the kit. Typically, the cryoprotectant is provided in a separate container, vial or other suitable packaging.

The non-crosslinking fixative solution preferably is a fixative solution as described above in the first aspect of the invention. More preferably, the fixative solution is a non-crosslinking fixative solution as used in the particular embodiments of the present method disclosed above. It is referred to the above disclosure.

The stabilizing solution preferably is a stabilizing solution as described above in the first aspect of the invention. More preferably, the stabilizing solution is a stabilizing solution as used in the particular embodiments of the present method disclosed above. It is referred to the above disclosure.

The cryoprotectant can be selected from sugars such as monosaccharides and/or disaccharides, in particular sucrose, trehalose, dextrose, glycols such as glycerol, ethylene glycol, propylene glycol, 2-methyl-2,4-pentanediol, polyethylene glycol (PEG), polyvinylpyrrolidone (PVP), formamide, dimethyl formamide, and DMSO. Preferably, the cryoprotectant comprises or consists of one or more sugars. It may be selected from sucrose, trehalose, dextrose or a combination thereof. Most preferably, the cryoprotectant comprises or consists of sucrose.

The cryoprotectant can be RNAse-free. The cryoprotectant can be a high purity grade cryoprotectant. The cryoprotectant can be heated. The cryoprotectant can be provided in solid form. It can be provided as a concentrated stock solution for preparing an aqueous solution. It can be provided as ready to use aqueous solution. Preferably, the solution is RNAse-free. With all of these embodiments, it is preferred that the cryoprotectant is dextrose and/or sucrose, more preferably sucrose.

The cryoprotectant can be provided in an aqueous solution which has one or more of the characteristics as disclosed above in the first aspect of the invention.

The kit can further comprise one or more of the following components:
- a stabilizing solution as described above for the method of the invention;
- RNAse-free water;
- 2-methylbutane;
- a cryo-embedding material, wherein preferably the cryo-embedding material is a cryo-solidifiable material;
- at least one cryomold;
- at least one specimen disc; and/or
- adhesion slides for tissue sections.

Preferably, the kit is suitable for the use in the present method.

According to a fourth aspect, the kit is used in a method according to the present invention.

EMBODIMENTS

Additionally disclosed are the following embodiments according to the invention:

1. A method of preparing a frozen biological sample, comprising the steps:
   - fixing the biological sample with a non-crosslinking fixative solution,
   - incubating the fixed biological sample in an aqueous solution comprising a cryoprotectant, and
   - freezing the cryoprotected biological sample.

2. The method according to embodiment 1, wherein the biological sample has one or more of the following characteristics:
   a. the biological sample comprises cells;
   b. the biological sample comprises tissue;
   c. the biological sample is derived from metazoa, preferably from a mammal, more preferably from a human, or the biological sample is derived from a plant or a microorganism, preferably wherein the microorganism is selected from bacteria, viruses, yeast and fungi;
   d. the biological sample is selected from a tissue sample, an autopsy, a biopsy, an aspirate, a swab, and a cell-containing bodily fluid, preferably wherein the bodily fluid is selected from blood, sperm, cerebrospinal fluid, saliva, sputum, urine, lacrimal fluid, ascites, and sudor;
   e. the biological sample comprises isolated cells, preferably cultured cells or primary cells; and/or
   f. the biological sample comprises tissue selected from connective, muscle, nervous, and epithelial tissue.

3. The method of embodiment 1 or embodiment 2, wherein the biological sample has a thickness of about 6 mm or less, preferably about 4 mm or less, more preferably about 2 mm or less and/or the biological sample has a size of about 4× about 15× about 15 mm or less.

4. The method according to one or more of embodiments 1 to 3, wherein the non-crosslinking fixative solution comprises at least one alcohol and optionally at least one acid.
5. The method according to embodiment 4, wherein the non-crosslinking fixative solution has one or more of the following characteristics:
   a. the non-crosslinking fixative solution comprises one or more aliphatic alcohols;
   b. the non-crosslinking fixative solution comprises one or more aliphatic alcohols of the general formula $C_nH_{2n+1}OH$, wherein preferably, n is selected from the group consisting of 1-12, 1-5 and 1-4;
   c. the non-crosslinking fixative solution comprises methanol and/or ethanol as alcohol; and/or
   d. the non-crosslinking fixative solution comprises alcohol as the major component (v/v).
6. The method according to one or more of embodiments 1 to 5, wherein the non-crosslinking fixative solution comprises at least one acid, wherein the at least one acid has one or more of the following characteristics:
   a. it has a pKa value of from 2 to 12, preferably from 3.5 to 8, more preferably from 4 to 7.5;
   b. it is an organic acid;
   c. it is a weak organic acid;
   d. it is selected from amino acids and carboxylic acids; and/or
   e. it is a carboxylic acid selected from formic acid, fumaric acid, maleic acid, tartaric acid, citric acid, acetic acid and propionic acid, more preferably selected from acetic acid and propionic acid or a mixture thereof.
7. The method according to one or more of embodiments 1 to 6, wherein the non-crosslinking fixative solution comprises at least one alcohol and one or more additives, wherein the one or more additives are preferably selected from:
   a. a non-alcoholic organic solvent, wherein optionally the non-alcoholic organic solvent is selected from a halogenated hydrocarbon, preferably chloroform, and a ketone, preferably acetone;
   b. a sugar, preferably wherein the sugar is selected from a monosaccharide and/or a disaccharide, and/or or a sugar alcohol, preferably wherein the sugar alcohol is selected from sorbitol, mannitol and/or dulcitol;
   c. a poly(oxyalkylene) polymer, preferably a poly(oxyethylene) polymer, more preferably polyethylene glycol (PEG), wherein optionally, the poly(oxyalkylene) polymer is comprised in the non-crosslinking fixative solution in a concentration selected from 1 to 20% (w/v), 2 to 15% (w/V) and 3 to 10% (w/v);
   d. a poly(oxyalkylene) polymer having a molecular weight that lies in a range selected from 100 to 10000, 150 to 5000, 200 to 1000 and 250 to 500, wherein preferably the poly(oxyalkylene) polymer is polyethylene glycol (PEG);
   e. diethyleneglycol monoethylether acetate (DEGMEA); and/or
   f. a $C_2$ to $C_{12}$ polyol, preferably a $C_2$ to $C_{12}$ diol and/or triol.
8. The method according to one or more of embodiments 1 to 7, wherein the non-crosslinking fixative solution comprises one or more $C_2$ to $C_{12}$ polyol, preferably selected from the group consisting of 1,3-butanediol, 1,4-butanediol, 1,3-propanediol, 1,2-propanediol, 3-methyl-1,3,5-pentanetriol, 1,2,6-hexanetriol, glycerin and glycol, wherein preferably said polyol is selected from 1,3-butanediol, 1,4-butanediol, 1,3-propanediol, 1,2-propanediol, 3-methyl-1,3,5-pentanetriol and 1,2,6-hexanetriol.
9. The method according to embodiment 7 or 8, wherein the non-crosslinking fixative solution comprises the at least one $C_2$ to $C_{12}$ polyol in a concentration that lies in a range selected from 5 to 50% (v/v), 10 to 40% (v/v) and 15 to 35% (v/V).
10. The method according to one or more of embodiments 1 to 9, wherein the non-crosslinking fixative solution comprises at least one alcohol, preferably methanol and/or ethanol and additionally comprises at least one polyethylene glycol and/or at least one acid.
11. The method according to one or more of embodiments 1 to 10, wherein the non-crosslinking fixative solution is non-aqueous.
12. The method according to one or more of embodiments 1 to 11, wherein the non-crosslinking fixative solution is non-aqueous and comprises:
   a. at least one alcohol in a concentration that lies in a range selected from 10 to 90% (v/v), 20 to 80% (v/v), 30 to 75% (v/v) and 40 to 70% (v/v), wherein preferably, the alcohol is methanol;
   b. at least one acid; and
   c. one or more additives selected from:
      i. a non-alcoholic organic solvent, wherein preferably the non-alcoholic organic solvent is selected from a halogenated hydrocarbon, preferably chloroform, and a ketone, preferably acetone;
      ii. a poly(oxyalkylene) polymer, preferably a poly(oxyethylene) polymer, more preferably polyethylene glycol (PEG), wherein optionally the poly(oxyalkylene) polymer is comprised in the non-crosslinking fixative solution in a concentration selected from 1 to 20% (w/v), 2 to 15% (w/V) and 3 to 10% (w/V);
      iii. a poly(oxyalkylene) polymer having a molecular weight that lies in a range selected from 100 to 10000, 150 to 5000, 200 to 1000 and 250 to 500, wherein preferably the poly(oxyalkylene) polymer is polyethylene glycol (PEG);
      iv. diethyleneglycol monoethylether acetate (DEGMEA); and/or
      v. a $C_2$ to $C_{12}$ polyol, preferably a $C_2$ to $C_{12}$ diol and/or triol.
13. The method according to embodiment 12, wherein the non-crosslinking fixative solution has one or more of the following characteristics:
   a. the acid has one or more of the characteristics as defined in embodiment 6, and preferably is a carboxylic acid;
   b. it comprises at least one poly(oxyethylene) polymer and/or at least one $C_2$ to $C_{12}$ polyol, preferably a $C_2$ to $C_{12}$ diol and/or triol as additive(s);
   c. it comprises polyethylene glycol and comprises one or more $C_2$ to $C_{12}$ diols and/or triols, preferably selected from 1,3-butanediol, 1,4-butanediol, 1,3-propanediol, 1,2-propanediol, 3-methyl-1,3,5-pentanetriol, 1,2,6-hexanetriol, glycerin, or glycol, most preferably selected from 1,3-butanediol, 1,4-butanediol, 1,3-propanediol, 1,2-propanediol, 3-methyl-1,3,5-pentanetriol, and 1,2,6-hexanetriol.
14. The method according to one or more of embodiments 1 to 13, wherein fixing the biological sample with the non-crosslinking fixative solution has one or more of the following characteristics:

a. the biological sample is incubated in the non-cross-linking fixative solution;
b. fixing is carried out at ambient temperature of about 4° C. to about 35° C.;
c. fixing is carried out depending on the sample thickness for about 2 min to about 7 days, preferably for about 5 min to about 3 days, more preferably for about 10 min to about 48 h, most preferably for about 30 min to about 24 h; and/or
d. the non-crosslinking fixative solution penetrates the biological sample whereby the biological sample is fixed.

15. The method according to one or more of embodiments 1 to 14, wherein the aqueous solution comprises the cryoprotectant in a concentration that lies in a range selected from 5 to 50% (w/v), 10 to 45% (w/v), 15 to 40% (w/v), and 20 to 35% (w/v), most preferably wherein the concentration is about 30% (w/v).

16. The method according to one or more of embodiments 1 to 15, wherein the cryoprotectant comprised in the aqueous solution is selected from sugars such as monosaccharides and/or disaccharides, in particular sucrose, trehalose, dextrose, glycols such as glycerol, ethylene glycol and propylene glycol, 2-methyl-2,4-pentanediol, polyethylene glycol (PEG), polyvinylpyrrolidone (PVP), formamide, dimethyl formamide, and DMSO, wherein preferably the cryoprotectant comprises or consists of one or more sugars, more preferably sucrose, trehalose and/or dextrose, most preferably wherein the cryoprotectant comprises or consists of sucrose.

17. The method according to one or more of embodiments 1 to 16, wherein the aqueous solution comprising the cryoprotectant is RNAse-free.

18. The method according to one or more of embodiments 1 to 17, wherein incubating the fixed biological sample in the aqueous solution comprising the cryoprotectant has one or more of the following characteristics:
a. the fixed biological sample is incubated under RNAse-free conditions;
b. the fixed biological sample is incubated for about 1 to about 72 hours, preferably from about 6 to about 48 hours, more preferably for about 8 to about 24 hours, most preferably for about 12 hours;
c. the fixed biological sample is incubated in a vessel and the biological sample is incubated until the biological sample sinks to the bottom of the vessel;
d. the fixed biological sample is incubated at about 2° C. to about 35° C., preferably about 2° C. to about 8° C., more preferably at about 4° C.; and/or
e. the cryoprotectant penetrates the fixed biological sample whereby the biological sample is cryoprotected.

19. The method to one or more of embodiments 1 to 18, wherein freezing the cryoprotected biological sample has one or more of the following characteristics:
a. the cryoprotected biological sample is frozen at about −60° C. to about−196° C.;
b. the cryoprotected biological sample is snap-frozen; and/or
c. the cryoprotected biological sample is frozen in liquid nitrogen or in a pre-cooled liquid cryogen such as isobutene, 2-methylbutane, propane, ethane, halocarbon, preferably pre-cooled 2-methylbutane, preferably wherein the pre-cooled liquid cryogen such as 2-methylbutane is pre-cooled to at least about-60° C., preferably to about −60° C. to about −160° C.

20. The method to one or more of embodiments 1 to 19, further comprising embedding the cryoprotected biological sample with a cryo-embedding material.

21. The method of embodiment 20, having one or more of the following characteristics
a. the cryo-embedding material is a cryo-solidifiable material;
b. the embedding is performed simultaneous with or after freezing the cryoprotected biological sample;
c. the cryoprotected biological sample is placed in the cryo-embedding material, preferably a cryosolidifiable material, and is frozen in liquid nitrogen whereby the cryoprotected biological sample is simultaneously embedded and frozen, wherein preferably the cryo-embedding material is contained in a cryo-mold and the cryo-mold is placed into liquid nitrogen; and/or
d. the cryoprotected biological sample is frozen in pre-cooled 2-methylbutane, preferably wherein the 2-methylbutane is pre-cooled to at least about −60° C., preferably to about-60° C. to about −160° C., and the frozen sample thereafter is placed in the cryo-embedding material and is embedded in a frozen state, wherein preferably the cryo-embedding material is a cryo-solidifiable material and/or the cryo-embedding material is pre-cooled.

22. The method according to one or more of embodiments 1 to 21, further comprising stabilizing the biological sample with a stabilizing solution prior to incubating the biological sample in the aqueous solution comprising the cryoprotectant, wherein preferably, stabilizing is performed after fixing the biological sample in the non-crosslinking fixative solution.

23. The method according to embodiment 22, wherein the stabilizing solution is a non-crosslinking stabilizing solution.

24. The method according to embodiment 23, wherein the stabilizing solution comprises at least one alcohol and optionally, has one or more of the following characteristics:
a. the at least one alcohol is an aliphatic alcohol;
b. the stabilizing solution comprises one or more aliphatic alcohols of the general formula $C_nH_{2n+1}OH$, wherein preferably, n is selected from the group consisting of 1-12, 1-5 and 1-4;
c. the stabilizing solution comprises methanol and/or ethanol as alcohol, preferably ethanol;
d. the stabilizing solution comprises alcohol as the major component (v/v);
e. the stabilizing solution comprises the at least one alcohol, preferably ethanol, in a concentration that lies in a range selected from 10 to 99% (v/v), 20 to 90% (v/v), 30 to 85% (v/v), 40 to 80% (v/v) and 50 to 80% (v/V);
f. the stabilizing solution does not comprise methanol; and/or
g. the non-crosslinking stabilizing solution is non-aqueous.

25. The method according to embodiment 24, wherein the stabilizing solution, which preferably is non-aqueous, comprises at least one additive, wherein preferably, the at least one additive is a $C_2$ to $C_{12}$ polyol, preferably a $C_2$ to $C_{12}$ diol and/or triol.

26. The method according to embodiment 25, wherein the stabilizing solution comprises a $C_2$ to $C_{12}$ polyol wherein a. the $C_2$ to $C_{12}$ polyol is preferably selected from the group consisting of 1,3-butanediol, 1,4-butanediol, 1,3-propanediol, 1,2-propanediol, 3-methyl-1,3,5-pentanetriol and 1,2,6-hexanetriol and/or
b. the stabilizing solution comprises the at least one $C_2$ to $C_{12}$ polyol in a concentration that lies in a range selected from 5 to 50% (v/v), 10 to 40% (v/v) and 15 to 35% (v/V).

27. The method according to one or more of embodiments 1 to 26, further comprising storing the frozen and optionally embedded biological sample at a temperature of about −20° C. to about −196° C., preferably at about −70° C. to about −90° C., more preferably at −80° C.

28. The method to one or more of embodiments 1 to 27, further comprising isolating and/or analyzing at least one biological component contained in the biological sample.

29. The method of embodiment 28, having one or more of the following characteristics:
a. the biological component is selected from nucleic acids, proteins, including but not limited to phosphoproteins, peptides, peptide nucleic acids and/or metabolites, and preferably is a nucleic acid selected from DNA and RNA;
b. the biological component is isolated after freezing and optionally embedding the cryoprotected sample; and/or
c. the biological component is analyzed after freezing and optionally embedding the cryoprotected sample.

30. The method according to one or more of embodiments 1 to 29, further comprising preparing sections after freezing and/or embedding the sample.

31. The method according to one or more of embodiments 1 to 30, further comprising performing a morphological analysis of the biological sample.

32. The method of embodiment 31, having one or more of the following characteristics:
a. a morphological analysis is performed after freezing and/or embedding the biological sample;
b. the morphological analysis comprises performing a histological and/or cytological analysis of the biological sample; and/or
c. the morphological analysis comprises conventional staining such as hematoxylin and eosin, or immunehistochemical staining, in situ hybridization followed by microscopy and/or dissection.

33. Use of a non-crosslinking fixative solution for preparing a frozen biological sample, wherein the non-crosslinking fixative solution is non-aqueous and comprises one or more aliphatic alcohols of the general formula $CH_{2n+1}OH$, and preferably an acid.

34. The use according to embodiment 33, wherein the non-crosslinking fixative solution has one or more characteristics as defined in any one of embodiments 4 to 13.

35. A kit for preparing a frozen biological sample, the kit comprising:
a non-crosslinking fixative solution and/or a stabilizing solution; and
a cryoprotectant which is provided separate from the non-crosslinking fixative solution and the stabilizing solution.

36. The kit of embodiment 35, wherein the non-crosslinking fixative solution has one or more of the characteristics as defined in any one of embodiments 4 to 13 and/or wherein the stabilizing solution has one or more of the characteristics as defined in any one of embodiments 23 to 26.

37. The kit of embodiment 35 or 36, wherein the cryoprotectant is selected from sugars such as monosaccharides and/or disaccharides, in particular sucrose, trehalose, dextrose, glycols such as glycerol, ethylene glycol, propylene glycol, 2-methyl-2,4-pentanediol, polyethylene glycol (PEG), polyvinylpyrrolidone (PVP), formamide, dimethyl formamide, and DMSO, wherein preferably the cryoprotectant comprises or consists of one or more sugars, more preferably trehalose, dextrose, and/or sucrose, most preferably wherein the cryoprotectant comprises or consists of sucrose.

38. The kit according to embodiment 37, wherein the cryoprotectant has one or more of the following characteristics
a. the cryoprotectant is RNAse-free;
b. the cryoprotectant is a high purity grade cryoprotectant;
c. the cryoprotectant is heated;
d. the cryoprotectant is provided in solid form;
e. the cryoprotectant is provided as a concentrated stock solution for preparing an aqueous solution, preferably wherein the solution is RNAse-free; and/or
f. the cryoprotectant is provided in an aqueous solution, preferably wherein the solution is RNAse-free.

39. The kit according to embodiment 38, wherein the cryoprotectant is trehalose, dextrose and/or sucrose, more preferably sucrose.

40. The kit according to one or more of embodiments 35 to 39, wherein cryoprotectant is provided in an aqueous solution which has one or more of the characteristics as defined in any one of embodiments 15 to 17.

41. The kit according to one or more of embodiments 35 to 40, wherein the kit comprises one or more of the following components:
a. a stabilizing solution according to any one of embodiments 23 to 26;
b. RNAse-free water;
c. 2-methylbutane;
d. a cryo-embedding material, wherein preferably the cryo-embedding material is a cryo-solidifiable material;
e. at least one cryomold;
f. at least one specimen disc; and/or
g. adhesion slides for tissue sections.

42. The kit according to one or more of embodiments 35 to 41, wherein the kit is suitable for the method according to any one of embodiments 1 to 34 or issued in the method according to anyone of embodiments 1 to 34.

43. Use of a kit as defined in one or more of embodiments 35 to 42 in a method according to any one of embodiments 1 to 34.

This invention is not limited by the exemplary methods, uses, kits and materials disclosed herein, and any methods and uses, kits and materials similar or equivalent to those described herein can be used in the practice or testing of embodiments of this invention. Numeric ranges are inclusive of the numbers defining the range.

The headings provided herein are not limitations of the various aspects or embodiments of this invention which can be read by reference to the specification as a whole.

As used in the present specification, the singular forms "a", "an" and "the" include plural aspects unless the context clearly dictates otherwise. Thus, for example, reference to "an alcohol" includes a single type alcohol, as well as two or more alcohols. Reference to "the disclosure" and "the invention" and the like includes single or multiple aspects taught herein; and so forth. Aspects taught herein are encompassed by the term "invention".

As used in the present specification, the expression "about" is intended to signify the given value±10%.

According to one embodiment, subject matter described herein as comprising certain steps in the case of methods or as comprising certain ingredients in the case of compositions or solutions refers to subject matter consisting of the respective steps or ingredients. It is preferred to select and combine preferred embodiments described herein and the specific subject-matter arising from a respective combination of preferred embodiments also belongs to the present disclosure.

EXAMPLES

The examples are for illustrative purpose only and are not to be construed as limiting this invention in any manner.
Materials and methods for Examples 1-10

Abbreviations

PFCE: PAXGENER Tissue fixed, cryo-embedded
FFCE: Formalin fixed, cryo-embedded
LN2: Liquid nitrogen
IHC: Immuno-histochemistry
NBF: Neutral buffered formalin
RT-qPCR: quantitative, real time PCR Materials Used Cryo Embedding Media
    PELCO® Cryo-Embedding Compound (Ted Pella Inc.)
    FSC22® Frozen Section Compound (Leica Biosystems)
    TISSUE-TEK® O.C.T. Compound (Sakura Finetek)
Tissue Fixatives
    PAXGENER Tissue FIX in combination with the stabilizing solution PAXGENE® Tissue STABILIZER (PreAnalytiX)
    4% neutral buffered formalin
Cryostat
    Bench-top Cryostat Leica CM1100
Slides
    SUPER-FROST® Plus (VWR)

Experimental Procedures

Tissue Fixation:
    Tissue samples from rat (*Rattus norvegicus*-wistar) were cut into samples of approximately 10×5×4 mm pieces. For fixation with formalin, samples were immersed into at least 10 ml of NBF and fixed for 24 hours at room temperature. For fixation with PAXGENER Tissue, tissue samples were placed into a standard tissue cassette and submerged into the PAXGENE® Tissue FIX reagent. After 4 hours at room temperature fixation was stopped by transferring the cassette into the PAXGENER Tissue STABILIZER reagent and incubated for at least another 24 hours. Albeit the PAXGENER Tissue STABILIZER was used in the present experiments, this use is optional and it is also possible to proceed from fixation directly to cryo-protection of the samples.

Preparation of Formalin or PAXGENER Tissue Fixed Tissue Specimens for Freezing and Cryo-Embedding:
    Fixed and stabilized tissue was removed from the tissue cassette.
    As preparation for cryo-embedding, the tissue was cut to a maximum thickness of 2 mm.
    Tissue specimen was transferred into a suitable vial filled with 10 ml 30% sucrose solution (w/V).
    For cryo-protection, the tissue specimen was incubated in the sucrose solution at 2-8° C. until the sample sank to the bottom of the vial.
    Tissue specimen was frozen either directly in 2-methylbutane cooled on dry ice followed by embedding into a cryo-embedding medium (FIG. 1) or placed into a cryomold filled with a cryo-embedding medium for simultaneous snap-freezing and embedding in liquid nitrogen (FIG. 2).
Snap-Freezing in 2-Methylbutane on Dry Ice (FIG. 1):
    A STYROFOAM™ box was filled with dry ice. A suitable container filled with 2-methylbutane (isopentane) was placed on the dry ice to pre-cool the 2-methylbutane to approximately −60° C.
    Pre-cooling could be accelerated by throwing small pieces of dry ice into the 2-methylbutane.
    Tissue specimen was removed from the sucrose solution and dabbed on an absorbent sheet to remove excess solution.
    Tissue specimen was snap-frozen by immersing it into the pre-cooled 2-methylbutane.
    For optimal preservation of morphology and biomolecules it was essential to freeze the specimen quickly and uniformly. In contrast to what is published in most protocols the tissue specimen was not submerged into cryo-embedding medium prior to freezing in 2-methylbutane as it was found that this way, freezing time can be significantly reduced and preservation of morphology is improved.
Cryo-Embedding of Tissue after Snap-Freezing in 2-Methylbutane on Dry Ice (FIG. 1):
    An empty cryomold was filled with cryosolidifiable cryo-embedding medium.
    The filled cryomold was immersed into the pre-cooled 2-methylbutane, such that 2-methylbutane contacted all sides of the mold but did not flood the cryo-embedding medium.
    When the cryo-embedding medium begun to turn white, the tissue specimen was grabbed with forceps and submerged into the middle of the cryo-embedding medium.
    Immediately a specimen disk (specimen holder) was placed on top of the tissue within the cryo-embedding medium and cryomold with tissue and cryo-embedding medium was submerged completely into the 2-methylbutane.
    For preservation of morphology and biomolecules it was essential to work quickly to avoid that the specimen thawed in the cryo-embedding medium.
    The cryomold was kept in the 2-methylbutane until the cryo-embedding medium had completely turned white.
    The PAXGENER Tissue fixed, cryo-embedded (PFCE) block of tissue was broken off from the cryomold and stored at −80° C. until sectioning.
Simultaneous Snap-Freezing and Cryo-Embedding Using Liquid Nitrogen (FIG. 2):
    An empty cryomold was filled with cryosolidifiable cryo-embedding medium.

The tissue specimen was removed from the sucrose solution and dabbed on an absorbent sheet to remove excess solution.

The tissue specimen was placed into the middle of the cryo-embedding medium.

A specimen disk (specimen holder) was placed on top of the tissue within the cryo-embedding medium. As an alternative the specimen disk was attached later to the cryo-embedded specimen.

The cryomold was grabbed with forceps and placed into liquid nitrogen, such that the nitrogen contacted all sides of the mold but did not flood the cryo-embedding medium. It was essential to immerse the cryomold. Freezing in the gas phase by keeping the cryomold above the liquid level took too long and led to suboptimal morphology preservation. In contrary it was also important not to submerge the cryomold completely into the liquid nitrogen because this led to cracks in the cryo-block.

When the cryo-embedding medium completely turned white the cryomold was removed from from the liquid nitrogen.

The PAXGENER Tissue fixed, cryo-embedded (PFCE) block of tissue was broken off from the cryomold and stored at −80° C. until sectioning.

Snap-Freezing of Tissue Samples in Liquid Nitrogen (LN2):

Tissue samples from rat (*Rattus norvegicus*-wistar) were cut into samples of approximately 10×5×2 mm pieces and directly immersed into liquid nitrogen. After approximately 2 min frozen samples were removed transported on dry ice and stored at −80° C. Before sectioning with a cryostat frozen tissue samples were glued onto a specimen disk with one drop of cryo-embedding medium. Medium was placed on the specimen disk, frozen samples attached and immediately placed back into −80° C.

Hematoxylin and Eosin (H&E) Staining of Sections from PFCE, FFCE or LN2 Snap-Frozen Tissue:

Hematoxylin and eosin staining was performed manually with sections with a thickness of 4-12 μm from cryo-embedded samples mounted on slides. Slides were submersed into 70% ethanol directly after sectioning for 1-60 min, followed by a short air dry, 1 min incubation in running tap-water, 10 sec incubation in Hematoxylin (Merck, ready to use), 2 min incubation in running tap-water, 20-30 sec incubation in Eosin (Merck, ready to use), 2 min running tap-water, 1 min each 80% and 99% ethanol, 100% isopropanol 100% xylene. Finally the sections were overlaid with ENTELLAN® (Merck) and a cover slip.

Immunohistochemical Staining of Sections from PFCE Tissue:

PFCE blocks of tissue were cut into sections of 8 μm and directly captured on SUPER-FROST® Plus microscopic slides. For dissolving the cryo-embedding medium, sections were incubated for up to 1 hour in 80% ethanol followed by rehydration in water. Antigen retrieval was performed in a water bath by incubating for 10 min at 98° C. in Tris/EDTA pH9 solution (S2367 from Dako). Staining was performed with anti-5-methylcytosine (abcam ab10805, dilution 1:500) or anti-pan cadherin mouse monoclonal antibodies (abcam ab6528, dilution 1:200) for 30 min. Secondary staining was performed with the Dako ENVISION+™ System-HRP (DAB) for use with mouse primary antibodies (Dako K4007) according to manufacturer's procedure. Counterstaining was performed with hematoxylin.

RNA Extraction from Sections of Cryo-Embedded PFCE Samples Transferred into a Microcentrifuge Tube:

RNA was extracted with the consumables from a PAXGENE® Tissue RNA kit.

Using a cryostat a tissue section of 8-12 μm thickness was generated and transferred with pre-cooled forceps into a lysis mixture consisting of 150 μl buffer TR1, 290 μl water and 10 μl Proteinase K. Two more sections were transferred for isolation of RNA from 3 sections. The lysat was incubated for 15 min at 56° C. and centrifuged for 3 min at maximum speed. Supernatant was transferred into a new tube, ethanol was added and bind, wash, elute steps were carried out according to the protocol "purification of total RNA from Sections of PFPE Tissue".

RNA Extraction from Sections of Cryo-Embedded PFCE or LN2 Snap-Frozen Samples Mounted on a Slide:

RNA was extracted with the consumables from a PAXGENER Tissue RNA kit.

Using a cryostat a tissue section of 8-12 μm thickness was generated and mounted on a slide.

Slides were transferred into ice-cold 80% ethanol to remove the cryo-embedding medium. After 1 min incubation slides were placed on a horizontal workplace. Tissue was overlaid with 100 μl ice-cold TR1. Tissue was detached by pipetting the lysis mixture up and down and transferred into a microcentrifuge tube. Additional 50 μl TR1, 290 μl water and 10 μl Proteinase K were added. The lysat was incubated for 15 min at 56° C. and centrifuged for 3 min at maximum speed. Supernatant was transferred into a new tube, ethanol was added and bind, wash, elute steps carried out according to the protocol "purification of total RNA from Sections of PFPE Tissue".

RNA Extraction from Sections of Cryo-Embedded FFCE Samples Mounted on a Slide:

RNA was extracted with the consumables from a RNEASY® FFPE kit.

Using a cryostat a tissue section of 8-12 μm thickness was generated and mounted on a slide. Slides were transferred into ice-cold 80% ethanol to remove the cryo-embedding medium. After 1 min incubation slides were placed on a horizontal workplace. Tissue was overlaid with 100 μl ice-cold buffer PKD. Tissue was detached by pipetting the lysis mixture up and down and transferred into a microcentrifuge tube. Additional 50 μl PKD and 10 μl Proteinase K were added. The lysate was incubated for 15 min at 56° C. followed by 15 min at 80° C. to remove crosslinks introduced by formalin fixation. After 3 min incubation on ice and 15 min centrifugation at maximum speed supernatant was transferred into a new tube. DNase digestion bind, wash and elute steps were carried out according to the protocol "purification of total RNA from FFPE Tissue Sections".

RNA Extraction from Fixed and Stabilized Tissue, with or without Cryo-Protection:

RNA was extracted with the consumables from a PAXGENE® Tissue RNA kit.

10 mg of fixed and stabilized Tissue with or without cryo-protection was placed into a 2 ml microcentrifuge tube with a steel bead and 300 μl buffer TR1 was added. Homogenization was performed on the Tissue-Lyser (QIAGEN) with 20 Hz for 2 min. Lysats were transferred into new tubes and RNA was purified with the PAXGENER Tissue RNA kit (PreAnalytiX) according to the protocol "purification of total RNA from PAXGENE® Tissue fixed samples".

RNA Analysis:

Spectrophotometrical analysis of purity and yield was performed on a NANODROP™ photometer. Integrity was analysed on an Agilent Bioanalyzer. Real time RT-PCR was performed with 10 ng RNA on a TAQMAN® 7700 (Applied Biosystems) with a one-step approach, using the QUANTI- TECT™ Probe RT Mix (Qiagen) and primer and probe to amplify and detect a 294 bp fragment of the human beta actin gene.

DNA Extraction Sections of Cryo-Embedded PFCE Samples Transferred into a Microcentrifuge Tube:

DNA was extracted with the consumables from a PAXGENE® Tissue DNA kit.

Using a cryostat a tissue section of 10 µm thickness was generated and transferred with pre-cooled forceps into a lysis mixture consisting of 180 µl lysis buffer TD1 and 20 µl Proteinase K.

Two more sections were transferred for isolation of DNA from 3 sections. The lysat was incubated for 60 min at 56° C. After incubation 200 µl buffer TD2 was added and DNA was purified according to the protocol "Purification of Genomic DNA from Sections of PAXGENER Treated, Paraffin-Embedded Tissue". DNA was eluted with 40 µl buffer TD5.

Spectrophotometrical analysis of yield was performed on a SPECTRAMAX® photometer. Agarose gelelectrophoresis was performed on 1% 1×TAE agarose gels with 200 ng DNA.

1. Example 1

RNA Extraction from PAXGENER Tissue Fixed and Stabilized Tissue with or without Cryo-Protection by Incubation in Sucrose Solution Duplicate samples of rat liver, kidney and spleen samples with a maximum thickness of 4 mm were fixed and stabilized with the PAXGENER Tissue FIX and STABILIZER reagents according to the handbook. One sample from each tissue type was transferred to 30% (w/v) sucrose solution (prepared by dissolving 30 g sucrose in 100 ml of water) for 12 hours incubation at 4° C. The other tissue sample was kept within the PAXGENER Tissue STABILIZER.

FIG. 3 shows RNA yield, purity and integrity from fixed and stabilized tissue with or without incubation in 30% sucrose solution. RNA was extracted in duplicates from 10 mg of tissue from each sample using consumables of the PAXGENE® Tissue RNA kit.

Conclusions

RNA yield, purity and integrity is not significantly different between fixed and stabilized tissue with or without cryo-protection.

Incubation of PAXGENER Tissue fixed and stabilized tissue in sucrose solution does not lead to RNA degradation.

2. Example 2

RNA Extraction from Sections of PFCE Tissue, Snap-Frozen in 2-Methylbutane and Mounted on Slides Rat liver, kidney, spleen, intestine, lung, heart muscle, cerebrum and esophagus samples with a maximum thickness of 4 mm were fixed and stabilized with the PAXGENER Tissue FIX and STABILIZER reagents according to the handbook. Fixed and stabilized tissue were grossed to 2 mm thickness and incubated in 30% (w/v) sucrose solution for 12 hours at 4° C. Samples were snap-frozen in cooled 2-methylbutane followed by cryo-embedding. Sections with 12 µm thickness were mounted on slides and total RNA was purified from the sections with consumables from the PAXGENE® Tissue RNA kit.

Figure 4:
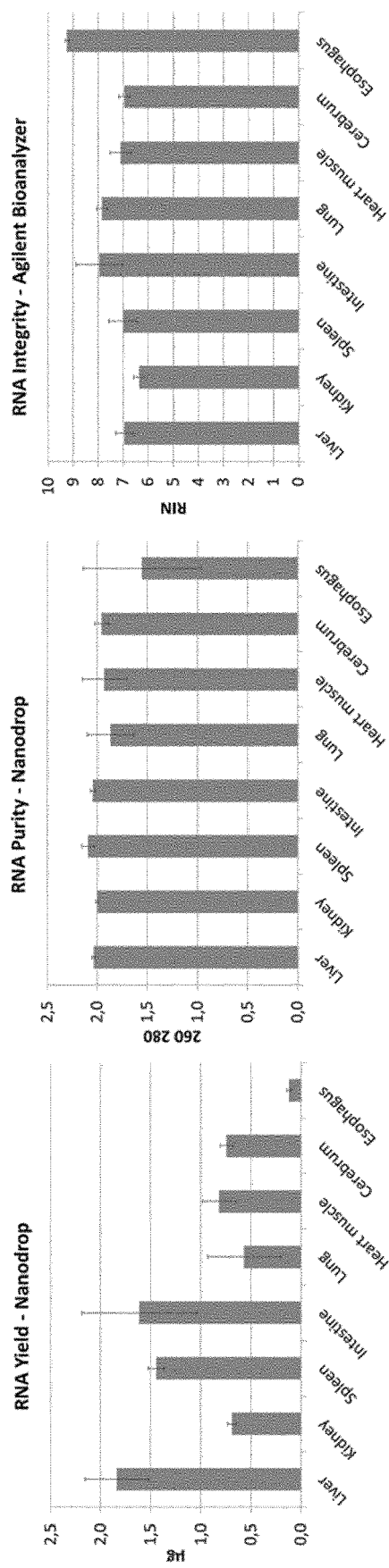
FIG. 4: RNA yield, purity and integrity from PAXGENER Tissue fixed, cryo-embedded (PFCE) sections mounted on slides. PFCE tissue blocks were produced by snap-freezing in 2-methylbutane followed by cryo-embedding. RNA was extracted in duplicates from 12 μm PFCE sections mounted on slides using consumables of the PAXGENE® Tissue RNA kit.

FIG. 4 shows RNA yield, purity and integrity from PFCE sections mounted on slides. RNA was extracted in duplicates from 12 µm PFCE sections mounted on slides using consumables of the PAXGENE® Tissue RNA kit.

Conclusion

High-quality RNA can be isolated from sections of PFCE tissue mounted on slides, including normal, fibrous and fatty tissue.

3. Example 3

RNA extraction from sections of PFCE tissue, snap-frozen in liquid nitrogen, directly transferred into microcentrifuge tubes Rat intestine, lung, heart muscle, cerebrum and esophagus samples with a maximum thickness of 4 mm were fixed and stabilized with the PAXGENER Tissue FIX and STABILIZER reagents according to the handbook. Fixed and stabilized tissue were grossed to 2 mm thickness and incubated in 30% (w/v) sucrose solution for 12 hours at 4° C. Samples were simultaneously snap-frozen and cryo-embedded in liquid nitrogen. Sections of PFCE blocks with 10 µm thickness were transferred into microcentrifuge tubes and purified with consumables from the PAXGENE® Tissue RNA kit.

Figure 5:
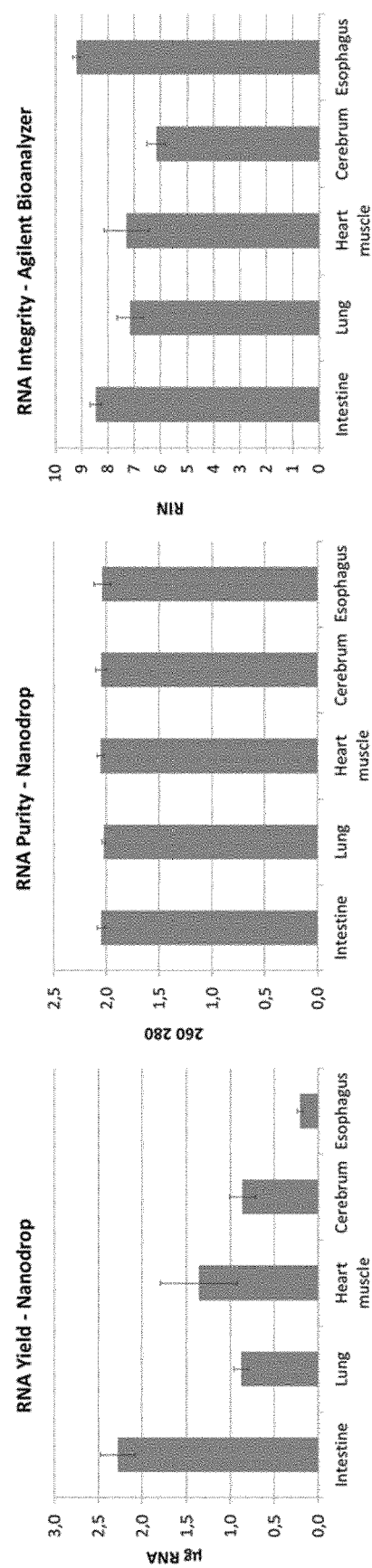
FIG. 5: RNA yield, purity and integrity from PFCE sections transferred into a microcentrifuge tube. RNA was extracted in triplicates from 3 sections of PFCE tissue blocks with 10 μm thickness each. PFCE tissue blocks were produced by simultaneous snap-freezing and cryo-embedding in liquid nitrogen, Sections were directly transferred into a microcentrifuge tube. RNA was purified with consumables of the PAXGENER Tissue RNA kit.

FIG. 5 shows RNA yield, purity and integrity from PFCE sections transferred into a microcentrifuge tube. RNA was extracted in triplicates from 3 sections of PFCE tissue blocks, snap-frozen in liquid nitrogen, with 10 µm thickness each. Sections were directly transferred into a microcentrifuge tube. RNA was purified with consumables of the PAXGENE® Tissue RNA kit.

Conclusion

High-quality RNA can be isolated from sections of PFCE tissue, directly transferred into a microcentrifuge tube, including normal, fibrous and fatty tissue.

4. Example 4

Morphology Preservation in PFCE Blocks of Tissue Snap-Frozen in 2-Methylbutane

Rat kidney tissue specimen were fixed and stabilized with the PAXGENER Tissue System. Samples with a thickness of approximately 2 mm were cut from the larger specimen, washed over night within 30% sucrose (w/v) at 4° C. For freezing samples were submerged into a cryo-embedding medium and placed into cooled 2-methylbutane cooled on dry ice (a), or cooled in the gas phase of liquid nitrogen (b). Alternatively sample was directly snap-frozen in 2-methylbutane cooled on dry ice and later cryo-embedded ((c), see FIG. 1). Sectioning was performed with a cryostat at −20° C.

Figure 6:
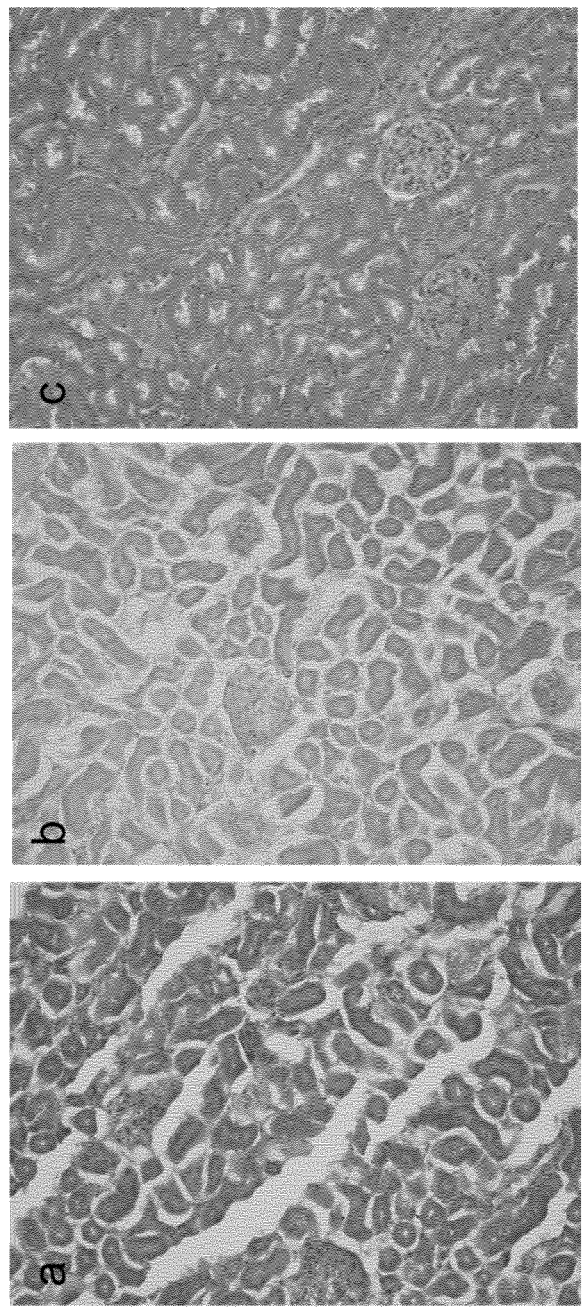
FIG. 6: Hematoxylin and eosin (H&E) staining of section of PFCE rat kidney tissue. Freezing of fixed and stabilized kidney samples submerged into a cryo-embedding medium over dry ice (a) or liquid nitrogen (b) leads to shrinkage and distortion of the morphology. Snap-freezing in cooled 2-methylbutane without a cryo-embedding medium preserves morphology without tissue shrinkage (c). Sections with a thickness of 8 μm; PFCE blocks, original magnification ×200.

FIG. 6 shows H&E staining of section of PFCE rat kidney tissue. Freezing of fixed and stabilized kidney samples submerged into a cryo-embedding medium over dry ice (a) or liquid nitrogen (b) in the tested embodiment leads to shrinkage and distortion of the morphology. Snap-freezing in cooled 2-methylbutane without a cryo-embedding medium preserves morphology without tissue shrinkage (c). Sections with a thickness of 8 µm; PFCE blocks, original magnification ×200.

Conclusion

For preservation of morphology quick, snap-freezing is preferred. Slow freezing within a cryo-embedding medium provided less favourable results.

5. Example 5

Morphology Preservation in PFCE Blocks of Tissue Snap-Frozen in 2-Methylbutane Followed by Cryo-Embedding According to FIG. 1

Eight different rat tissue types (esophagus, heart muscle, lung, liver, spleen, intestine, kidney, cerebrum) were fixed and stabilized with the PAXGENER Tissue System. Samples with a thickness of approximately 2 mm were cut from the larger specimen, washed over night within 30% sucrose (w/v) at 4° C., and snap-frozen in 2-methylbutane cooled on dry ice. For cryo-embedding frozen samples were transferred into the middle of precooled cryo-embedding medium and submerged into 2-methylbutane again, as shown in FIG. 1. Sectioning was performed with a cryostat at −20° C.

Figure 7:
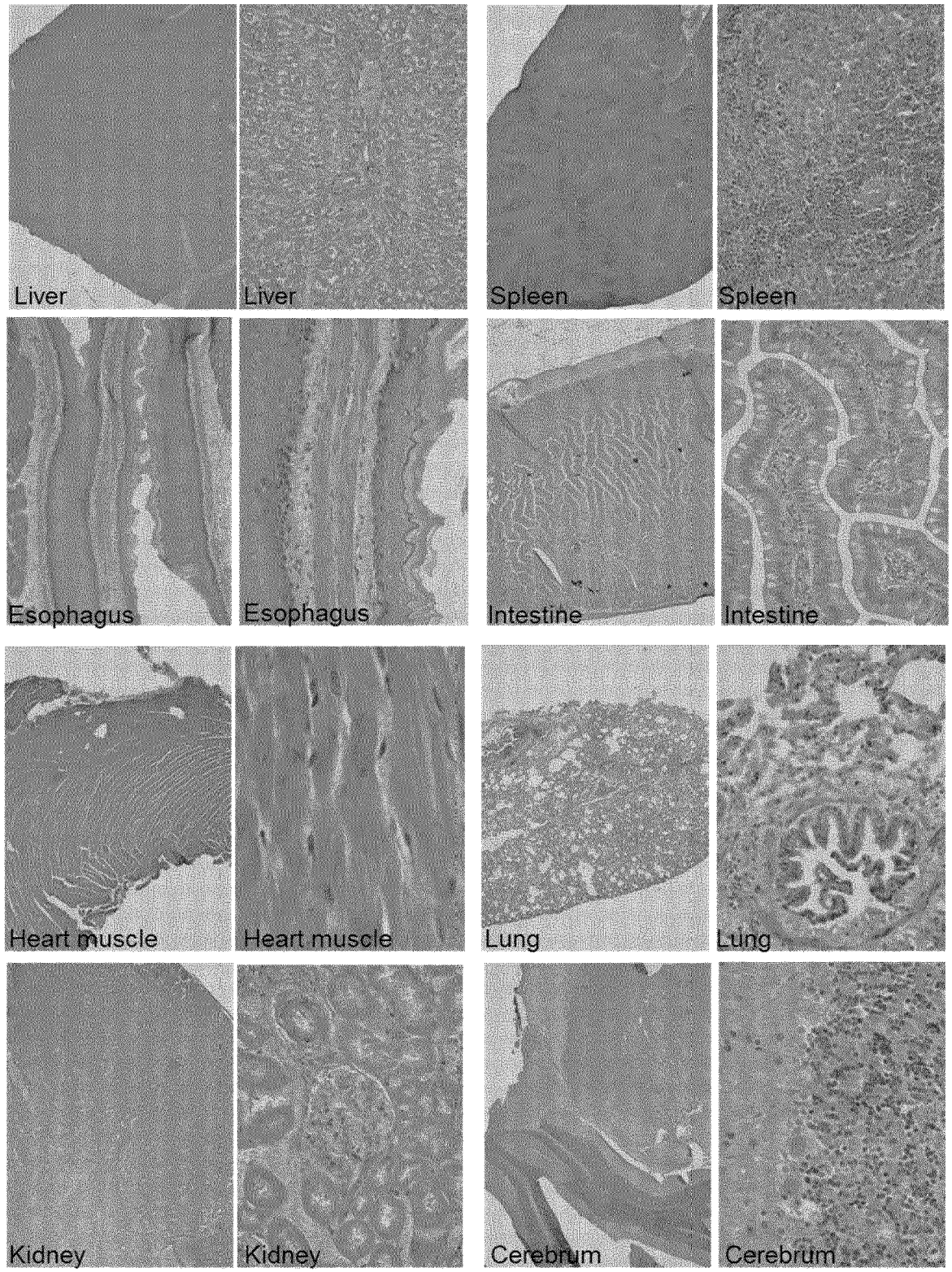
FIG. 7: H&E staining of sections of PFCE rat tissue, snap-frozen in 2-methylbutane. Sections with a thickness of 8 μm, original magnification ×40 and ×400.

FIG. 7 shows H&E staining of sections of PFCE rat tissue, snap-frozen in 2-methylbutane. Sections with a thickness of 8 μm, original magnification ×40 and ×400.

Conclusions

Histological structures are preserved including cellular fine-structures like nuclei, cell border and even nucleoli, in sections of PFCE blocks of tissue snap-frozen in 2-methylbutane followed by cryo-embedding.

6. Example 6

Morphology Preservation in PFCE Blocks of Tissue Simultaneously Snap-Frozen and Cryo-Embedded in Liquid Nitrogen According to FIG. 2

Eight different rat tissue types (lung, cerebrum, esophagus, heart muscle, liver, spleen, intestine, kidney) were fixed and stabilized with the PAXGENER Tissue System. Samples with a thickness of approximately 2 mm were cut from the larger specimen and washed over night within 30% sucrose (w/v). Snap-freezing and cryo-embedding was done simultaneously in liquid nitrogen. Sectioning was performed with a cryostat at −20° C.

Figure 8:
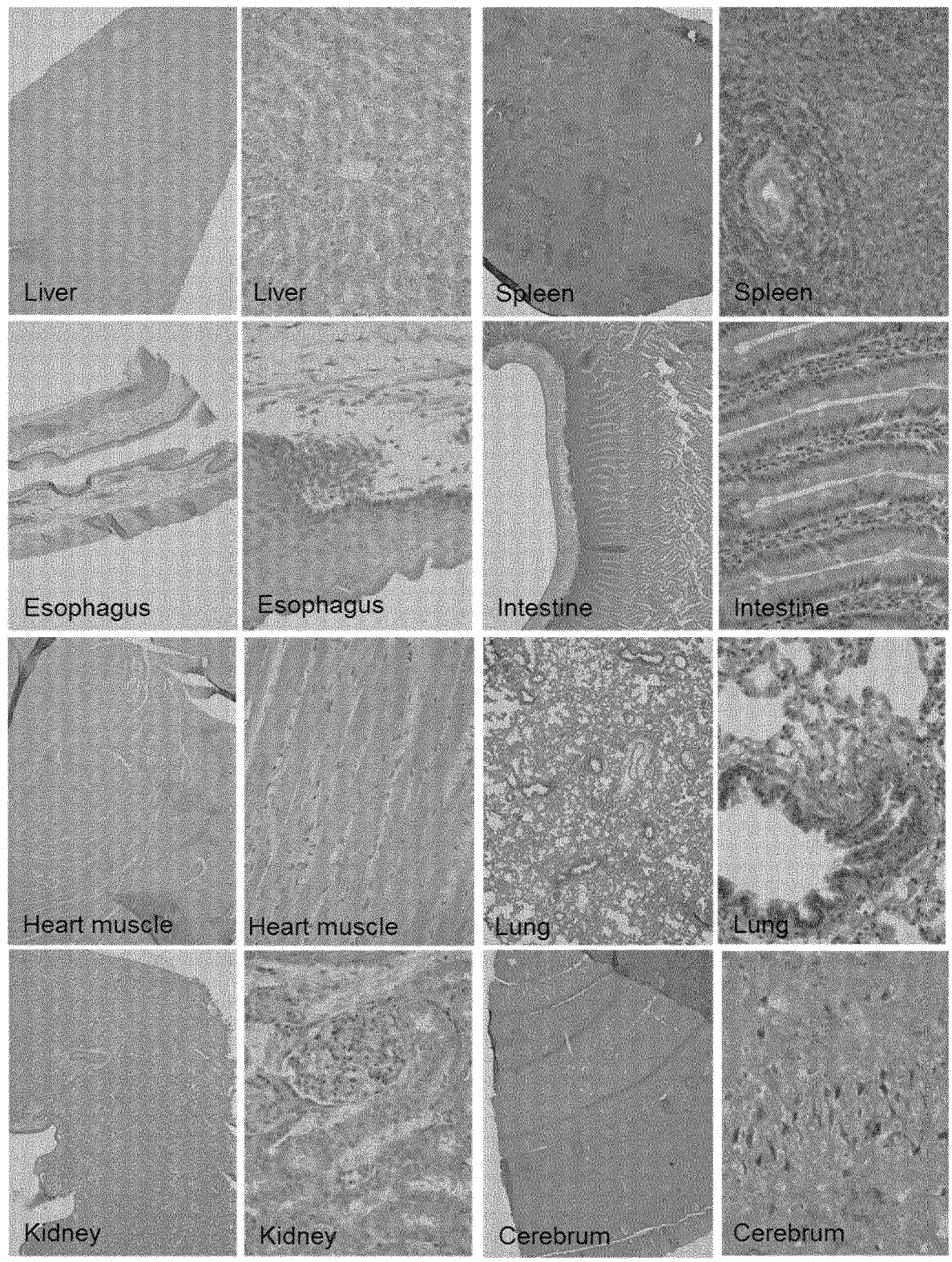
FIG. 8: H&E staining of sections of PFCE rat tissue snap-frozen in liquid nitrogen. Sections with a thickness of 8 μm; original magnification ×40 and ×400.

FIG. 8 shows H&E staining of sections of PFCE rat tissue snap-frozen in liquid nitrogen.

Sections with a thickness of 8 μm; original magnification ×40 and ×400.

Conclusions

Excellent results are obtained by simultaneous freezing and cryo-embedding with liquid nitrogen. Histological structures are preserved including cellular fine-structures like nuclei, cell border and even nucleoli, in sections of PFCE blocks of tissue simultaneously snap-frozen and cryo-embedded in liquid nitrogen.

7. Example 7

Immunohistochemical Staining of Sections of PFCE Blocks of Tissue

Rat intestine tissue samples were fixed and stabilized with the PAXGENER Tissue System. Samples with a thickness of approximately 2 mm were cut from the larger specimen and washed over night within 30% sucrose (w/v). Freezing and cryo-embedding was done either with 2-methylbutane (FIG. 1) or liquid nitrogen (FIG. 2). Sectioning was performed with a cryostat at-20° C.

FIG. 9 shows IHC staining of PFCE rat intestine tissue snap-frozen in liquid nitrogen or snap-frozen in 2-methylbutane; nuclei staining with anti-5-methylcystosine and plasma membrane staining in specific cells with anti-pan-cadherin monoclonal antibodies. Sections with a thickness of 8 μm; original magnification ×200.

Conclusion

Sections from PFCE tissue can be used for standard immunohistochemical staining assays.

8. Example 8

DNA Extraction from Sections of PFCE Tissue, Snap-Frozen in 2-Methylbutane or Liquid Nitrogen Rat liver, kidney, spleen, intestine, lung, heart muscle, cerebrum and esophagus samples with a maximum thickness of 4 mm were fixed and stabilized with the PAXGENER Tissue FIX and STABILIZER reagents according to the handbook. Fixed and stabilized tissue were grossed to 2 mm thickness and incubated in 30% (w/v) sucrose solution for 12 hours at 4° C. Freezing and cryo-embedding was done either with 2-methylbutane (FIG. 1) or liquid nitrogen (FIG. 2). Sections of PFCE blocks with 10 μm thickness were directly transferred into microcentrifuge tubes and purified with consumables from the PAXGENE® Tissue DNA kit.

Figure 10A:
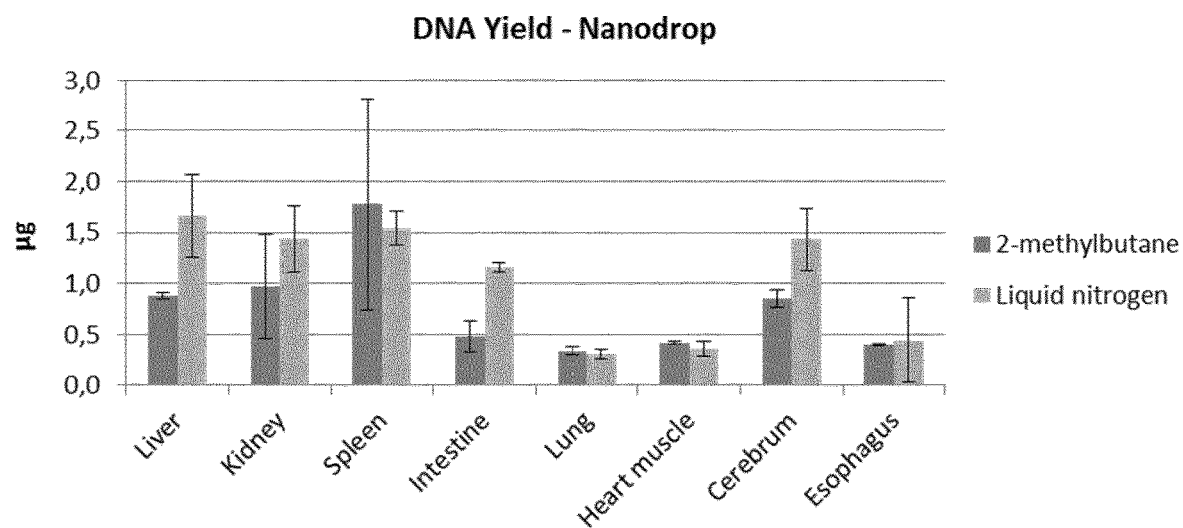
FIG. 10A, B: DNA yield (A) and integrity (B) from PFCE tissue sections transferred into a microcentrifuge tube. DNA was extracted in duplicates from 3 sections of PFCE tissue blocks with 10 μm thickness each. Tissue blocks were produced by either snap-freezing in 2-methylbutane (2-mb) or in liquid nitrogen (LN2). Sections were directly transferred into a microcentrifuge tube. DNA was purified with consumables of the PAXGENER Tissue DNA kit. 200 ng of gDNA were separated in 1% TAE agarose gels; M: Marker lambda Hind III.
Figure 10B:
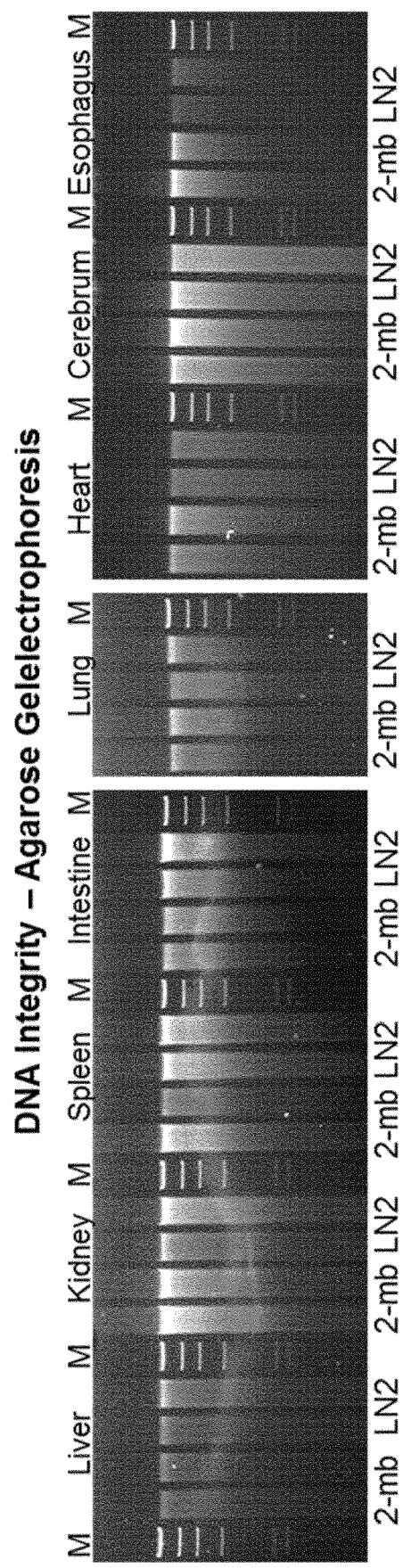

FIG. 10A, B shows DNA yield (A) and integrity (B) from PFCE tissue sections transferred into a microcentrifuge tube. DNA was extracted in duplicates from 3 sections of PFCE tissue blocks, snap-frozen in 2-methylbutane (2-mb) or in liquid nitrogen (LN2), with 10 μm thickness each. Sections were directly transferred into a microcentrifuge tube. DNA was purified with consumables of the PAXGENER Tissue DNA kit. 200 ng of gDNA were separated in 1% TAE agarose gels; M: Marker lambda Hind III.

Conclusion

High-quality, high molecular weight DNA can be isolated from sections of PFCE tissue, directly transferred into a microcentrifuge tube, including normal, fibrous and fatty tissue.

9. Example 9

Comparison of Morphology and RNA Preservation in LN2-Snap-Frozen, PFCE and FFCE Tissue Mirrored samples of rat kidney and spleen with a maximum thickness of 4 mm were fixed and stabilized with the PAXGENER Tissue FIX and STABILIZER reagents or fixed with neutral buffered formalin or directly snap-frozen in liquid nitrogen (LN2). PAXGENER Tissue or formalin fixed tissue were grossed to 2 mm thickness and incubated in 30% (w/v) sucrose solution for 12 hours at 4° C., snap-frozen in cooled 2-methylbutane followed by cryo-embedding. Sections with 12 μm thickness were mounted on slides and total RNA was purified from the PFCE tissue sections and LN2 snap-frozen sections with consumables from the PAXGENE® Tissue RNA kit and from the FFCE sections with consumables from the RNEASY® FFPE kit.

In addition sections with 8 μm thickness were stained with hematoxylin and eosin.

Figure 11:
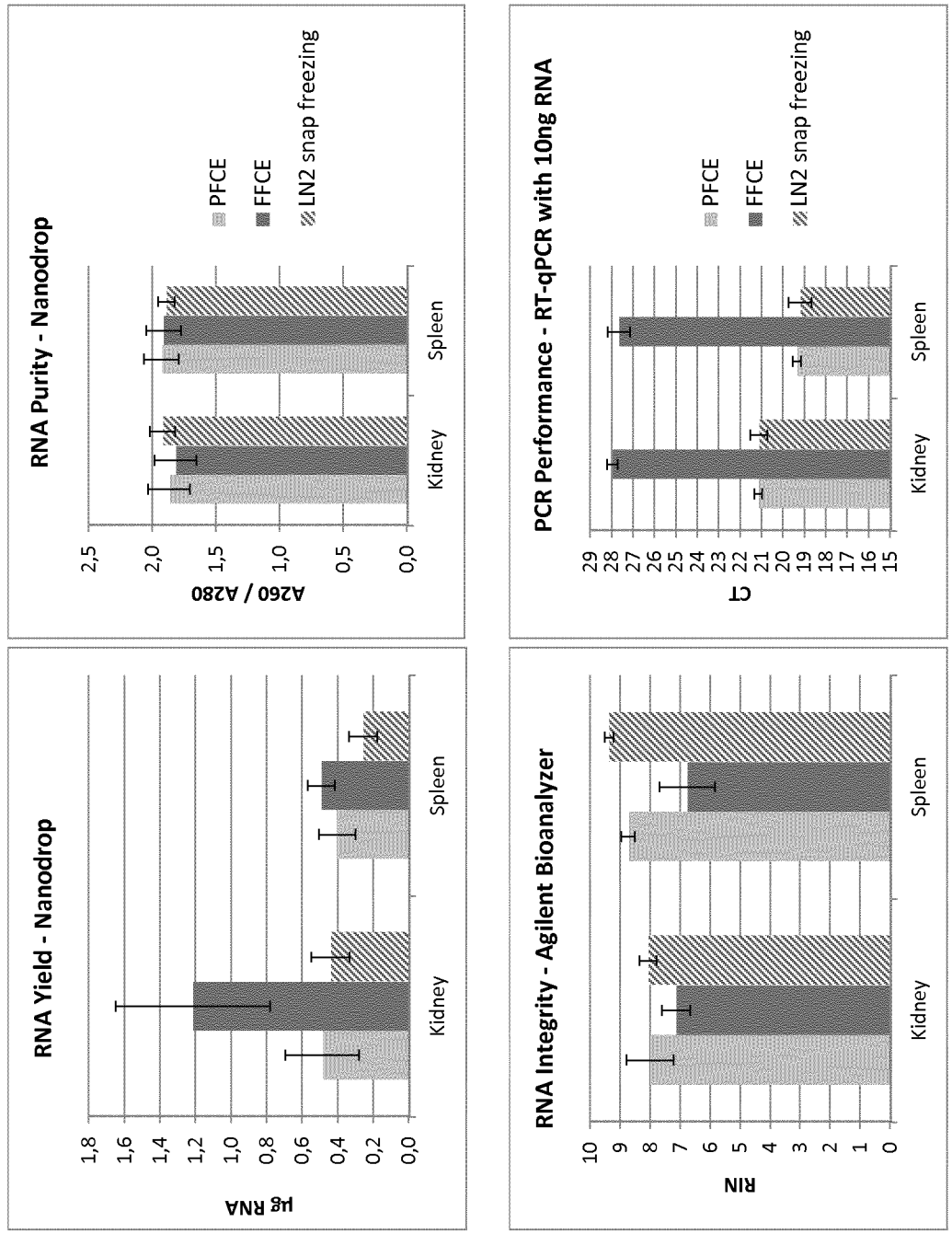
FIG. 11: RNA yield, purity, integrity and performance in quantitative, real time RT-PCR. RNA was extracted in triplicates from sections of PFCE or formalin-fixed, cryo-embedded (FFCE) tissue blocks, or tissue snap-frozen in liquid nitrogen (LN2) mounted on slides with 12 μm thickness each. RNA quality and amplifiability was compared.

FIG. 11 shows RNA yield, purity, integrity and performance in quantitative, real time RT-PCR RNA was extracted in triplicates from sections of PFCE or FFCE tissue blocks, or LN2 snap-frozen tissue mounted on slides with 12 μm thickness each. RNA quality and amplifiability was compared.

Figure 12:
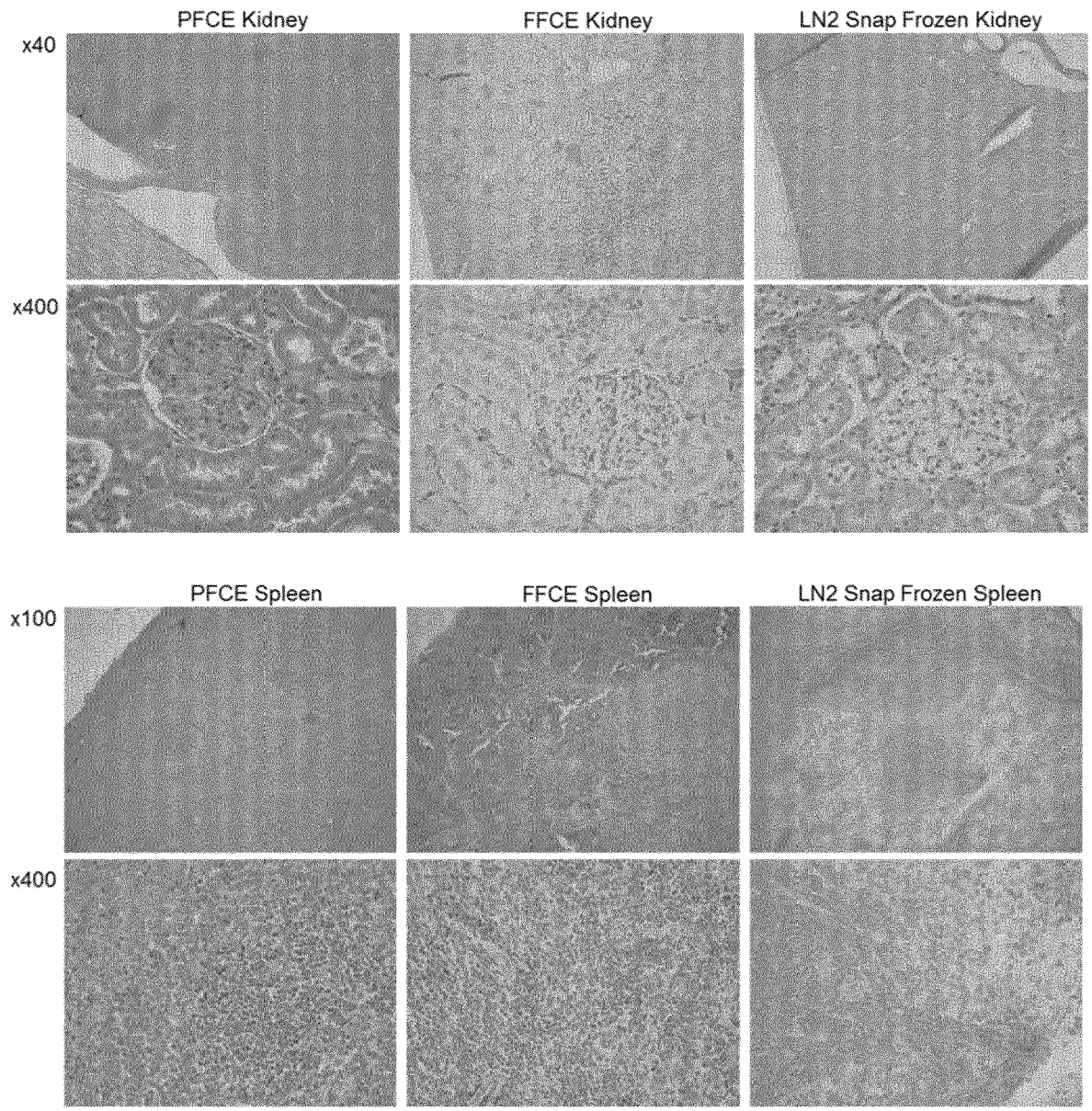
FIG. 12: H&E staining of sections of PFCE, FFCE and LN2 snap-frozen kidney and spleen rat tissue; sections with a thickness of 8 μm; original magnification ×40, ×100 and ×400.

FIG. 12 shows H&E staining of sections of PFCE, FFCE and LN2 Snap-frozen kidney and spleen rat tissue, sections with a thickness of 8 μm; original magnification ×40, ×100 and ×400.

Conclusions

High quality RNA with high integrity and good performance in quantitative, real time PCR (RT-qPCR) can be isolated from sections of PFCE tissue and LN2 snap-frozen tissue. RNA from FFCE tissue, despite good purity and good to moderate integrity showed a significant inferior performance in RT-qPCR compared to chemically unmodified RNA from PFCE and LN2 snap-frozen tissue.

Histological structures are preserved in PFCE and FFCE tissue samples. Overall morphology is preserved as well as fine-structures like nuclei, cell border and even nucleoli. Sections can be easily stained with hematoxylin and eosin. In sections of tissue snap-frozen in liquid nitrogen without prior fixation morphology is less preserved. Staining is paler; fine-structures are less visible. Artefacts like swelling and shrinkage can be observed.

10. Example 10

Preferred Protocol for Cryo-Embedding Tissue Specimens

The protocol is particularly suitable for cryo-embedding tissue specimens fixed and stabilized in either the PAX-GENER Tissue Container (cat. no. 765112) or the PAXGENER Tissue FIX Container (50 ml) (cat. no. 765112).

Equipment and Reagents
  Sucrose (high purity grade; e.g., MERCK®, cat. no. 107687)
  RNase-free water
  Dry ice
  2-Methylbulane (Isopentane) (e.g., SIGMA-ALDRICH®, cat. no. M32631) or liquid nitrogen
  Standard or small cryomolds (e.g., TISSUE-TEK®CRYOMOLD® Molds, VWR®, cat. nos. 25608-916 or 25608-922)
  Cryo-embedding medium (e.g., FSC22® Frozen Section Compound, LEICA® Biosystems, cat. no. 3801480)
  Specimen disc (e.g., LEICA®Biosystems, cat. no. 14047743739)
  Adhesion slides (e.g., SUPER-FROST® Plus Slides, VWR, cat. no. 631-0108)

Starting Material
  Starting material for cryo-embedding should be a tissue sample cut to a maximum size of 4×15×15 mm, placed into a standard tissue cassette and fixed and stabilized in either the PAXGENERTissue Container or the PAXGENE® Tissue FIXContainer (50 ml).

Things to do Before Starting
  Prepare a 30% sucrose solution (w/v) by dissolving 30 g sucrose (high purity grade) in 100 ml RNase-free water.

Procedure
Preparing Tissue Specimens
  1. Remove the fixed and stabilized tissue from the tissue cassette.
  2. As preparation for cryo-embedding, cut the fixed and stabilized tissue to a maximum thickness of 2 mm.
  Note: Smaller tissue samples or biopsies can be cryo-embedded without cutting.
  3. Transfer the tissue specimen into a suitable vial filled with at least 10 ml 30% sucrose solution.
  4. For cryo-protection, incubate the tissue specimen in the sucrose solution at 2-8° C. until the sample sinks to the bottom of the vial.
  Note: Some tissue types (e.g., lung tissue) do not sink. In such cases, overnight incubation is sufficient.
  5. Snap-freeze the tissue specimen either directly in 2-methylbutane cooled on dry ice followed by embedding into a cryo-embedding medium (see FIG. 1) or place the tissue into a cryomold filled with a cryo-embedding medium for simultaneous snap-freezing and embedding in liquid nitrogen (see FIG. 2).

Direct Snap-Freezing in 2-Methylbutane on Dry Ice and Cryo-Embedding (See FIG. 1)
  1. Fill a STYROFOAM™ box with dry ice. Place a suitable container filled with 2-methylbutane (isopentane) on the dry ice.
  2. Pre-cool the 2-methylbutane to approximately −60° C.
  Note: Pre-cooling can be accelerated by throwing small pieces of dry ice into the 2-methylbutane.
  3. Remove the tissue specimen from the sucrose solution and dab on an absorbent sheet to remove excess solution.
  4. Snap-freeze the tissue specimen by immersing it into the pre-cooled 2-methylbutane.
  Note: For optimal preservation of morphology and biomolecules it is essential to freeze the specimen quickly and uniformly.
  5. Fill an empty cryomold with cryosolidifiable cryo-embedding medium.
  6. Immerse the filled cryomold into the pre-cooled 2-methylbutane, such that 2-methylbutane contacts all sides of the mold but does not flood the cryo-embedding medium.
  7. When the cryo-embedding medium begins to turn white, use forceps to remove the tissue specimen from the 2-methylbutane and submerge it into the middle of the cryo-embedding medium.
  Note: Do not wait until the cryo-embedding medium has completely turned white.
  8. Immediately place a specimen disk (specimen holder) on top of the tissue within the cryo-embedding medium and submerge the cryomold completely into the 2-methylbutane.
  Note: It is essential for the quality of the morphology and nucleic acids to work quickly to avoid that the specimen thaws in the cryo-embedding medium.
  9. Keep the cryomold in the 2-methylbutane until the cryo-embedding medium has completely turned white.
  10. Remove the PAXGENER Tissue fixed, cryo-embedded (PFCE) block of tissue from the cryomold and store at −80° C. until sectioning.

Simultaneous Snap-Freezing and Cryo-Embedding Using Liquid Nitrogen (See FIG. 2)
  1. Fill an empty cryomold with cryosolidifiable cryo-embedding medium.
  2. Remove the tissue specimen from the sucrose solution and dab on an absorbent sheet to remove excess solution.
  3. Place the tissue specimen into the middle of the cryo-embedding medium.
  4. Place a specimen disk (specimen holder) on top of the tissue within the cryo-embedding medium.
  5. Using forceps, place the cryomold into liquid nitrogen such that the liquid contacts all sides of the mold but does not flood the cryo-embedding medium.
  Note: It is preferred not to hold the cryomold above the liquid level, as freezing in the gas phase takes longer.

Morphology preservation can be improved by placing the cryomold into liquid nitrogen as described.

Note: Do not submerge the cryomold completely into the liquid nitrogen. Doing so can crack the cryo-block.

6. Allow the cryo-embedding medium to completely turn white, and remove the cryomold from the liquid nitrogen.
7. Remove the PAXGENER Tissue fixed, cryo-embedded (PFCE) block of tissue from the cryomold and store at −80° C. until sectioning.

Conclusions

With this protocol, cryo-embedding of tissue specimens can be performed with excellent preservation of tissue morphology and biomolecules, in particular DNA, RNA and proteins.

11. Overall Conclusions for Examples 1-10

Biomolecules do not degrade in biological samples fixed with non-crosslinking fixative solutions, as exemplified by the precipitating PAXGENER Tissue fixative, incubated within 30% sucrose solution as part of the preparation for freezing and cryo-protection against freezing artefacts.

Freezing the samples quickly, either within a cryo-embedding medium in liquid nitrogen or directly within 2-methylbutane cooled on dry ice or liquid nitrogen, resulted in an improved preservation of morphology.

Freezing in liquid nitrogen as opposed to freezing in the gas phase of liquid nitrogen and avoiding delays in freezing resulted in improved preservation of morphological structures.

High-quality biomolecules can be purified from sections of PFCE tissue, either directly cut from blocks of PFCE tissue or from sections mounted on slides.

Fixation and cryo-embedding with PAXGENER Tissue fixed and stabilized samples combines the advantages of a FFCE and LN2 snap-frozen sample: morphology is preserved comparable to formalin fixation; biomolecules like RNA are preserved as within a LN2 snap-frozen sample.

Materials and Methods for Examples 11-14

Abbreviations

PFCE: PAXGENER Tissue fixed, cryo-embedded
PFPE: PAXGENER Tissue fixed, paraffin embedded
MMP: Matrix Metalloproteinase
BSA: Bovine Serum Albumin
LMD: Laser Microdissection
β-ME: β-Mercaptoethanol
miRNA: microRNA Materials Used The materials used are indicated in the sub-section on experimental procedures (see below).

Experimental Procedures

Rat Tissue:

An animal rat model was used to collect, store and process tissue samples (liver, spleen, intestine, lung, heart and stomach) under highly controlled pre-analytical conditions. Rats (*R. norvegicus*) were maintained and sacrificed in accordance with the German protection of animals act. Rats were raised to a weight of approximately 500 g after which time the animals were sacrificed and organs removed within 10 min of sacrifice. Three adjacent, equally sized samples no larger than 15×15×4 mm were grossed from each organ.

Generation of PAXGENER Tissue Fixed, Cryo-Embedded (PFCE) Tissue:

To produce PFCE blocks, rat tissue samples were fixed and stabilized in PAXGENE® Tissue Containers directly after resection, according to the information on tissue fixation and stabilization contained in the PAXGENER Tissue Container Product Circular. Briefly, tissue was incubated for 2 h to 24 h in PAXGENER Tissue FIX depending on tissue size and then kept in PAXGENER Tissue STABILIZER at 4° C. until processing.

Processing into PFCE tissue blocks including sucrose washing, snap-freezing and cryo-embedding was performed according to the preferred protocol for cryo-embedding tissue specimens of Example 10 with liquid nitrogen (see above).

Isolation of Total RNA from PFCE Tissue:

For isolation of total RNA from PFCE tissue, 3×10 µm sections were transferred to a microcentrifuge tube and total RNA was extracted using the PAXGENER Tissue RNA Kit and the Supplementary protocol for Purification of total RNA from sections of PAXGENE® Tissue fixed, cryo-embedded (PFCE) tissue (protocol version PX18 Oct-15).

In short, the temperature of a shaker-incubator was set to 56° C. and 10 µl β-Mercaptoethanol (β-ME) per 1 ml Buffer TR1 were added to Buffer TR1 before use, and the following procedure was applied for total RNA isolation:

1. Label the lid and the body of a 1.5 ml safelock microcentrifuge tube. Prepare a lysis mixture in the tube by mixing 150 µl Buffer TR1 with 290 µl RNase-free water. Mix by gently flicking the tube. Add 10 µl Proteinase K, mix again and centrifuge briefly (1-2 s at 500-1000×g) to collect residual liquid from the sides of the tube.
   Note: Do not mix Buffer TR1 and Proteinase K before adding water.
2. Pre-cool the lysis reagent mixture on ice.
3. Using a cryostat, make a tissue section of 8-12 µm thickness from the PFCE tissue.
4. Using pre-cooled forceps, transfer the PFCE tissue section into the lysis reagent cooled on ice and mix by vortexing for 5 s.
5. If required, repeat steps 2 and 3 for a maximum of 3 sections.
6. Incubate the tissue on a shaker-incubator for 15 min at 56° C. and 1400 rpm.
7. Centrifuge for 3 min at maximum speed (but do not exceed 20,000×g).
8. Carefully transfer the supernatant to a new 1.5 ml microcentrifuge tube without disturbing the pellet.
9. Continue with the addition of ethanol in step 12 of the protocol "Purification of Total RNA from Sections of PFPE Tissue" in the PAXGENER Tissue RNA Kit Handbook (PAXGENE® Tissue RNA Kit Handbook version 12/2014).

Then, the RNA integrity was analysed on the Agilent Bioanalyser Nano Chip according to the manufacturer's instructions.

Isolation of Total RNA, Including miRNA, from PFCE Tissue:

For isolation of total RNA, including miRNA, from PFCE tissue, a 1×10 µm section was transferred on a slide and RNA was extracted from an area of 1 $mm^2$ using the PAXGENE® Tissue miRNA Kit and the Supplementary protocol for Purification of total RNA, including miRNA, from microdissected PAXGENER Tissue fixed, paraffin embedded (PFPE) and PAXGENER Tissue fixed, cryo-embedded (PFCE) tissues (protocol version PX19 Oct-15).

In short, 80% ethanol was prepared by mixing ethanol (96-100%, purity grade p.a.) and RNase-free water and the temperature of a shaker-incubator was set to 56° C. for the PFCE tissues. Before using the Buffer TM2 and Buffer TM3 for the first time, 3 volumes of isopropanol were added to Buffer TM2 and 4 volumes of ethanol (96-100%, purity grade p.a.) were added to Buffer TM3 to obtain working solutions. 10 µl β-Mercaptoethanol (β-ME) per 1 ml Buffer TR1 were added to Buffer TR1 before use.

Carrier RNA was prepared as indicated in the Supplementary Protocol and was used in the following procedure (5 µl of a 4 ng/µl solution). The carrier RNA did not impact RT PCR performance and the concentration of carrier RNA was eliminated from total concentration calculations.

Then the following procedure was applied:
1. Label the lid and the body of a 1.5 ml safelock microcentrifuge tube. Prepare a lysis mixture in the tube by pipetting 75 µl RNase-free water and 10 µl Proteinase K. Mix by gently flicking the tube, and centrifuge briefly (1-2 s at 500-1000×g) to collect residual liquid from the sides of the tube.
   When processing <5000 cells, add 20 ng of carrier RNA (5 µl of a 4 ng/µl solution) to the mixture.
2. Using a cryostat, make a tissue section of 6-12 µm thickness from a cryo-embedded tissue block. Capture the tissue section on an RNase-free adhesion slide.
3. Remove embedding medium and stain (optional) according to the Supplementary Protocol Preparation of sections from PAXGENER Tissue fixed, paraffin-embedded (PFPE) and PAXGENER Tissue fixed, cryo-embedded (PFCE) tissue for manual or laser microdissection (LMD) (also described in the below section on Laser Microdissection (LMD) from PFCE tissue). Keep freshly prepared slides in ice-cold ethanol until microdissection.
4. For manual microdissection, remove the slide from the ethanol. Using an absorbent sheet, wipe away the liquid on the slide that surrounds the tissue section.
5. Place the slide on a horizontal working plate, and overlay the section with 85 µl ice-cold Buffer TM1. Make sure that the whole section is covered.
6. Detach the tissue on the slide by pipetting the lysis mixture up and down. Transfer the tissue and all liquid to the labeled 1.5 ml safelock microcentrifuge tube from step 1 and mix by vortexing for 5 s.
7. Incubate the tissue on a shaker-incubator for 15 min at 1400 rpm and 56° C.
8. After incubation, centrifuge briefly (1-2 s at 500-1000× g) to remove drops from the tube lid.
9. Add 240 µl ethanol (96-100%, purity grade p.a.). Mix by vortexing for 5 s and centrifuge briefly (1-2 s at 500-1000×g) to remove drops from the tube lid.
10. Pipet the sample, including any precipitate that may have formed, into a PAXGENE® RNA MinElute spin column (red) positioned in a 2 ml processing tube. Centrifuge for 15 s at 8000×g. Place the spin column in a new 2 ml processing tube and discard the old processing tube containing the flow-through.
11. Continue with step 15 of the protocol "Purification of Total RNA, Including miRNA, from Sections of PFPE Tissue" in the PAXGENER Tissue miRNA Kit Handbook (version 12/2014).

Then, the miRNA integrity was analyzed on the Agilent Bioanalyser Small Chip.

PCR performance was shown by amplification of 5 µl eluate with a specific miRNA RT-PCR Assay. Briefly, a specific Hs_RNU1A, TAQMAN® Gene Expression Assay from Applied Biosystems was used in combination with the QIAGEN miScript reverse transcription system and the QUANTITECT™ SYBR® Green PCR Kit. PCR and analysis was performed on the Applied Biosystems 7900HT Fast Real-Time PCR System Preparation of Full-Length (Phospho-) Proteins from PFCE Tissue:

Full-length proteins, including phosphorylated proteins were extracted from blocks of PFCE tissue using reagents from the QIAGEN QPROTEOME® FFPE Kit.

Using a cryostat, a tissue section of 10 µm thickness was prepared from a PFCE tissue block and directly captured on an adhesion slide. The slide was placed on a horizontal working plate and overlaid with 50 µl ice-cold Extraction Buffer EXB Plus.

The tissue was detached from the slide by carefully pipetting the lysis mixture up and down and the entire liquid was transferred to a 2 ml collection tube.

For mechanical disruption of the sample, a metal ball was added and homogenization was performed using the Qiagen TissueLyser LT. at 25 Hz. for 2 min (liver) or 4 min (stomach). After a short incubation on ice and centrifugation to remove foam, the metal ball was removed from the samples. Stomach tissue was then additionally sonicated in a water bath at an impulse of 20 and amplitude of 50%.

Next, the samples were incubated in a heating block at 95° C. for 10 min, centrifuged for 5 min at 12,500×rpm and 4° C., and the supernatant was then transferred to a new 1.5 ml collection tube containing the extracted proteins.

For quantification of protein yield, the Bradford method was used (BIO-RAD®) according to manufacturer's instructions.

Protein quality was assessed by PAGE and Western Blot analysis. Briefly, 12.5 µg protein extract was loaded on a SDS-PAGE gel and run for 105 min at 100V. Proteins were transferred to a membrane for 105 min at 100V. After blocking with 5% matrix metalloproteinase (MMP) or bovine serum albumin (BSA), the membrane was stained for following proteins: erk (dil. 1:1000), p-erk (dil. 1:1000), akt (dil. 1:1000), p-akt (dil. 1:1000), e-cadherin (dil. 1:5000), B-act (dil. 1:5000). Bands were detected by exposure for 2 min (erk, akt, B-act), 4 min. (e-cadherin), 16 min. (p-akt) or 30 min. (p-erk).

The antibodies used for protein staining were as follows:

| Primary antibodies | MW | Supplier | Order No |
|---|---|---|---|
| E-cadherin | 120 | BD | 610182 |
| p44/42 MAPK (Erk ½) | 42, 44 | Cell signaling | 9102 |
| Phospho-p44/42 MAPK (Erk ½) (Thr202/Tyr204) | 42, 44 | Cell signalling | 9101 |
| AKT | 60 | Cell signaling | 9272 |
| Phospho-AKT (Ser473) | 60 | Cell signaling | 9271 |
| β-actin | 42 | Sigma | A1978 AC-15 |

| Secondary antibodies | Supplier | Order No |
|---|---|---|
| Anti-Mouse-HRP | GE Healthcare | NA931-1ML |
| Anti-rabbit-HRP | Cell signaling | 7074 |

Data was kindly provided by Karl-Friedrich Becker, Technical University of Munich, Germany.

Laser Microdissection (LMD) from PFCE Tissue:

a) Preparation of Slides for LMD

LMD from sections of PFCE tissue was performed using the Leica LMD6000 Laser Microdissection System. The system was operated according to manufacturer's guidelines and instructions. Preparation of slides for LMD and staining was done as described in the PREANALYTIX® Supplementary Protocol for Preparation of sections from PAXGENE® Tissue fixed, paraffin-embedded (PFPE) and PAXGENER Tissue fixed, cryo-embedded (PFCE) tissues for manual or laser microdissection (LMD) (protocol version PX20 Oct-15).

Therefore in short, RNase-free equipment and reagents (e.g., microtome, slides, water, water bath, incubator, staining devices) were prepared. 96% ethanol was pre-cooled on ice. A water bath and an incubator were heated to 40° C.

RNase-free hematoxylin solution was freshly prepared by:

Dissolving 50 g aluminium potassium sulfate in 425 ml RNase-free water in a heated water bath.

Dissolving 2.5 g hematoxylin in 25 ml 96% ethanol in a heated water bath.

Carefully mixing the hematoxylin solution and aluminium potassium sulfate solution.

Adding 125 mg sodium iodate, chilling to room temperature and adding 2 ml 100% acetic acid.

Also, an eosin solution was freshly prepared by:

Adding 2.5 g Eosin Y to 500 ml RNase-free water and stirring for 2 h at room temperature.

Adding 2 ml 100% acetic acid.

Then the following procedure was applied:

1. Using a cryostat, make a tissue section of 6-12 µm thickness from a PFCE tissue block. If the sample surface has been exposed to air, discard the first 2 or 3 sections.
2. Carefully transfer the section without folds onto the membrane of a frame slide for LMD.
3. Air-dry the slide for 1 min at room temperature (15-25° C.).
4. Perform the steps in Table 1 to remove the cryo-medium from the PFCE tissue sections.

TABLE 1

| Step | Media | Incubation time |
| --- | --- | --- |
| 1 | 70% Ethanol | 1 min |
| 2 | 50% Fresh Ethanol | 45 s |
| 3 | 30% Fresh Ethanol | 30 s |

5. Optional: Perform H&E staining. Follow the incubation steps in Table 2. If H&E staining is not performed immediately, transfer the slide to ice-cold 96% ethanol for transport or short-term storage.

TABLE 2

| Step | Media | Incubation time |
| --- | --- | --- |
| 1 | RNase-free water | 30 sec |
| 2 | Hematoxylin solution | 1 min |
| 3 | RNase-free water | 30 sec |
| 4 | RNase-free water | 30 sec |
| 5 | Eosin solution | 10 sec |
| 6 | 70% Ethanol | 30 sec |
| 7 | 96% Ethanol | 30 sec |
| 8 | 100% Ethanol | Until use |

An area of 0.005 mm$^2$ to 1 mm$^2$ (20-12000 cells) was selected for LMD. Total RNA, total RNA including miRNA and genomic DNA were extracted from the LMD specimens according to the respective PREANALYTIX® Supplementary Protocols:

b) Extraction of Total RNA

Total RNA was extracted according to the PREANALYTIX® Supplementary Protocol for Purification of total RNA from microdissected PAXGENER Tissue fixed, paraffin-embedded (PFPE) and PAXGENE® Tissue fixed, cryo-embedded (PFCE) tissues (protocol version PX17 Oct-15).

In short, the temperature of a shaker-incubator was set to 56° C. 10 µl β-ME per 1 ml Buffer TR1 was added to Buffer TR1 before use. TR1 buffer was pre-cooled on ice. Before using the Buffer TR3, ethanol (96-100%, purity grade p.a.) was added in the amount indicated on the bottle to obtain a working solution. A DNase I stock solution was prepared by dissolving the solid DNase I in 550 µl DNase resuspension buffer (RNase-free water).

Carrier RNA was prepared as indicated in the Supplementary Protocol and was used in the following procedure (5 µl of a 4 ng/µl solution). The carrier RNA did not impact RT PCR performance and the concentration of carrier RNA was eliminated from total concentration calculations.

Then in short the following procedure was applied for total RNA extraction:

1. Using a cryostat, make a tissue section of 6-12 µm thickness from a cryo-embedded tissue block. Capture the tissue section on a frame slide with membrane for laser microdissection (as described above, see sub-section a) above).
2. Remove embedding medium and stain (optional) according to the Supplementary Protocol Preparation of sections from PAXGENE® Tissue fixed, paraffin-embedded (PFPE) and PAXGENER Tissue fixed, cryo-embedded (PFCE) tissue for manual or Laser microdissection (LMD) (as described above, see sub-section a) above). Keep freshly prepared slides in ice-cold ethanol until laser microdissection.
3. Using a Laser Microdissection System, dissect a tissue area of ≥5000 µm2 (≥50 cells) from the PFCE LMD slide.
4. Collect cells directly into a dedicated collection tube filled with 15 µl Buffer TR1 (e.g., use the cap of a 0.5 ml PCR tube when using a Leica LMD system). If not possible, add Buffer TR1 immediately after collecting the cells.
5. Add 65 µl Buffer TR1. Mix by vortexing for 30 s and centrifuge briefly (1-2 s at 500-1000×g) to remove drops from the tube lid.
6. If processing <5000 cells, 20 ng carrier RNA (5 µl of a 4 ng/µl solution) may be added to the lysate.
7. Add 145 µl RNase-free water and 5 µl Proteinase K and mix by vortexing for 5 s. Do not mix Buffer TR1 and Proteinase K before adding them to the sample.
8. Incubate on a shaker-incubator for 15 min at 56° C. and 1400 rpm. After incubation, centrifuge briefly (1-2 s at 500-1000×g) to remove drops from the tube lid.

9. Transfer the sample and Buffer TR1 to a 1.5 ml safelock microcentrifuge tube.
10. Continue with the addition of ethanol as described in step 12 of the protocol "Purification of Total RNA from Sections of PFPE Tissue" in the PAXGENER Tissue RNA Kit Handbook (version 12/2014).

c) Extraction of Total RNA, Including miRNA

Total RNA, including miRNA, was extracted according to the PREANALYTIX® Supplementary Protocol for Purification of total RNA, including miRNA, from microdissected PAXGENE® Tissue fixed, paraffin embedded (PFPE) and PAXGENE® Tissue fixed, cryoembedded (PFCE) tissues (protocol version PX19 Oct-15).

In short, 80% ethanol was prepared by mixing ethanol (96-100%, purity grade p.a.) and RNase-free water and the temperature of a shaker-incubator was set to 56° C. for the PFCE tissues. Before using the Buffer TM2 and Buffer TM3 for the first time, 3 volumes of isopropanol were added to Buffer TM2 and 4 volumes of ethanol (96-100%, purity grade p.a.) were added to Buffer TM3 to obtain working solutions. 10 µl β-Mercaptoethanol (β-ME) per 1 ml Buffer TR1 were added to Buffer TR1 before use.

Carrier RNA was prepared as indicated in the Supplementary Protocol and was used in the following procedure (5 µl of a 4 ng/µl solution). The carrier RNA did not impact RT PCR performance and the concentration of carrier RNA was eliminated from total concentration calculations.

Then the following procedure was applied:
1. Using a cryostat, make a tissue section of 6-12 µm thickness from a cryo-embedded tissue block. Capture the tissue section on a frame slide with membrane for laser microdissection (as described above, see sub-section a) above).
2. Remove embedding medium and stain (optional) according to the Supplementary Protocol Preparation of sections from PAXGENER Tissue fixed, paraffin-embedded (PFPE) and PAXGENER Tissue fixed, cryo-embedded (PFCE) tissue for manual or laser microdissection (LMD) (as described above, see sub-section a) above). Keep freshly prepared slides in ice-cold ethanol until laser microdissection.
3. Using a Laser Microdissection System, dissect a tissue area of ≥5000 µm2 (≥50 cells) from the PFPE or PFCE LMD slide.
4. Collect cells directly into a dedicated collection tube filled with 15 µl Buffer TM1 (use, for example, the cap of a 0.5 ml PCR tube when using a Leica LMD system). If not possible, add Buffer TM1 immediately after collecting the cells.
5. Add 60 µl Buffer TM1. Mix by vortexing for 30 s, and centrifuge briefly (1-2 s at 500-1000×g) to remove drops from the tube lid.
6. If processing <5000 cells, 20 ng carrier RNA (5 µl of a 4 ng/µl solution) may be added to the lysate.
7. Add 75 µl RNase-free water and 10 µl Proteinase K and mix by vortexing for 5 s. Do not mix Buffer TM1 and Proteinase K before adding them to the sample.
8. Incubate on a shaker-incubator for 15 min at 56° C. and 1400 rpm. After incubation, centrifuge briefly (1-2 s at 500-1000×g) to remove drops from the tube lid.
9. Add 240 µl ethanol. Mix by vortexing for 5 s and centrifuge briefly (1-2 s at 500-1000×g) to remove drops from the tube lid.
10. Pipet the sample, including any precipitate that may have formed, into a PAXGENE® RNA MinElute spin column (red) positioned in a 2 ml processing tube. Centrifuge for 15 s at 8000×g. Place the spin column in a new 2 ml processing tube and discard the old processing tube containing the flow-through.
11. Continue with the wash of step 15 of the protocol "Purification of Total RNA, including miRNA, from sections of PFPE tissue" in the PAXGENER Tissue miRNA Kit Handbook (version 12/2014).

d) Extraction of Genomic DNA

Genomic DNA was extracted according to the PREANALYTIX® Supplementary Protocol for Purification of genomic DNA from microdissected PAXGENER Tissue-fixed, paraffin-embedded (PFPE) and PAXGENE® Tissue-fixed, cryo-embedded (PFCE) tissues (protocol version PX15 Oct-15).

In short, before using the Buffer TD3 and Buffer TD4 for the first time the amount of ethanol (96-100%, purity grade p.a.) indicated on the bottle was added to obtain a working solution.

The temperature of a shaker-incubator was set to 56° C. for the Proteinase K digestion. 80% ethanol was prepared by mixing ethanol (96-100%, purity grade p.a.) and RNase-free water. The ethanol was precooled in a staining dish on ice.

Carrier RNA was prepared as indicated in the Supplementary Protocol and was used in the following procedure (5 µl of a 4 ng/µl solution). The carrier RNA did not impact RT PCR performance and the concentration of carrier RNA was eliminated from total concentration calculations.

Then the following procedure was applied:
1. Using a cryostat, make a tissue section of 6-12 µm thickness from a cryo-embedded tissue block. Capture the tissue section on a frame slide with membrane for laser microdissection (as described above, see sub-section a) above).
2. Remove embedding medium and stain (optional) according to the Supplementary Protocol Preparation of sections from PAXGENER Tissue fixed, paraffin-embedded (PFPE) and PAXGENER Tissue fixed, cryo-embedded (PFCE) tissue for manual or Laser microdissection (LMD) (as described above, see sub-section a) above). Keep freshly prepared slides in ice-cold ethanol until laser microdissection.
3. Using a Laser Microdissection System, dissect a tissue area of ≥5000 µm2 (≥50 cells) from the PFPE or PFCE LMD slide.
4. Collect cells directly into a dedicated collection tube filled with 15 µl Buffer TD1 (e.g., use the cap of a 0.5 ml PCR tube when using a Leica LMD system). If not possible, add buffer TD1 immediately after collecting the cells.
5. Add 165 µl Buffer TD1. Mix by vortexing for 30 s and centrifuge briefly (1-2 s at 500-1000×g) to remove drops from the tube lid.
   If processing <5000 cells, 20 ng carrier RNA (5 µl of a 4 ng/µl solution) may be added to the lysate.
6. Add 20 µl Proteinase K and mix by vortexing for 5 s. Do not mix Buffer TD1 and Proteinase K before adding them to the sample.
7. Incubate the tissue on a shaker-incubator for 1 h at 56° C. and 1400 rpm. If RNA-free genomic DNA is required, add 4 µl RNase A (100 mg/ml), mix by vortexing and incubate for 2 min at room temperature (15-25° C.).
8. Optional for PFPE tissue: Increase the temperature of the shaker-incubator to 80° C. and incubate for an additional 1 h at 1400 rpm (step not performed).
9. After incubation, centrifuge briefly (1-2 s at 500-1000× g) to remove drops from the tube lid.

10. Transfer the sample and Buffer TD1 into a 1.5 ml safelock microcentrifuge tube.
11. Add 200 µl buffer TD2 to the sample. Mix by vortexing for 15 s to yield a homogenous solution 12. Continue with the addition of ethanol in step 14 of the protocol "Purification of Genomic DNA from Sections of PAXGENER Treated, Paraffin-Embedded Tissue", in the PAXGENE® Tissue DNA Kit Handbook (version 12/2014).

12. Example 11

Isolation of Total RNA and Analysis of Integrity

Total RNA was isolated from PFCE tissue and the RNA integrity was analysed on the Agilent Bioanalyser Nano Chip as described in the Materials and Methods section (see above).

Figure 13:
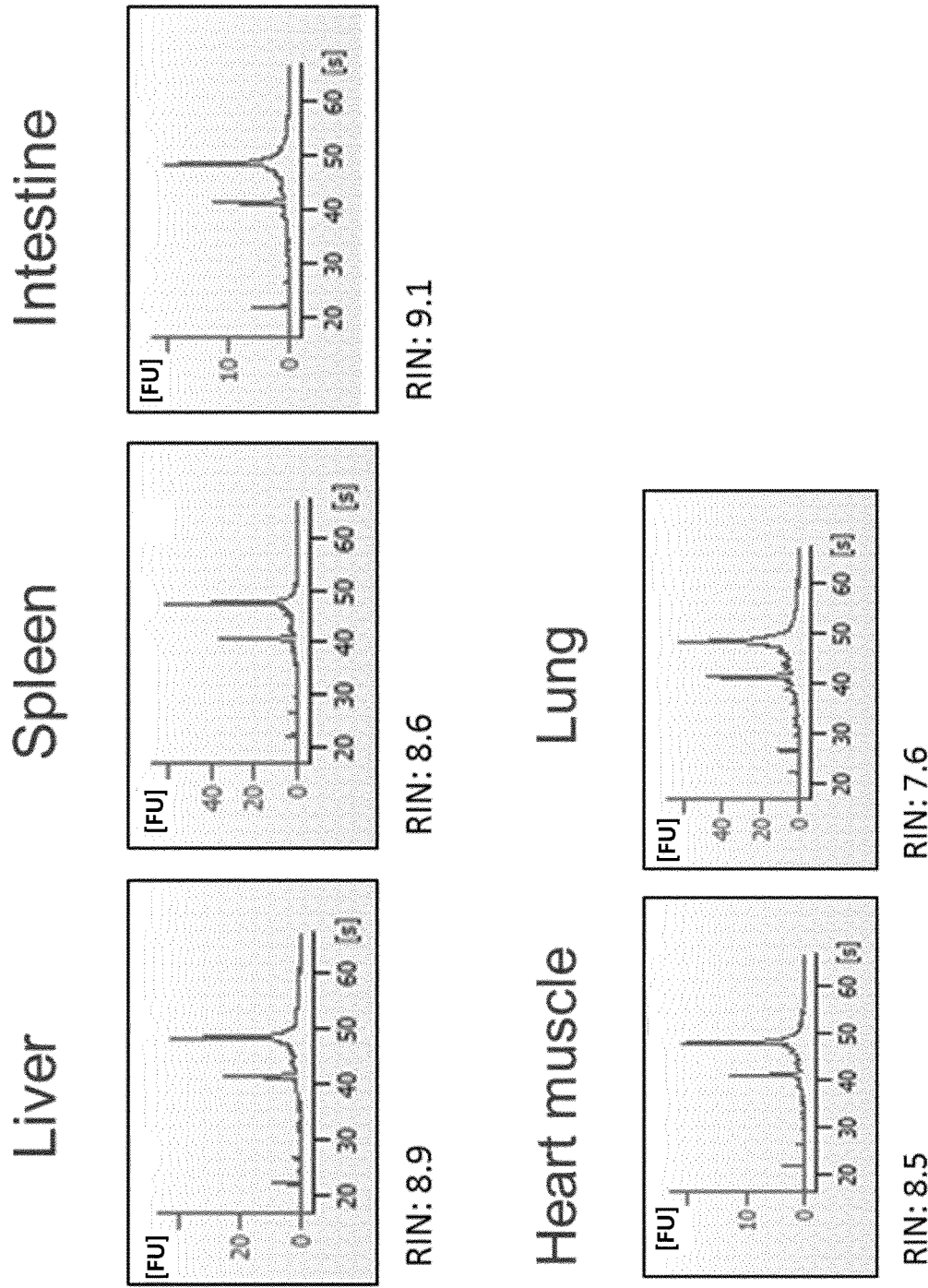
FIG. 13: Integrity of total RNA isolated from PFCE rat tissue prepared from different organs (liver, spleen, intestine, heart muscle, lung), analysed on an Agilent Bioanalyser Nano Chip. The figure shows the results obtained for each tissue as electropherograms. For each tissue, the y axis of the electropherogram shows the relative intensity of the fluorescence signal [FU] that is proportional to the RNA concentration at any given size; the x axis shows the relative RNA size as migration time [s] through the gel chip (higher number=larger molecule size). The 18S and 28S ribosomal RNAs are visible as distinct peaks for each sample (left peak at approx. 40 s, 18S; right peak at approx. 50 s, 28S). For each tissue, also the determined RNA integrity number (RIN) is indicated below the respective electropherogram.

The results are shown in FIG. 13. The figure shows the integrity of total RNA isolated from PFCE rat tissue prepared from different organs (liver, spleen, intestine, heart muscle, lung), analysed on an Agilent Bioanalyser Nano Chip. The results obtained for each tissue are shown as electropherograms. For each sample, the y axis of the electropherogram shows the relative intensity of the fluorescence signal [FU] that is proportional to the RNA concentration at any given size; the x axis shows the relative RNA size as migration time [s] through the gel chip (higher number=larger molecule size). The 18S and 28S ribosomal RNAs are visible as distinct peaks for each sample (left peak at approx. 40 s, 18S; right peak at approx. 50 s, 28S).

As can be seen from the distinct and sharp peaks obtained for 18S and 28S ribosomal RNA, total RNA of high integrity and therefore quality was obtained from each of the analyzed PFCE tissues, indicating that total RNA is well-preserved with the method according to the first aspect disclosed herein.

For each tissue, also the determined RNA integrity number (RIN) is indicated below the respective electropherogram in FIG. 13. The RIN is an algorithm for assigning integrity values to RNA measurements. RIN values range from 10 (intact) to 1 (totally degraded). The RIN is for example discussed in Schroeder et al. "The RIN: an RNA integrity number for assigning integrity values to RNA measurements" (BMC Molecular Biology 2006; 7:3). Typically, RNA having a RIN value of at least 5 is considered suitable for standard methods such as e.g. RT-PCR applications, including qPCR applications (see e.g. S. Fleige, M. W. Pfaffl/Molecular Aspects of Medicine 27 (2006) 126-139).

As can be seen, excellent RIN values were obtained that for all of the analyzed PFCE tissues that were well above 5 and for most PFCE tissues even above 8, indicating that the isolated total RNA has excellent integrity and is suitable also for very demanding downstream applications.

13. Example 12

Isolation of Total RNA, Including miRNA, and Analysis of Integrity

Total RNA, including miRNA, was isolated from PFCE tissue and the miRNA integrity was analysed on the Agilent Bioanalyser Small Chip as described in the Materials and Methods section (see above).

The results are shown in FIG. 14. FIG. 14A shows an Agilent Bioanalyzer gel-like image. The y axis indicates the size of the RNA, expressed as [nt]. Left lane: ladder; second lane: liver; third lane: colon; fourth lane: spleen.

As can be seen from the bands obtained for each PFCE tissue, RNA of small size including RNA in a size range of about 110 nt, about 90 nt, and about 40-70 nt was isolated and therefore was preserved by the method according to the first aspect disclosed herein.

Figure 14A:
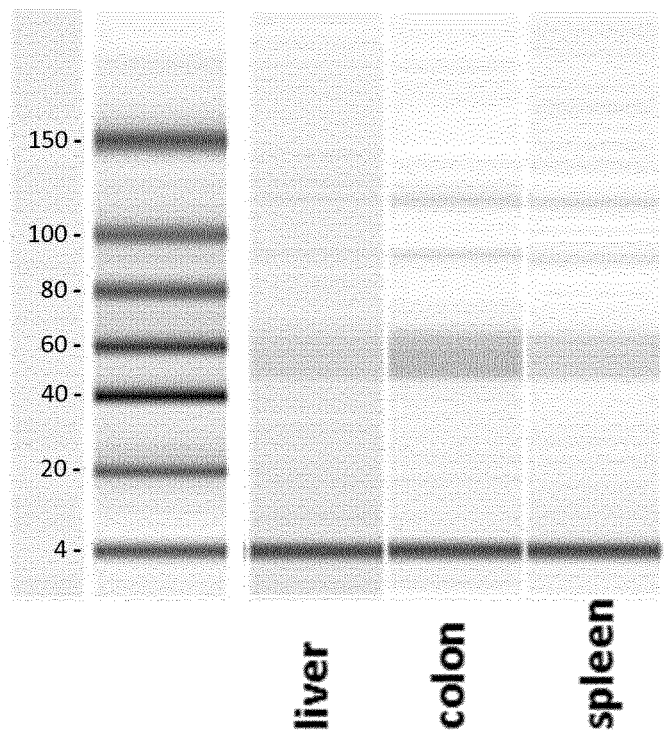
FIG. 14A, B, C, D: Integrity of miRNA isolated from PFCE rat tissue prepared from different organs (liver, colon, spleen), analysed on an Agilent Bioanalyser Small Chip.
Figure 14B:
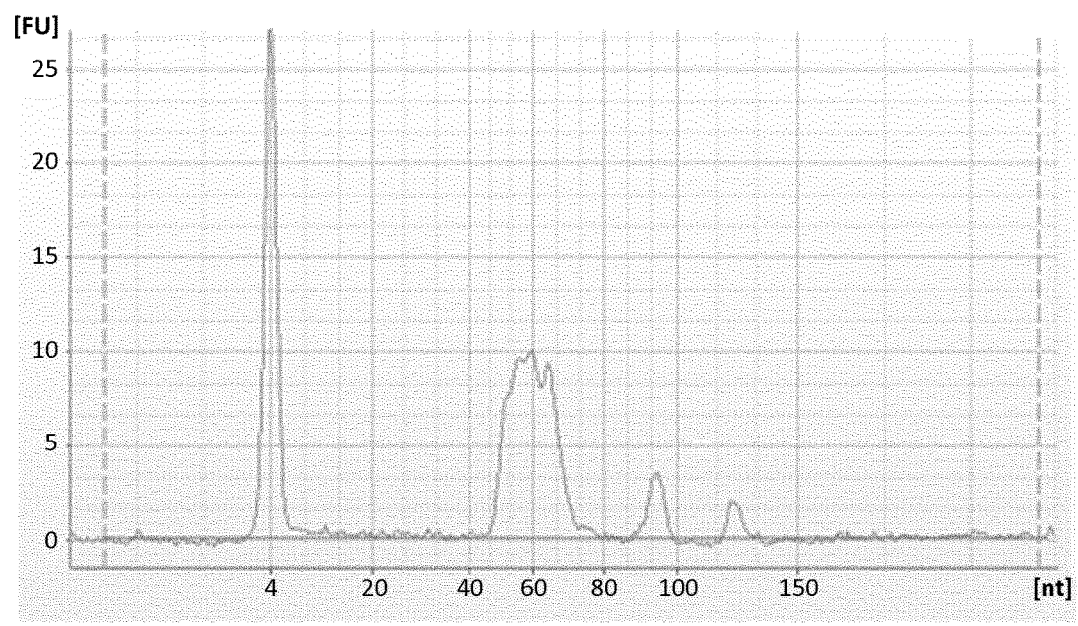
FIG. 14 B: Exemplary electropherogram of miRNA from a PFCE colon sample; the y axis of the electropherogram shows the relative intensity of the fluorescence signal [FU]; the x axis shows the RNA size [nt].
Figure 14C:
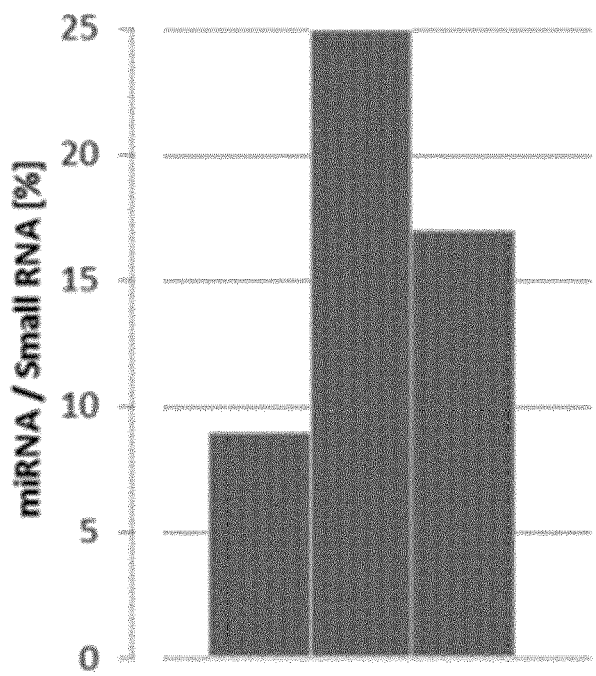
Figure 14D:
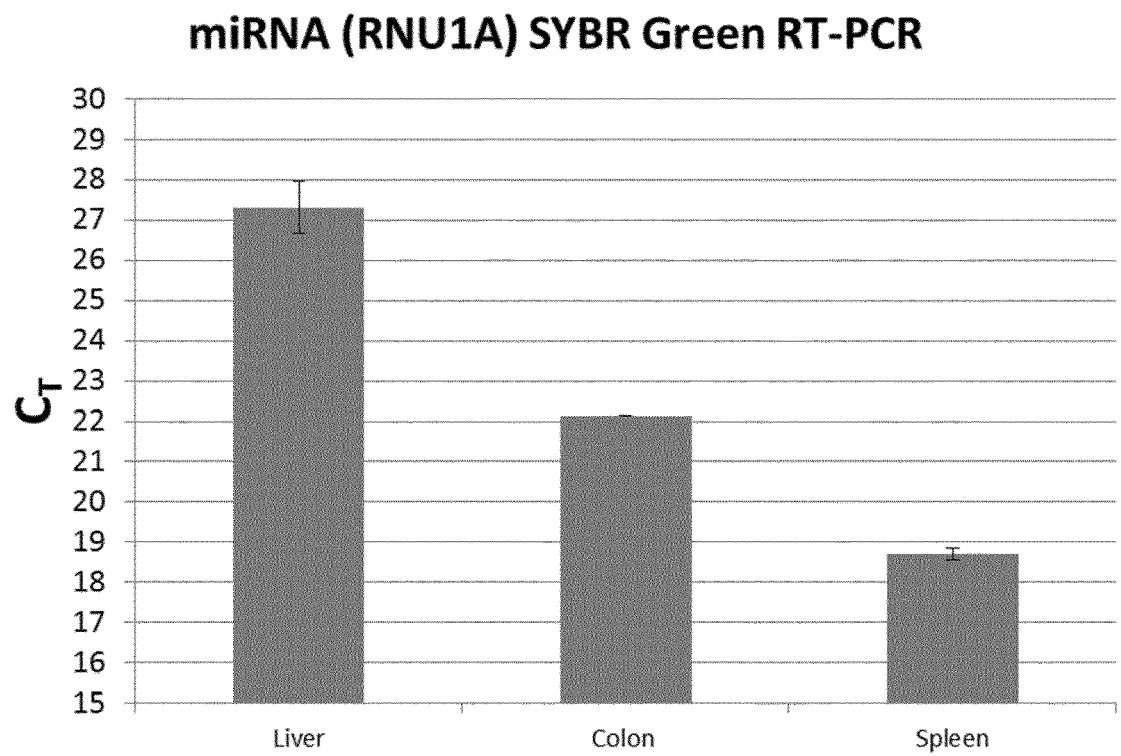

FIG. 14A, B, C, D: Integrity of miRNA isolated from PFCE rat tissue prepared from different organs (liver, colon, spleen), analysed on an Agilent Bioanalyser Small Chip.

FIG. 14A: The figure shows an Agilent Bioanalyzer gel-like image. The y axis indicates the size of the RNA, expressed as [nt]. Left lane: ladder; second lane: liver; third lane: colon; fourth lane: spleen. As can be seen, the main band is at about 60 nt. The strong band visible at 4 nt is the alignment band of the chip, and not derived from the biological samples analysed.

FIG. 14 B: Exemplary electropherogram of miRNA from a PFCE colon sample; the y axis of the electropherogram shows the relative intensity of the fluorescence signal [FU]; the x axis shows the RNA size [nt]. The 60 nt peak corresponds to the main band visible in FIG. 14A.

As can be seen from FIGS. 14A and B, the most small RNAs are detected at about 60 nt, which also corresponds to the expected miRNA size. The band distribution and intensity lie in the specific range for miRNA. Additional small RNA such as tRNA is also detected e.g. in the 100 nt range.

FIG. 14 C: The figure shows the results of a quantification of the graphical display of FIG. 14A and of the intensity measurement of FIG. 14 B. It indicates the ratio of miRNA to small RNA determined by the Bioanalyzer from the concentrations of the miRNA fraction and total small RNA fraction using the marker band intensity as reference. Y axis: ratio of miRNA to small RNA [%]; x axis: PFCE tissue, left bar: liver, middle bar: colon, right bar: spleen.

FIG. 14 D shows performance of miRNA from PFCE tissue in a target-specific RT-PCR assay. Briefly, 5 µl 1:5 diluted RNA, including miRNA eluate from microdissected liver, colon and spleen PFCE tissue was amplified using specific primers for target miRNA (Hs_RNU1A, TAQMAN® Gene Expression Assay, Applied Biosystems), the QIAGEN miScript reverse transcription system and the QUANTITECT™ SYBR® Green PCR Kit. Data is shown as mean RAW CT values and SD for triplicate amplifications. RNU1A miRNA could be detected with high quantity and high sensitivity in total RNA, including miRNA from all tested tissue types, processed into PFCE tissue blocks.

14. Example 13

Isolation and Analysis of Full-Length (Phospho-) Proteins

Full-length proteins, including phosphorylated proteins, were extracted from blocks of PFCE tissue (liver and stomach) and extracted proteins (12.5 µg) were analysed using the Western-Blot technique and specific antibody staining to detect unphosphorylated and phosphorylated forms of ERK, AKT, E-catherin and β-actin as described above in the Materials and Methods section.

Figure 15:
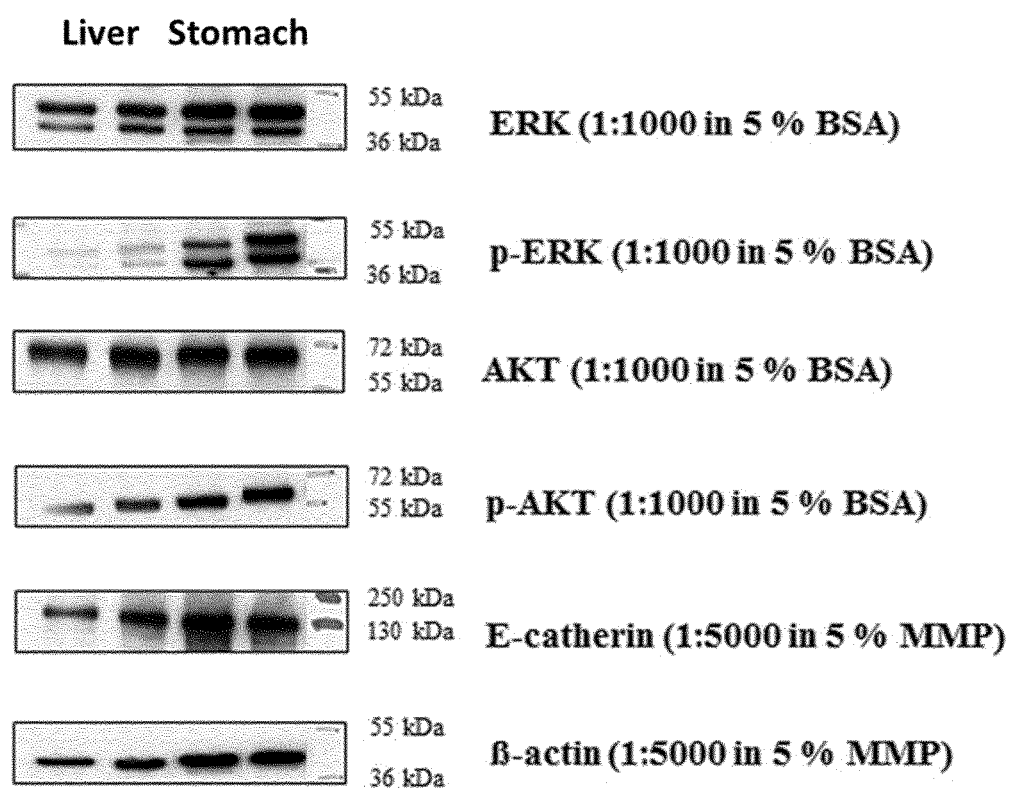
FIG. 15: The figure shows western-blot results obtained for the individual antibodies identified for each blot (uppermost row: ERK, second row: phosphorylated ERK (p-ERK); third row: AKT; fourth row: phosphorylated AKT (p-AKT); fifth row: E-catherin; sixth row: ß-actin). For each blot, the first and second samples from the left are protein samples from PFCE liver tissue, the third and fourth samples are protein samples from PFCE stomach tissue. Right: ladder.

The results are shown in FIG. 15. The figure shows western-blot results obtained for the individual antibodies identified for each blot (uppermost row: ERK, second row: phosphorylated ERK (p-ERK); third row: AKT; fourth row: phosphorylated AKT (p-AKT); fifth row: E-catherin; sixth row: β-actin). For each blot, the first and second lanes from the left are protein samples from PFCE liver tissue, the third and fourth samples are protein samples from PFCE stomach tissue. Right: ladder.

As can be seen, proteins and even highly sensitive phosphoproteins can be isolated and analyzed from tissue prepared according to the method of the first aspect disclosed herein.

15. Example 14

Laser-Capture Microdissection (LCM)

Total RNA, total RNA, including miRNA, and genomic DNA were extracted from LCM PFCE tissue as described above in the Materials and Methods section.

Figure 16A:
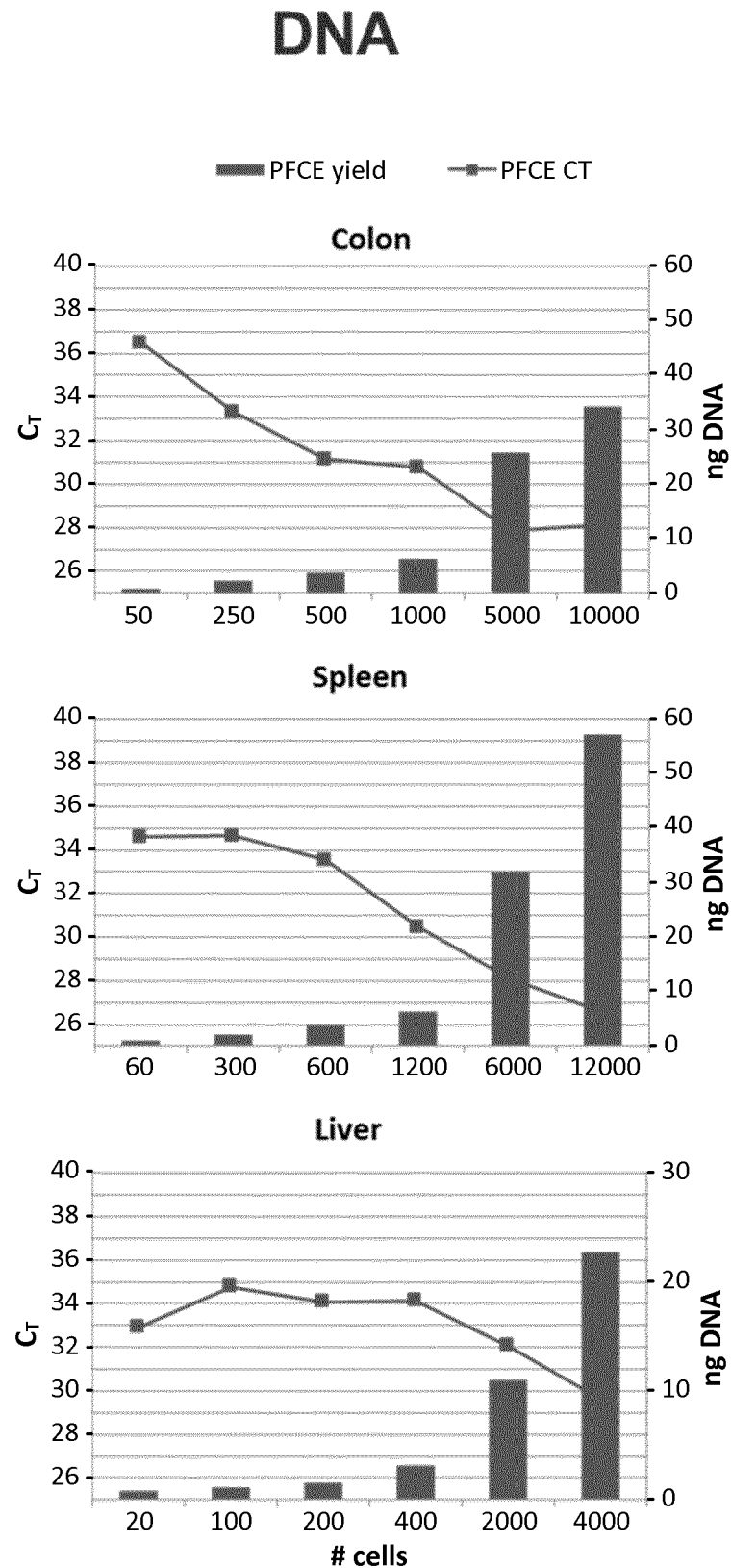
FIG. 16A, B shows the total yield and performance (ß-act PCR) of genomic DNA (A) and total RNA (B) isolated from LCM PFCE tissue (colon, spleen, liver), and indicate the cell-limit for isolation and detection of DNA (A) and RNA (B). For each of the graphs shown in FIG. 16A, B, the left y axis indicates the CT value, the right y axis indicates the amount of genomic DNA (A) or total RNA (B) isolated in [ng]; the x axis indicates the number of cells captured. Bars indicate the yield [ng] of genomic DNA (A) or total RNA (B) for a given number of cells. Square dots connected by a line indicate the CT value obtained for genomic DNA (A) or total RNA (B) in a ß--act PCR for a given number of cells.
Figure 16B:
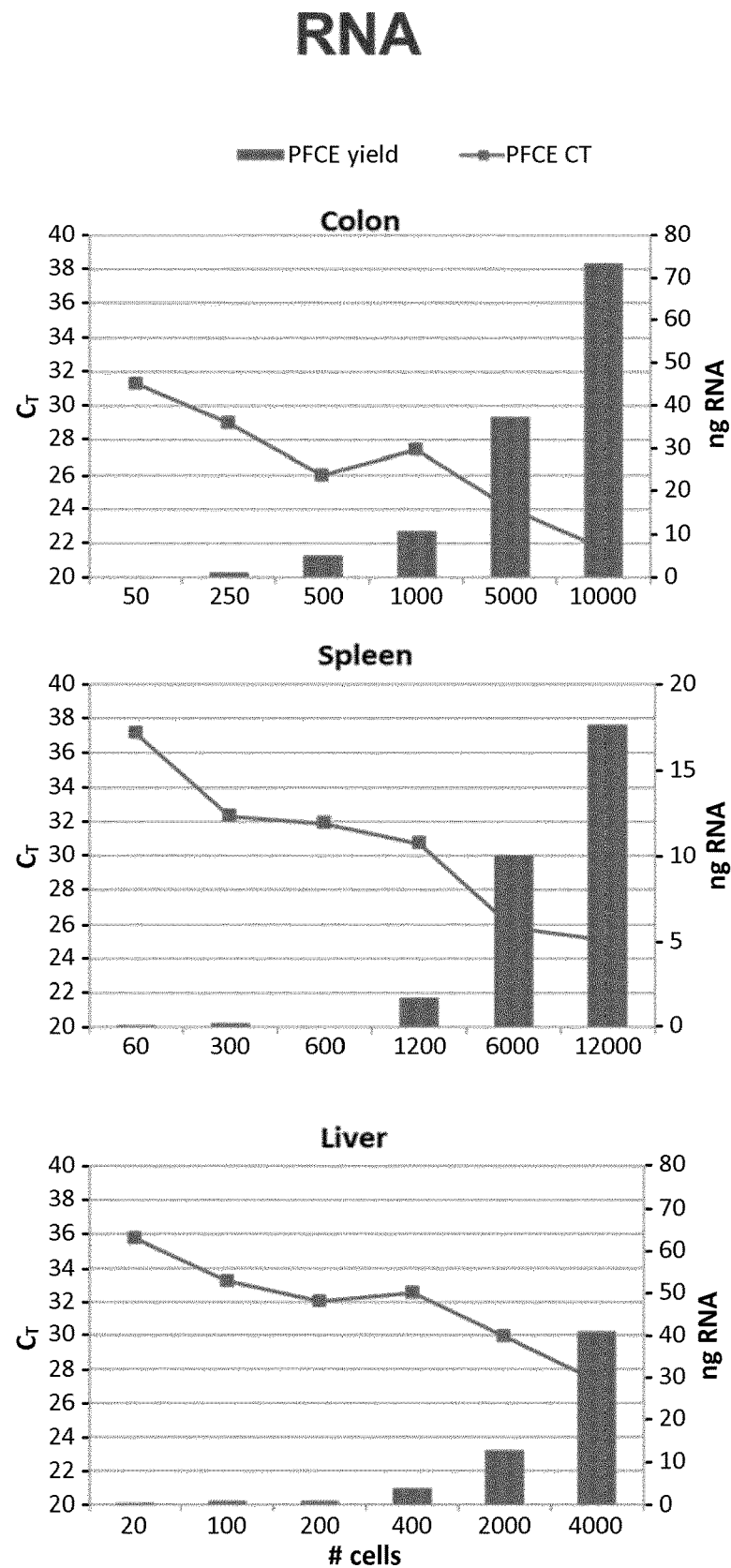

FIG. 16A, B shows the total yield and performance (ß-act PCR) of genomic DNA (A) and total RNA (B) isolated from LCM PFCE tissue (colon, spleen, liver), and indicate the cell-limit for isolation and detection of DNA (A) and RNA (B). For each of the graphs shown in FIG. 16A, B, the left y axis indicates the CT value, the right y axis indicates the amount of genomic DNA (A) or total RNA (B) isolated in [ng]; the x axis indicates the number of cells captured. Bars indicate the yield [ng] of genomic DNA (A) or total RNA (B) for a given number of cells. Square dots connected by a line indicate the CT value obtained for genomic DNA (A) or total RNA (B) in a β-act PCR for a given number of cells.

As can be seen, genomic DNA and total RNA could be successfully isolated from all LCM PFCE tissue types analyzed with good yield. As expected, the total yield of DNA and RNA dependent on the number of captured cells, with higher cell numbers resulting in a higher total yield. DNA and RNA could be isolated even if low numbers of captured cells were used as the starting material, indicating that DNA and RNA were well preserved in the PFCE tissue samples. Also, lower CT values were obtained if higher numbers of captured cells were used for DNA or RNA isolation. Good CT values (e.g. below 29) could be obtained for all of the analyzed LCM issues if sufficient cells were used as the starting material.

Figure 17A:
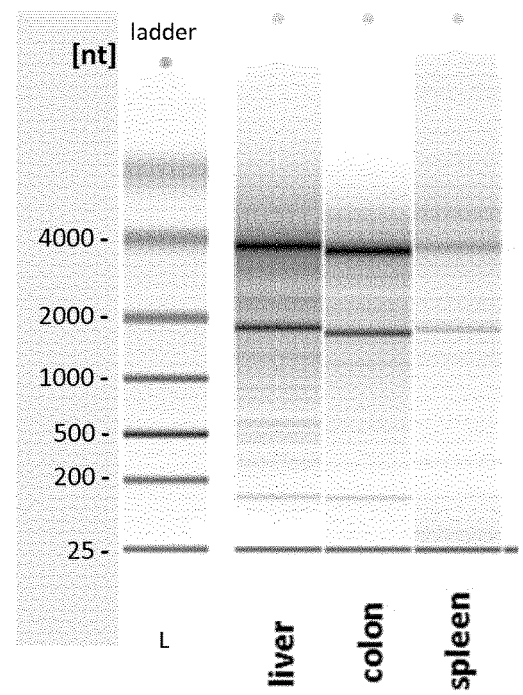
FIG. 17A, B: The figure shows that high-quality and high molecular weight RNA can be isolated from LCM PFCE tissue. The figure shows an Agilent Bioanalyser gel-like image (A) and the corresponding RIN values (B) of total RNA, isolated from LCM colon, spleen, and liver tissue.
Figure 17B:
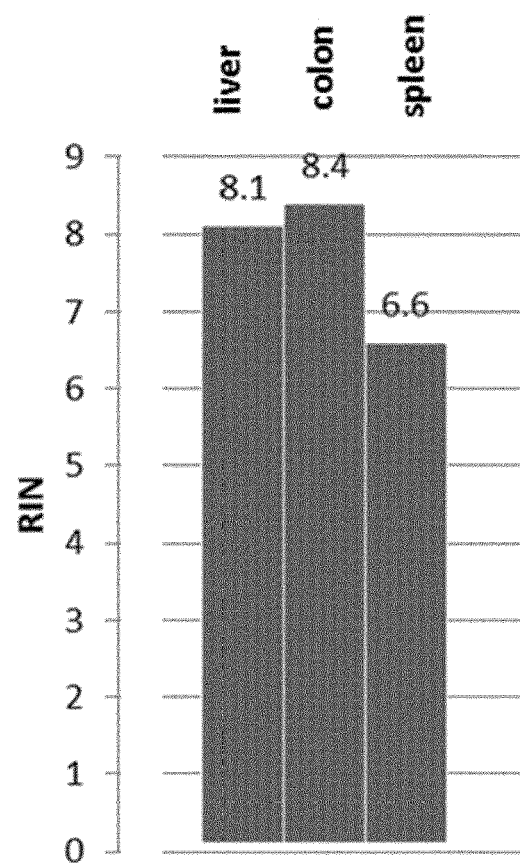
FIG. 17 B: Y axis indicates the RIN value [RIN]; x axis indicates the PCFE tissue samples (liver, colon and spleen).

FIG. 17A, B shows that high-quality and high molecular weight RNA can be isolated from LCM PFCE tissue. The figure shows an Agilent Bioanalyzer gel-like image (A) and the corresponding RIN values (B) of total RNA, isolated from LCM colon, spleen, and liver tissue. FIG. 17A: Y axis indicates the size ([nt]), x axis indicates the sample type. Left lane: ladder, followed by liver, colon and spleen PCFE tissue samples. FIG. 17 B: Y axis indicates the RIN value ([RIN]); x axis indicates the PCFE tissue samples (liver, colon and spleen).

The invention claimed is:

1. A method of preparing a frozen biological sample derived from metazoa, comprising the steps of
  fixing the biological sample with a non-crosslinking fixative solution,
  incubating the fixed biological sample in an aqueous solution comprising a cryoprotectant in a single incubation step, and
  freezing the cryoprotected biological sample,
  wherein the non-crosslinking fixative solution comprises at least one alcohol and one or more additives, wherein the one or more additives are selected from:
  a) a sugar and/or a sugar alcohol;
  b) a poly(oxyalkylene) polymer, optionally wherein the poly(oxyalkylene) polymer is comprised in the non-crosslinking fixative solution in a concentration selected from 1 to 20% (w/v), 2 to 15% (w/v) and 3 to 10% (w/v);
  c) a poly(oxyalkylene) polymer having a molecular weight that lies in a range selected from 100 to 10000, 150 to 5000, 200 to 1000 and 250 to 500;
  d) diethyleneglycol monoethylether acetate (DEGMEA); and
  e) one or more $C_2$ to $C_{12}$ polyols.

2. The method according to claim 1, wherein the non-crosslinking fixative solution comprises optionally at least one acid, wherein the non-crosslinking fixative solution has one or more of the following characteristics:
  a) the non-crosslinking fixative solution comprises one or more aliphatic alcohols;
  b) the non-crosslinking fixative solution comprises one or more aliphatic alcohols of the general formula $C_nH_{2n+1}OH$;
  c) the non-crosslinking fixative solution comprises one or more aliphatic alcohols of the general formula $C_nH_{2n+1}OH$, wherein n is selected from the group consisting of 1-12, 1-5, and 1-4;
  d) the non-crosslinking fixative solution comprises methanol and/or ethanol as alcohol; and/or
  e) the non-crosslinking fixative solution comprises alcohol as the major component (v/v).

3. The method according to claim 1, wherein
  the non-crosslinking fixative solution further comprises at least one acid, and wherein the at least one acid has one or more of the following characteristics:
  a) it has a pKa value of from 2 to 12, from 3.5 to 8, or from 4 to 7.5;
  b) it is an organic acid;
  c) it is a weak organic acid;
  d) it is selected from amino acids and carboxylic acids;
  e) it is a carboxylic acid selected from formic acid, fumaric acid, maleic acid, tartaric acid, citric acid, acetic acid and propionic acid; and/or
  f) it is selected from acetic acid and propionic acid or a mixture thereof.

4. The method according to claim 1, wherein
  the non-crosslinking fixative solution is non-aqueous, and optionally comprises:
  a) at least one alcohol in a concentration that lies in a range selected from 10 to 90% (v/v), 20 to 80% (v/v), 30 to 75% (v/v) and 40 to 70% (v/v);
  b) at least one acid; and
  c) one or more additives selected from:
    i) a poly(oxyalkylene) polymer, wherein optionally the poly(oxyalkylene) polymer is comprised in the non-crosslinking fixative solution in a concentration selected from 1 to 20% (w/v), 2 to 15% (w/v) and 3 to 10% (w/v);
    ii) a poly(oxyalkylene) polymer having a molecular weight that lies in a range selected from 100 to 10000, 150 to 5000, 200 to 1000 and 250 to 500;
    iii) diethyleneglycol monoethylether acetate (DEGMEA); and
    iv) one or more $C_2$ to $C_{12}$ polyols.

5. The method according to claim 1, wherein the aqueous solution comprises the cryoprotectant in a concentration that lies in a range selected from 5 to 50% (w/v), 10 to 45% (w/v), 15 to 40% (w/v), and 20 to 35% (w/v), and/or
  wherein the cryoprotectant comprised in the aqueous solution is selected from sugars, glycols, 2-methyl-2,4-pentanediol, polyethylene glycol (PEG), polyvinylpyrrolidone (PVP), formamide, dimethyl formamide, and dimethyl sulfoxide (DMSO).

6. The method according to claim 1, wherein incubating the fixed biological sample in the aqueous solution comprising the cryoprotectant has one or more of the following characteristics:

a) the fixed biological sample is incubated under RNAse-free conditions;
b) the fixed biological sample is incubated for about 1 to about 72 hours, for about 6 to about 48 hours or for about 8 to about 24 hours;
c) the fixed biological sample is incubated in a vessel and the biological sample is incubated until the biological sample sinks to the bottom of the vessel;
d) the fixed biological sample is incubated at about 2° C. to about 35° C., or about 2° C. to about 8° C.; and/or
e) the cryoprotectant penetrates the fixed biological sample in a single incubation step whereby the biological sample is cryoprotected.

7. The method according to claim 1, wherein freezing the cryoprotected biological sample has one or more of the following characteristics:
a) the cryoprotected biological sample is frozen at about −60° C. to about −196° C.;
b) the cryoprotected biological sample is snap-frozen;
c) the cryoprotected biological sample is frozen in liquid nitrogen or in a pre-cooled liquid cryogen, optionally in pre-cooled isobutene, 2-methylbutane, propane, ethane, or halocarbon; and/or
d) the cryoprotected biological sample is frozen in a pre-cooled liquid cryogen, optionally in pre-cooled isobutene, 2-methylbutane, propane, ethane, halocarbon, wherein the pre-cooled liquid cryogen is pre-cooled to at least about −60° C., or to about −60° C. to about −160° C.

8. The method according to claim 1, further comprising embedding the cryoprotected biological sample with a cryo-embedding material, optionally wherein embedding the cryoprotected biological sample with the cryo-embedding material has one or more of the following characteristics:
a) the cryo-embedding material is a cryo-solidifiable material;
b) the embedding is performed simultaneously with or after freezing the cryoprotected biological sample;
c) the cryoprotected biological sample is placed in the cryo-embedding material and is frozen in liquid nitrogen whereby the cryoprotected biological sample is simultaneously embedded and frozen, wherein optionally the cryo-embedding material is contained in a cryo-mold and the cryo-mold is placed into liquid nitrogen;
d) the cryoprotected biological sample is frozen in pre-cooled 2-methylbutane, and the frozen sample thereafter is placed in the cryo-embedding material and is embedded in a frozen state, wherein optionally the cryo-embedding material is a cryo-solidifiable material and/or the cryo-embedding material is pre-cooled; and/or
e) the cryoprotected biological sample is frozen in pre-cooled 2-methylbutane, wherein the 2-methylbutane is pre-cooled to at least about −60° C., or is pre-cooled to about −60° C. to about −160° C., and the frozen sample thereafter is placed in the cryo-embedding material and is embedded in a frozen state, wherein optionally the cryo-embedding material is a cryo-solidifiable material and/or the cryo-embedding material is pre-cooled.

9. The method according to claim 1, further comprising stabilizing the biological sample with a stabilizing solution prior to incubating the biological sample in the aqueous solution comprising the cryoprotectant, wherein optionally, stabilizing is performed after fixing the biological sample in the non-crosslinking fixative solution.

10. The method according to claim 9, wherein the stabilizing solution is a non-crosslinking stabilizing solution.

11. The method according to claim 10, wherein the stabilizing solution comprises at least one alcohol and optionally has one or more of the following characteristics:
a) the at least one alcohol is an aliphatic alcohol;
b) the stabilizing solution comprises one or more aliphatic alcohols of the general formula $C_nH_{2n+1}OH$;
c) the stabilizing solution comprises one or more aliphatic alcohols of the general formula $C_nH_{2n+1}OH$, wherein n is selected from the group consisting of 1-12, 1-5 and 1-4;
d) the stabilizing solution comprises methanol and/or ethanol as alcohol;
e) the stabilizing solution comprises alcohol as the major component (v/v);
f) the stabilizing solution comprises the at least one alcohol, optionally ethanol, in a concentration that lies in a range selected from 10 to 99% (v/v), 20 to 90% (v/v), 30 to 85% (v/v), 40 to 80% (v/v) and 50 to 80% (v/v);
g) the stabilizing solution does not comprise methanol; and/or
h) the non-crosslinking stabilizing solution is non-aqueous.

12. The method according to claim 1, further comprising isolating and/or analyzing at least one biological component contained in the biological sample.

13. The method of claim 1, wherein:
the sugar according to a) is selected from monosaccharides and disaccharides, and/or the sugar alcohol according to a. is selected from sorbitol, mannitol and dulcitol;
the poly(oxyalkylene) polymer according to b) is a poly(oxyethylene) polymer or is polyethylene glycol (PEG);
the poly(oxyalkylene) polymer according to c) is polyethylene glycol (PEG); and/or
the one or more $C_2$ to $C_{12}$ polyols according to e) are selected from $C_2$ to $C_{12}$ diols and $C_2$ to $C_{12}$ triols.

14. The method of claim 4, wherein:
the at least one alcohol according to a) is methanol;
the poly(oxyalkylene) polymer according to c) i) is a poly(oxyethylene) polymer or is polyethylene glycol (PEG);
the poly(oxyalkylene) polymer according to c) ii) is polyethylene glycol (PEG); and/or
the one or more $C_2$ to $C_{12}$ polyols according to c) iv) are selected from $C_2$ to $C_{12}$ diols and $C_2$ to $C_{12}$ triols.

15. The method of claim 5, wherein the cryoprotectant has one or more of the following characteristics:
it comprises or consists of one or more sugars, optionally wherein the cryoprotectant comprises or consists of monosaccharides, disaccharides, sucrose, trehalose and/or dextrose; and/or
it comprises or consists of one or more glycols, optionally wherein the cryoprotectant comprises or consists of glycerol, ethylene glycol and/or propylene glycol.

16. A method for preparing a frozen biological sample derived from metazoa, comprising:
fixing a biological sample with a non-crosslinking fixative solution, wherein the non-crosslinking fixative solution is non-aqueous and comprises one or more aliphatic alcohols of the general formula $C_nH_{2n+1}OH$, and optionally an acid, incubating the fixed biological sample in an aqueous solution comprising a cryoprotectant in a single incubation step, and freezing the fixed biological sample, wherein the non-crosslinking fixative solution comprises at least one or more additives, wherein the one or more additives are selected from:

a) a sugar and/or or a sugar alcohol;
b) a poly(oxyalkylene) polymer, wherein optionally, the poly(oxyalkylene) polymer is comprised in the non-crosslinking fixative solution in a concentration selected from 1 to 20% (w/v), 2 to 15% (w/v) and 3 to 10% (w/v);
c) a poly(oxyalkylene) polymer having a molecular weight that lies in a range selected from 100 to 10000, 150 to 5000, 200 to 1000 and 250 to 500;
d) diethyleneglycol monoethylether acetate (DEGMEA); and
e) one or more $C_2$ to $C_{12}$ polyols.

17. The method of according to claim 16, wherein:

the sugar according to a) is selected from monosaccharides and disaccharides, and/or the sugar alcohol according to a) is selected from sorbitol, mannitol and dulcitol;

the poly(oxyalkylene) polymer according to b) is a poly(oxyethylene) polymer or is polyethylene glycol (PEG);

the poly(oxyalkylene) polymer according to c) is polyethylene glycol (PEG); and/or the one or more $C_2$ to $C_{12}$ polyols according to e) are selected from $C_2$ to $C_{12}$ diols and $C_2$ to $C_{12}$ triols.

* * * * *